(12) United States Patent
Nguyen

(10) Patent No.: US 9,564,018 B2
(45) Date of Patent: *Feb. 7, 2017

(54) TEMPORARY GRANT OF REAL-TIME BONUS FEATURE

(71) Applicant: Binh T. Nguyen, Reno, NV (US)

(72) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 888 days.

This patent is subject to a terminal disclaimer.

(21) Appl. No.: 13/843,087

(22) Filed: Mar. 15, 2013

(65) Prior Publication Data

US 2013/0210530 A1 Aug. 15, 2013

Related U.S. Application Data

(63) Continuation-in-part of application No. 13/296,182, filed on Nov. 14, 2011.

(60) Provisional application No. 61/413,477, filed on Nov. 14, 2010.

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| G07F 17/32 | (2006.01) |
| A63F 13/30 | (2014.01) |
| A63F 13/795 | (2014.01) |

(Continued)

(52) U.S. Cl.
CPC .......... *G07F 17/3281* (2013.01); *A63F 13/12* (2013.01); *A63F 13/795* (2014.09); *G07F 17/3225* (2013.01); *G07F 17/3267* (2013.01); *H04L 67/38* (2013.01); *H04W 4/206* (2013.01)

(58) Field of Classification Search
USPC ............... 463/16, 22, 25, 29, 39, 40, 42
See application file for complete search history.

(56) References Cited

U.S. PATENT DOCUMENTS

| | | | |
|---|---|---|---|
| 2,033,638 A | 3/1936 | Koppl | |
| 2,062,923 A | 12/1936 | Nagy | |
| 4,741,539 A | 5/1988 | Sutton et al. | |

(Continued)

FOREIGN PATENT DOCUMENTS

| | | |
|---|---|---|
| GB | 2033638 | 5/1980 |
| GB | 2062923 | 5/1981 |
| GB | 2096376 | 10/1982 |
| GB | 2097570 | 11/1982 |
| GB | 2335524 | 9/1999 |
| PH | 12005000454 | 5/2007 |

(Continued)

OTHER PUBLICATIONS

Benston, Liz, "Harrahs Launches iPhone App; Caesars Bypasses Check-in, Las Vegas Sun, Las Vegas, NV." Jan. 8, 2010.

(Continued)

*Primary Examiner* — Adetokunbo O Torimiro

(57) ABSTRACT

In one embodiment, a system, apparatus, and method for distributing a portion of game information may include a gaming machine configured to play a game of chance and produce game information. A social gaming server can be configured to communicate with the gaming machine, may establish a remote gaming session between the gaming machine and a user device, and may distribute the portion of the game information to the user device. A social gaming server may also establish a temporal bonus game feature between the gaming machine user and at least one available remote user.

24 Claims, 28 Drawing Sheets

(51) Int. Cl.
*H04W 4/20* (2009.01)
*H04L 29/06* (2006.01)

(56) References Cited

U.S. PATENT DOCUMENTS

| | | |
|---|---|---|
| 4,948,138 A | 8/1990 | Pease et al. |
| 5,067,712 A | 11/1991 | Georgilas |
| 5,429,361 A | 7/1995 | Raven et al. |
| 5,489,103 A | 2/1996 | Okamoto |
| 5,630,757 A | 5/1997 | Gagin |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,273 A | 11/2000 | Olsen |
| 6,165,071 A | 12/2000 | Weiss |
| 6,231,445 B1 | 5/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,326,116 B2 | 12/2001 | O'Donovan et al. |
| 6,353,390 B1 | 3/2002 | Beri et al. |
| 6,364,768 B1 | 4/2002 | Acres et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,505,095 B1 | 1/2003 | Kolls |
| 6,508,710 B1 | 1/2003 | Paravia et al. |
| 6,561,900 B1 | 5/2003 | Baerlocher et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,719,630 B1 | 4/2004 | Seelig et al. |
| 6,749,510 B2 | 6/2004 | Globbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Baerlocher et al. |
| 6,923,721 B2 | 8/2005 | Luciano et al. |
| 6,935,958 B2 | 8/2005 | Nelson |
| 6,949,022 B1 | 9/2005 | Showers et al. |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Baerlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| RE39,644 E | 5/2007 | Alcorn et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,448,949 B2 | 11/2008 | Kaminkow et al. |
| 7,500,913 B2 | 3/2009 | Baerlocher |
| 7,510,474 B2 | 3/2009 | Carter |
| 7,513,828 B2 | 4/2009 | Nguyen et al. |
| 7,519,838 B1 | 4/2009 | Suurballe |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,699,703 B2 | 4/2010 | Muir et al. |
| 7,722,453 B2 | 5/2010 | Lark et al. |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |

(56) References Cited

U.S. PATENT DOCUMENTS

| | | |
|---|---|---|
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh et al. |
| 8,182,326 B2 | 5/2012 | Speers et al. |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,403,758 B2 | 3/2013 | Hornik et al. |
| 8,461,958 B2 | 6/2013 | Saenz |
| 8,613,655 B2 | 12/2013 | Kisenwether et al. |
| 8,613,659 B2 | 12/2013 | Nelson et al. |
| 8,745,417 B2 | 6/2014 | Huang et al. |
| 8,858,323 B2 | 10/2014 | Nguyen et al. |
| 8,864,586 B2 | 10/2014 | Nguyen |
| 8,942,995 B1 | 1/2015 | Kerr |
| 9,235,952 B2 | 1/2016 | Nguyen |
| 9,325,203 B2 | 4/2016 | Nguyen |
| 9,486,697 B2 | 11/2016 | Nguyen |
| 9,486,704 B2 | 11/2016 | Nguyen |
| 2001/0016516 A1 | 8/2001 | Takatsuka |
| 2001/0024971 A1 | 9/2001 | Brossard |
| 2002/0042295 A1 | 4/2002 | Walker et al. |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1 | 10/2002 | Lark et al. |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0167536 A1 | 11/2002 | Valdes et al. |
| 2002/0183105 A1* | 12/2002 | Cannon .................. G07F 17/32 463/16 |
| 2003/0001338 A1 | 1/2003 | Bennett et al. |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |
| 2003/0100361 A1 | 5/2003 | Sharpless et al. |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0048650 A1 | 3/2004 | Mierau et al. |
| 2004/0082385 A1 | 4/2004 | Silva et al. |
| 2004/0106449 A1 | 6/2004 | Walker et al. |
| 2004/0127290 A1 | 7/2004 | Walker et al. |
| 2004/0137987 A1 | 7/2004 | Nguyen et al. |
| 2004/0147308 A1 | 7/2004 | Walker et al. |
| 2004/0152508 A1 | 8/2004 | Lind |
| 2004/0214622 A1 | 10/2004 | Atkinson |
| 2004/0224753 A1 | 11/2004 | Odonovan et al. |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0137014 A1 | 6/2005 | Vetelaninen |
| 2005/0181865 A1 | 8/2005 | Luciano |
| 2005/0181870 A1 | 8/2005 | Nguyen et al. |
| 2005/0187020 A1 | 8/2005 | Amaitis et al. |
| 2005/0202875 A1 | 9/2005 | Murphy et al. |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0148551 A1 | 7/2006 | Walker et al. |
| 2006/0189382 A1* | 8/2006 | Muir .................. G07F 17/32 463/29 |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitis et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0129123 A1 | 6/2007 | Eryou et al. |
| 2007/0149279 A1 | 6/2007 | Norden et al. |
| 2007/0149286 A1 | 6/2007 | Bemmel |
| 2007/0159301 A1 | 7/2007 | Brown |
| 2007/0161402 A1 | 7/2007 | Ng. et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259717 A1 | 11/2007 | Mattice et al. |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitis et al. |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102956 A1 | 5/2008 | Burman et al. |
| 2008/0102957 A1 | 5/2008 | Burnman et al. |
| 2008/0113772 A1 | 5/2008 | Burrill et al. |
| 2008/0119267 A1 | 5/2008 | Denlay |
| 2008/0146321 A1 | 6/2008 | Parente |
| 2008/0150902 A1 | 6/2008 | Edpalm et al. |

(56) References Cited

U.S. PATENT DOCUMENTS

| | | |
|---|---|---|
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0182667 A1 | 7/2008 | Davis et al. |
| 2008/0207307 A1 | 8/2008 | Cunningham, II et al. |
| 2008/0214258 A1 | 9/2008 | Brosnan et al. |
| 2008/0234047 A1 | 9/2008 | Nguyen |
| 2008/0238610 A1 | 10/2008 | Rosenbereg |
| 2008/0254878 A1 | 10/2008 | Saunders et al. |
| 2008/0254881 A1 | 10/2008 | Lutnick et al. |
| 2008/0254883 A1 | 10/2008 | Patel et al. |
| 2008/0254891 A1 | 10/2008 | Saunders et al. |
| 2008/0254892 A1 | 10/2008 | Saunders et al. |
| 2008/0254897 A1 | 10/2008 | Saunders et al. |
| 2008/0263173 A1 | 10/2008 | Weber et al. |
| 2008/0300058 A1 | 12/2008 | Sum et al. |
| 2008/0305864 A1 | 12/2008 | Kellye et al. |
| 2008/0305865 A1 | 12/2008 | Kelly et al. |
| 2008/0305866 A1 | 12/2008 | Kelly et al. |
| 2008/0311994 A1 | 12/2008 | Amaitis et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1* | 1/2009 | Englman ............. G07F 17/3265 463/25 |
| 2009/0029766 A1 | 1/2009 | Lutnick et al. |
| 2009/0054149 A1 | 2/2009 | Brosnan et al. |
| 2009/0077396 A1 | 3/2009 | Tsai et al. |
| 2009/0088258 A1 | 4/2009 | Saunders et al. |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131151 A1 | 5/2009 | Harris et al. |
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0275410 A1 | 11/2009 | Kisenwether et al. |
| 2009/0275411 A1 | 11/2009 | Kisenwether et al. |
| 2009/0298468 A1 | 12/2009 | Hsu |
| 2010/0004058 A1 | 1/2010 | Acres |
| 2010/0016069 A1 | 1/2010 | Herrmann |
| 2010/0056248 A1 | 3/2010 | Acres |
| 2010/0062833 A1 | 3/2010 | Mattice et al. |
| 2010/0062840 A1 | 3/2010 | Herrmann et al. |
| 2010/0079237 A1 | 4/2010 | Falk |
| 2010/0081501 A1 | 4/2010 | Carpenter et al. |
| 2010/0099499 A1 | 4/2010 | Amaitis et al. |
| 2010/0106612 A1 | 4/2010 | Gupta |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0197383 A1 | 8/2010 | Rad et al. |
| 2010/0197385 A1 | 8/2010 | Aoki et al. |
| 2010/0203955 A1 | 8/2010 | Sylla |
| 2010/0203963 A1 | 8/2010 | Allen |
| 2010/0227662 A1 | 9/2010 | Speers et al. |
| 2010/0227670 A1 | 9/2010 | Arezina et al. |
| 2010/0227687 A1 | 9/2010 | Speers et al. |
| 2010/0234091 A1 | 9/2010 | Baerlocher et al. |
| 2010/0279764 A1* | 11/2010 | Allen .................. G07F 17/32 463/25 |
| 2010/0323780 A1 | 12/2010 | Acres |
| 2010/0325703 A1 | 12/2010 | Etchegoyen |
| 2011/0009181 A1 | 1/2011 | Speers et al. |
| 2011/0039615 A1 | 2/2011 | Acres |
| 2011/0065492 A1 | 3/2011 | Acres |
| 2011/0111827 A1 | 5/2011 | Nicely et al. |
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0212711 A1 | 9/2011 | Scott |
| 2011/0223993 A1 | 9/2011 | Allen et al. |
| 2011/0263318 A1 | 10/2011 | Agarwal et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028703 A1 | 2/2012 | Anderson et al. |
| 2012/0028718 A1* | 2/2012 | Barclay .............. G07F 17/3218 463/42 |
| 2012/0034968 A1 | 2/2012 | Watkins et al. |
| 2012/0094769 A1 | 4/2012 | Nguyen et al. |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0190426 A1 | 7/2012 | Acres |
| 2012/0194448 A1 | 8/2012 | Rothkopf |
| 2012/0208618 A1 | 8/2012 | Frerking |
| 2012/0322563 A1 | 12/2012 | Nguyen et al. |
| 2012/0330740 A1 | 12/2012 | Pennington et al. |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0103965 A1 | 4/2013 | Golembeski |
| 2013/0104193 A1 | 4/2013 | Gatto et al. |
| 2013/0132745 A1 | 5/2013 | Schoening et al. |
| 2013/0196776 A1 | 8/2013 | Nguyen |
| 2013/0210513 A1 | 8/2013 | Nguyen |
| 2013/0210514 A1 | 8/2013 | Nguyen |
| 2014/0006129 A1 | 1/2014 | Heath |
| 2014/0057716 A1 | 2/2014 | Massing et al. |
| 2014/0094295 A1 | 4/2014 | Nguyen |
| 2014/0094316 A1 | 4/2014 | Nguyen |
| 2014/0179431 A1 | 6/2014 | Nguyen |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |

FOREIGN PATENT DOCUMENTS

| | | |
|---|---|---|
| WO | WO 05073933 | 8/2005 |
| WO | WO 2008/027621 | 5/2007 |
| WO | WO 2009/062148 | 3/2008 |
| WO | WO 2010/017252 A1 | 8/2009 |
| WO | WO2010002897 A1 | 1/2010 |
| WO | WO 2009/026309 | 2/2011 |

OTHER PUBLICATIONS

Finnegan, Amanda, "Casinos Connecting with Customers via Iphone Apps", May 27, 2010, Las Vegas Sun, Las Vegas, NV.

(56) References Cited

OTHER PUBLICATIONS

Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Ilinois at Urbana Champain, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
iAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, mailed Aug. 23, 2013.
Office Action for U.S. Appl. No. 13/633,118, mailed Sep. 20, 2013.
Office Action for U.S. Appl. No. 13/801,256, mailed Jul. 2, 2013.
Notice of Allowance for U.S. Appl. No. 12/619,672, mailed Oct. 3, 2013.
Notice of Allowance for U.S. Appl. No. 12/757,968, mailed Oct. 11, 2013.
Final Office Action for U.S. Appl. No. 12/797,610, mailed Jul. 10, 2013.
Office Action for U.S. Appl. No. 12/617,717, mailed Jun. 17, 2013.
Notice of Allowance for U.S. Appl. No. 12/757,968, mailed Dec. 18, 2013.
Office Action for U.S. Appl. No. 12/945,889, mailed Dec. 18, 2013.
Office Action for U.S. Appl. No. 13/632,828, mailed Jul. 30, 2013.
Restriction Requirement for U.S. Appl. No. 13/801,256, mailed Dec. 30, 2013.
Office Action for U.S. Appl. No. 13/801,171, mailed Dec. 26, 2013.
Office Action for U.S. Appl. No. 13/801,234, mailed Jan. 10, 2014.
Final Office Action for U.S. Appl. No. 13/296,182, mailed Feb. 12, 2014.
Office Action for U.S. Appl. No. 12/617,717, mailed Feb. 25, 2014.
Office Action for U.S. Appl. No. 13/801,076, mailed Mar. 28, 2014.
Final Office Action for U.S. Appl. No. 13/633,118, mailed Apr. 3, 2014.
Office Action for U.S. Appl. No. 13/843,192, mailed Apr. 3, 2014.
Office Action for U.S. Appl. No. 13/632,743, mailed Apr. 10, 2014.
Office Action for U.S. Appl. No. 13/801,121, mailed Apr. 11, 2014.
Final Office Action for U.S. Appl. No. 12/945,889, mailed Jun. 30, 2014.
Notice of Allowance for U.S. Appl. No. 12/617,717, mailed Jul. 14, 2014.
Office Action for U.S. Appl. No. 13/801,121, mailed Sep. 24, 2014.
Office Action for U.S. Appl. No. 13/801,171, mailed Sep. 22, 2014.
Office Action for U.S. Appl. No. 13/801,234, mailed Oct. 1, 2014.
Office Action for U.S. Appl. No. 13/801,271, mailed Oct. 31, 2014.
Final Office Action for U.S. Appl. No. 13/843,192, mailed Oct. 21, 2014.
Office Action for U.S. Appl. No. 13/632,743, mailed Oct. 23, 2014.
Office Action for U.S. Appl. No. 12/945,889, mailed Oct. 23, 2014.
Office Action for U.S. Appl. No. 13/632,828, mailed Nov. 7, 2014.
Office Action fpr U.S. Appl. No. 12/797,610, mailed Dec. 15, 2014.
Final Office Action for U.S. Appl. No. 12/945,889, mailed Feb. 12, 2015.
Final Office Action for U.S. Appl. No. 13/801,171, mailed Mar. 16, 2015.
Office Action for U.S. Appl. No. 13/833,116, mailed Mar. 27, 2015.
Office Action for U.S. Appl. No. 13/632,828, mailed Apr. 10, 2015.
Final Office Action for U.S. Appl. No. 13/801,121, mailed Apr. 21, 2015.
Final Office Action for U.S. Appl. No. 13/557,063, mailed Apr. 28, 2015.
Office Action for U.S. Appl. No. 13/296,182, mailed Jun. 5, 2015.
Office Action for U.S. Appl. No. 13/843,192, mailed Jun. 19, 2015.
Office Action for U.S. Appl. No. 12/797,610, mailed Jul. 14, 2015.
Final Office Action for U.S. Appl. No. 13/833,953, mailed Jul. 17, 2015.
Notice of Allowance for U.S. Appl. No. 12/945,889, mailed Jul. 22, 2015.
Office Action for U.S. Appl. No. 12/797,616, mailed Aug. 10, 2015.
Final Office Action for U.S. Appl. No. 13/801,234, mailed Aug. 14, 2015.
Final Office Action for U.S. Appl. No. 13/833,116, mailed Sep. 24, 2015.
Office Action for U.S. Appl. No. 13/801,121, mailed Oct. 2, 2015.

(56) References Cited

OTHER PUBLICATIONS

Office Action for U.S. Appl. No. 14/017,150, mailed Oct. 7, 2015.
Office Action for U.S. Appl. No. 14/017,159, mailed Oct. 7, 2015.
Office Action for U.S. Appl. No. 13/801,271 mailed Oct. 19, 2015.
Office Action for U.S. Appl. No. 14/211,536 mailed Oct. 19, 2015.
Final Office Action for U.S. Appl. No. 13/632,828, mailed Oct. 22, 2015.
Office Action for U.S. Appl. No. 14/217,066, mailed Dec. 17, 2015.
Notice of Allowance for U.S. Appl. No. 13/557,063, mailed Dec. 23, 2015.
Office Action for U.S. Appl. No. 13/296,182, mailed Dec. 23, 2015.
Final Office Action for U.S. Appl. No. 13/843,192, mailed Dec. 30, 2015.
Office Action for U.S. Appl. No. 13/801,076, mailed Jan. 11, 2016.
Office Action for U.S. Appl. No. 12/945,888, mailed Jan. 22, 2016.
Final Office Action for U.S. Appl. No. 12/797,616, mailed Jun. 12, 2016.
Office Action for U.S. Appl. No. 13/800,917, mailed Feb. 25, 2016.
Advisory Action for U.S. Appl. No. 13632,828, mailed Feb. 25, 2016.
Office Action for U.S. Appl. No. 13/801,234, mailed Mar. 8, 2016.
Office Action for U.S. Appl. No. 14/216,986, mailed Mar. 9, 2016.
Final Office Action for U.S. Appl. No. 13/801,271, mailed Mar. 11, 2016.
Office Action for U.S. Appl. No. 13/622,702, mailed Sep. 19, 2012.
Final Office Action for U.S. Appl. No. 13/633,118, mailed Mar. 24, 2016.
Final Office Action for U.S. Appl. No. 14/189,948, mailed Apr. 6, 2016.
Final Office Action for U.S. Appl. No. 12/797,610, mailed Apr. 21, 2016.
Final Office Action for U.S. Appl. No. 14/017,150, mailed Apr. 26, 2016.
Final Office Action for U.S. Appl. No. 13/801,121, mailed May 11, 2016.
Final Office Action for U.S. Appl. No. 14/017,159, mailed Jun. 6, 2016.
Office Action for U.S. Appl. No. 13/801,719, mailed Jun. 6, 2016.
Office Action for U.S. Appl. No. 13/843,192, mailed Jun. 9, 2016.
Final OA for U.S. Appl. No. 12/945,888, mailed Jun. 28, 2016.
Final Office Action for U.S. Appl. No. 14/216,986, mailed Sep. 23, 2016.
Office Action for U.S. Appl. No. 14/017,159, mailed Sep. 23, 2016.
Office Action for U.S. Appl. No. 13/632,743, mailed Sep. 23, 2016.
Final Office Action for U.S. Appl. No. 13/801,234, mailed Oct. 14, 2016.
Final Office Action for U.S. Appl. No. 13/843,087, mailed Oct. 13, 2016.
Final Office Action for U.S. Appl. No. 13/622,702, mailed Oct. 13, 2016.
Notice of Allowance for U.S. Appl. No. 13/833,953, mailed Jul. 6, 2016.
Final Office Action for U.S. Appl. No. 13/801,171, mailed May 21, 2014.
Final Office Action for U.S. Appl. No. 13/801,234, mailed May 22, 2014.
Office Action for U.S. Appl. No. 14/211,536, mailed Jul. 13, 2016.
Notice of Allowance for U.S. Appl. No. 13/801,076, mailed Jul. 11, 2016.
Office Action for U.S. Appl. No. 13/296,182, mailed Jul. 20, 2016.
Restriction Requirement for U.S. Appl. No. 13/296,182, mailed Oct. 12, 2012.
Advisory Action for U.S. Appl. No. 13/296,182, mailed May 8, 2014.
Office Action for U.S. Appl. No. 13/296,182, mailed Feb. 25, 2016.
Advisory Action for U.S. Appl. No. 13/843,192, mailed May 8, 2014.

\* cited by examiner

TEMPORARY GRANT OF REAL-TIME BONUS FEATURE

CROSS-REFERENCE TO RELATED APPLICATIONS

This application is a continuation-in-part of U.S. patent application Ser. No. 13/296,182, filed Nov. 14, 2011 and entitled "Social Gaming," which claims priority to U.S. Provisional Application No. 61/413,477, filed Nov. 14, 2010, and entitled "Social Gaming," both of which are hereby incorporated herein by reference in its entirety for all purposes.

BACKGROUND OF THE INVENTION

Social networks in different forms are becoming exponentially popular, with most of them being slight variations on the well-known MySpace™ (http://www.myspace.com) or Facebook™ (http://www.facebook.com) models. For example, active membership in Facebook™, a popular social networking site, has greater than 500 million users, and comprises everyone from school children to grandparents. Such tools are generally used to post information that can be accessed by other registered users of the system. Unfortunately, the trend of social networking tools has solidified the notion of social networks as a web-page only paradigm, a virtual Rolodex that grows so big that the social network lacks context, and hence relevance.

Gaming establishments are constantly looking for different ways to increase gaming revenue and provide a more satisfying gaming experience for the player. Social networks may provide a social aspect for playing games of chance.

BRIEF SUMMARY

A system, apparatus, and method for establishing a social game between a gaming machine and at least one user is provided. A system, apparatus, and method for a real-time temporal grant of a social bonus game feature between a gaming machine user and at least one available remote user is also provided. In one embodiment, a social gaming server and at least one gaming machine may be in communication with a bonus game manager to facilitate a social real-time bonus game feature game play and distribution of bonus game feature award.

In one embodiment, a gaming system may have a gaming machine configured to: (i) present a primary game of chance on a display of the gaming machine; (ii) determine whether a bonus triggering event is triggered on the primary game of chance; (iii) receive a list of at least one available remote user; (iv) display the list of the at least one available remote user on the display of the gaming machine; (v) detect a selection of the at least one remote user from the list of the at least one available remote user displayed on the display; (vi) transmit the selection of the at least one remote user to a social gaming server; (vii) await, up to a predetermined period of time, for receipt of a bonus game input associated with the bonus game, the bonus game input being initiated by the at least one remote user; and (viii) display results of the bonus game following receipt of the bonus game input.

The gaming system may also have a social gaming server configured to: (i) monitor the primary game of chance presented on the gaming machine; (ii) determine whether the bonus triggering event is triggered on the gaming machine; (iii) generate the list of at least one available remote user for participation in the bonus game; (iv) transmit the list of the at least one available remote user to the gaming machine; (v) receive the selection of the at least one remote user from the gaming machine for distribution of the bonus game feature to the at least one remote user; (vi) distribute the bonus game feature to each of the selected at least one remote user; (vii) await, up to a predetermined period of time, for receipt of a bonus game input associated with the bonus game, the bonus game input being initiated by at least one of the selected remote user; (viii) receive a result of the bonus game; and (ix) transfer the result of the bonus game to the gaming machine and the at least one selected remote user.

In another embodiment, a method for granting a real-time bonus game feature may include presenting a primary game of chance on a display of a gaming machine, determining whether a bonus triggering event is triggered on the primary game of chance, receiving a list of the at least one available remote user, displaying the list of at least one available remote user on the display of the gaming machine, detecting a selection of at least one remote user from the list of at least one available remote user displayed on the display, transmitting the selection of the at least one remote user to a social gaming server for distribution of a bonus game feature to the at least one remote user, awaiting, up to a predetermined period of time, for receipt of a bonus game input associated with the bonus game feature, the bonus game input being initiated by the at least one remote user, and displaying results of a bonus game following receipt of the bonus game input, wherein the bonus game feature is used to play the bonus game.

In another embodiment, a method for facilitating real-time bonus game participation on a social gaming server may include monitoring a primary game of chance on a gaming machine, determining whether a bonus triggering event is triggered on the primary game of chance, generating a list of at least one available remote user, transmitting the list of the at least one available remote user to the gaming machine, receiving selection of the at least one remote user from the gaming machine for distribution of a bonus game feature to the at least one remote user, distributing the bonus game feature to each of the selected at least one remote user, awaiting, up to a predetermined period of time, for receipt of a bonus game input associated with a bonus game, the bonus game input being initiated by the at least one remote user, calculating a result of the bonus game, and transferring the result of the bonus game to the gaming machine and the at least one selected remote user.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION

Embodiments are described herein in the context of social gaming. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with some embodiments, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A system, apparatus, and method for providing a social game environment in which players of gaming machines can interact with other users while playing a game on a gaming machine. The game played on the gaming machine can be referred to as a social game (or a social game session) since remote players can assist the player of the gaming machine in playing the game of chance, an associated social game component of the game of chance, or a separate social game (which can be a game of change or a non-game of chance). In general, the player of the gaming machine can gain assistance (e.g., participation or interaction) from other players that are not located at the gaming machine (i.e., remotely located from the gaming machine). The other players may be eligible to gain awards, points, or the like by assisting the primary player (e.g. the player playing the primary game of chance) and participating in a bonus game of chance. The other players may be referred to as at least one social gaming user, social contact, remote user, and/or remote player.

Figure 1:
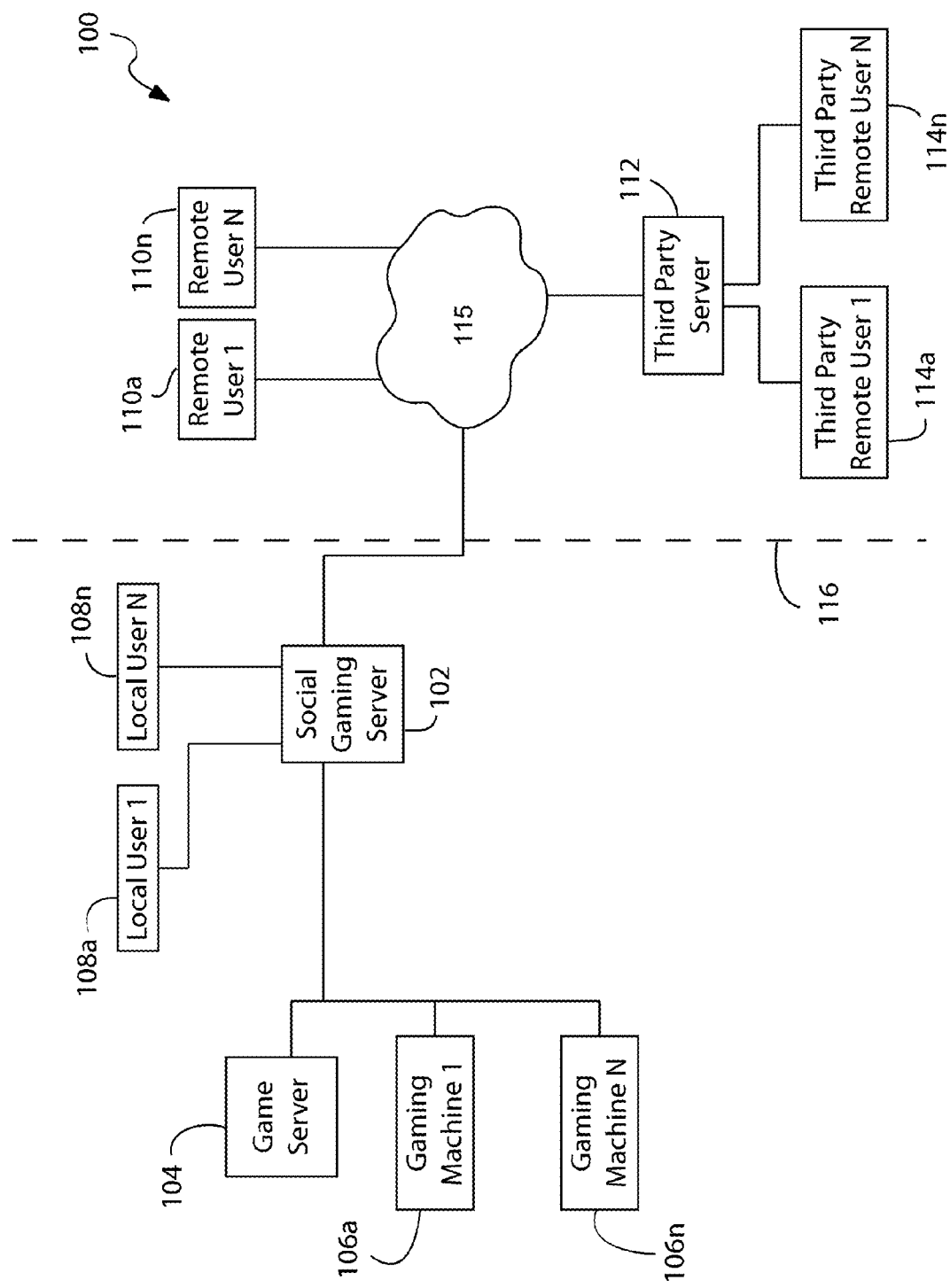
FIG. 1 illustrates an example social gaming system.

FIG. 1 illustrates an example social gaming system. The social gaming system 100 may include a game server 104, at least one gaming machine 106a-106n (where n is an integer), a social gaming server 102, and a third party server 112. The game server 104, the at least one gaming machine 106a-106n, and the social gaming server 102 may be within a local gaming environment. Example gaming environments may be a casino, grocery stores, gas stations, and any other establishment having gaming machines. The gaming environment can include a physical location for gaming and any servers, any gaming machines, and any devices connected to a network 115. For illustrative purposes only, line 116 divides the local gaming environment network from a non-gaming environment network. The local gaming environment network is to the left of the line 116 and the non-gaming environment network is to the right of the line 116.

Communication between the game server 104, the at least one gaming machine 106a-106n, the social gaming server 102, the third party server 112, the local users 108a-108n, and the remote users 110a-110n may be conducted through network 115 via any combination of wired networks, wireless communication technology, and cellular networks. A wired network can use Category 5 cable, Category 6 cable, fiber optic cable, coaxial cable or other cable types typically used for computer networks. Examples of wireless communications technology may include, but is not limited to, Wi-Fi and Bluetooth. Cellular networks may use Code division multiple access (CDMA), Global System for Mobile Communications (GSM), or any other common mobile network standards to transmit data at $2^{nd}$ generation (2G), $3^{rd}$ generation (3G), $4^{th}$ generation (4G), or any other data transmission speeds.

The game server 104 may be any computing hardware typically used for network servers. The game server 104 may have a memory configured to store at least one game of chance and a processor configured to manage the game of chance. The game of chance could be reel-based slot games, video poker, video blackjack, electronic table game, lottery games, or any other games of chance. The game server 104 can be configured to communicate with the at least one gaming machine 106a-106n and the social gaming server 102.

The at least one gaming machine 106a-106n can be configured to play the game of chance, received from the game server 104, and produce game information. The at least one gaming machine 106a-106n may be a slot machine, mobile gaming device, electronic gaming table, electronic blackjack table, electronic roulette table, kiosk, interactive TV, tablet computer, or the like. In one embodiment, the at least one gaming machine 106a-106n may have a main display, a secondary display, a graphical user interface (GUI) displayed or presented on the main display or the secondary display, a ticket-in ticket-out (TITO) system, a bill acceptor, and a player tracking device as further illustrated and discussed in FIG. 9. A player may initiate a social game session using the GUI. The at least one gaming machine 106a-106n may be configured to communicate to other gaming machines and the game server 104.

The social gaming server 102 may have a processor. The processor can be any microprocessor, CPU, multi-core processor or chipset commonly used by network servers for computing. The processor can be configured to communicate with and manage a plurality of social gaming managers. The plurality of social gaming managers may include some or all of the following: a social game session manager, an authentication manager, a social contacts manager, a local social game manager, and a social awards manager as further illustrated and discussed with reference to FIGS. 2A and 2B.

The third party server 112 may be configured to store and manage non-gaming social games. The third party server 112 may authorize a third party remote user 114a-114n or a user device of the third party remote user 114a-114n and connect the third party remote user 114a-114n to the social gaming server 102 to participate in a social gaming. In one embodiment, the third party server can be any social networking server (e.g. Facebook™, MySpace™, LinkedIn™, Twitter™, and the like) and may receive at least a portion of the game information.

In one embodiment, at least one social gaming user can be a remote user 110a-110n. The remote user 110a-110n may be located in a geographical location that is physically separated from or away from the at least one gaming machine 106a-106n and/or the gaming environment. For example, the remote user 110a-110n may be at home and utilize a laptop computer configured to communicate directly with the social gaming server 102 through network 115.

In another embodiment, the at least one social gaming user can be a local user 108a-108n. The local user 108a-108n may be location within or on the premises of the gaming environment. For example, the local user 108a-108n may be located in a restaurant in the gaming environment and can participate in the social game session using a smart phone configured to communicate with the social gaming sever 102. In another example, the local user 108a-108n may be playing on another gaming machine 106a-106n while participating in a social game.

In yet another embodiment, the at least one social gaming user may be a third party remote user 114a-114n. The third party remote user 114a-114n may participate in a social game session via third party server 112. Third party server 112 may then be configured to communicate with the social gaming server 102 via network 115 and be configured to facilitate communication between the third party remote user 114a-114n and the social gaming server 102.

The at least one social gaming user may participant in a social game session using a user device. In one embodiment, the user device can be a computing device such as, but not limited to, a desktop computer, a laptop computer, a tablet computer, or a netbook computer. In another embodiment, the user device may be a portable electronic device such as a cell phone, a smart phone, a portable media player, a portable gaming device, a personal digital assistant or the like. In yet another embodiment, the user device may be another gaming machine.

Figure 2A:
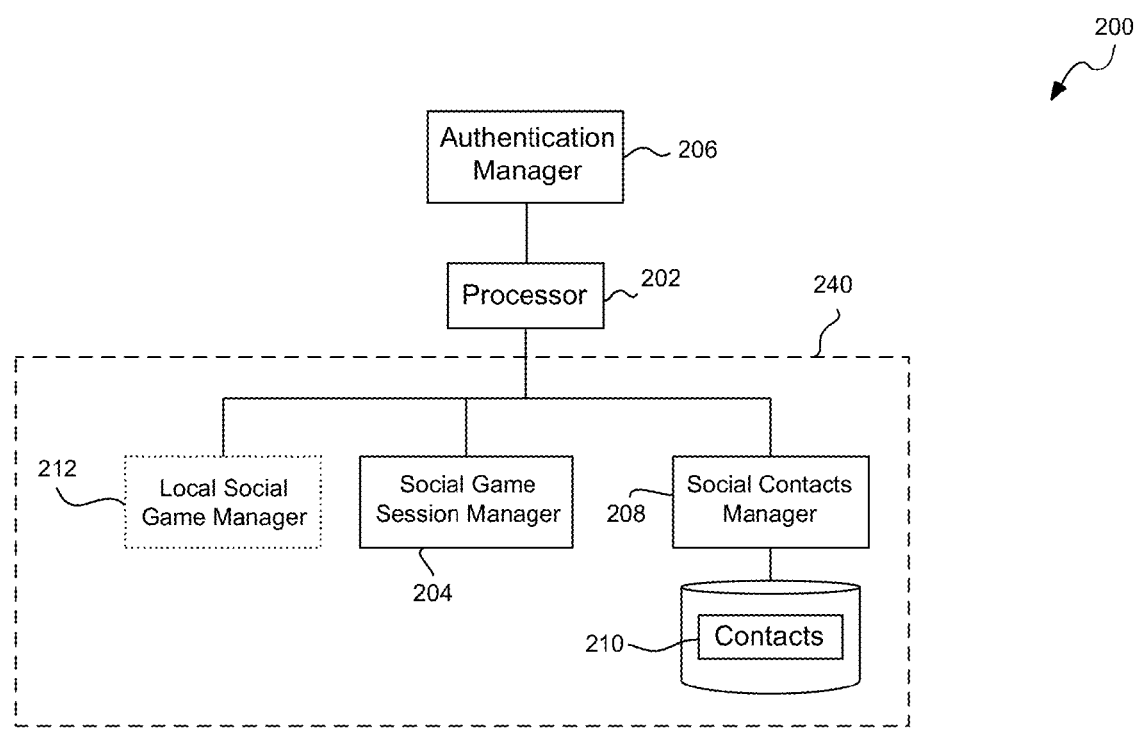
FIGS. 2A and 2B illustrate a block diagram of example embodiments of a social gaming server.

FIG. 2A is a block diagram of one embodiment of a social gaming server. The social gaming server 200 may be similar to gaming server 102 illustrated in FIG. 1. The social gaming server 200 may have a processor 202 configured to control the operations of the social gaming server 200. In one embodiment, processor 202 may communicate with and manage at least one social gaming manager 240. The at least one social gaming manager 240 may include one or more of the following: a social game session manager 204, an authentication manager 206, and a social contacts manager 208.

The social game session manager 204 may be configured to manage a social game session established between a gaming machine and at least one user device via the social gaming server 200. The social game session can enable the social gaming user of the at least one user device to receive current or real-time and/or past game information about a game of chance. The social game session may also enable the social gaming user of the at least one user device to remotely participate in or interact with the game of chance.

Social gaming server 200 may be configured to acquire gaming information from a gaming machine, such as gaming machines 106a-106n illustrated in FIG. 1. The gaming information can be generated by the gaming machine and/or the game server (such as game server 104 illustrated in FIG. 1) as the player plays the game of chance on the gaming machine. As the gaming information is generated, the gaming information can be simultaneously transmitted to and acquired by the social game server 200. The gaming information may then be stored, processed, and managed by the game session manager 204. The gaming information can include any game information generated from playing the game of chance such that the social game session manager 204 can reproduce the game of chance on a display of a user device. For example, the gaming information may include, but is not limited to, number of credits, total amount of time spent playing the gaming of chance at the gaming machine, notification of a win, loss, tie, push, and the like, amount won or lost, wager amount, award earned, notification of a remote input, pay table, and the like. The game information may also be specific to a type of the game of chance being played. For example, if the game of chance is an electronic card game, such as video poker or video blackjack, the game information can include, but is not limited to, cards held by the player, communal cards, and actions taken by the player such as hitting or drawing for new cards. If the game of chance is a slot game, the game information can include, but is not limited to, contents of the reels, lines being played, notification of lines won, and images on the reels.

The social game session manager 204 can be configured to determine at least a portion of game information to be distributed to the at least one user device. In one embodiment, the social game session manager 204 can determine the at least a portion of the game information to be distributed based upon a plurality of user preferences. The plurality of user preferences may be any configuration desired by a user that may be stored on the social gaming server 200, the social game session manager 204, or any other memory device or server device. The plurality of user preferences may be any specific preferences desired such as, the type of gaming information the user would like to see and when. For example, Bob may only want to know when Tom has earned a non-gaming award when playing a game on the gaming machine. When Tom earns a non-gaming award while playing the gamine of chance, the social game server 200 may transmit the gaming information about the non-gaming award to Bob. However, the social game server 200 may not transmit the fact that Tom also won $100.00.

In another example, the social game session manager 204 may be configured to determine which gaming information is considered to be "significant". The significant event could be, for example, winning a jackpot, the player cashed out of the gaming machine, hitting a royal flush, entering a bonus game, and the like. In another example, the social game session manager 204 may determine to transmit all the gaming information.

In one embodiment, the gaming information may be transmitted from the social gaming server 200 to the users via any known methods, such as streaming the gaming information.

The authentication manager 206 may be configured to authenticate a user. In one embodiment, the authentication manager 206 may authenticate the user by confirming validity of a password, biometric identifier, personal identification number(s), or the like. Following authentication, the authentication manager 206 may signal the social game session manager 204 to establish the social game session between the gaming machine and the user device of the user. In another embodiment, a third party server, such as third party server 112 illustrated in FIG. 1, may authenticate the user by confirming validity of a password, biometric identifier, personal identification number(s), or the like. The third party server may then transmit an approved or disapproved notification to the social gaming sever 200.

If the user is authenticated, the authentication manager 206 may transmit an approval notification to the social game session manager 204. The social game session manager 204 may then establish a social game between the gaming machine and a user device of at least one social gaming user.

In one embodiment, the authentication manager 206 may be configured to authenticate the user device based upon an identifier, such as a MAC address, confirming validity of a key file (which may or may not be encrypted) stored on the user device, hashing and comparing contents of the key file to a record maintained by the authentication manager 206, or any other commonly used methods of verifying the validity of a data file. In yet another embodiment, the authentication manager 206 may authenticate the user device using a unique address, such as a short code or a web link.

The social contacts manager 208 may be configured to store and/or manage one or more social contacts for a player playing the game of chance on a gaming machine. In one embodiment, the one or more social contacts may be stored in a contacts database 210. In another embodiment, the one or more social contacts may be stored on a third party server, such as third party server 112 illustrated in FIG. 1. For example, the third party server may be a social networking server configured to store, manage, and associate contacts with the player playing the game of chance on the gaming machine. The social contacts manager may be configured to add contacts, delete contacts, search for contacts, block contacts, and other similar administrative functions as desired by the user. The social contacts manager 208 may be configured to populate a social contact list presented on a GUI of the gaming machine or user device.

The social game server 200 may optionally have a local social game manager 212. The local social game manager 212 may be configured to manage non-gaming social games. Non-gaming social games may be any type or kind of game that is not a game of chance utilizing a random number generator and/or any type of game where prizes are not monetary. For example, a non-gaming social game may be a "Hotel Management" simulation game, where different players can build and run a hotel.

Figure 2B:
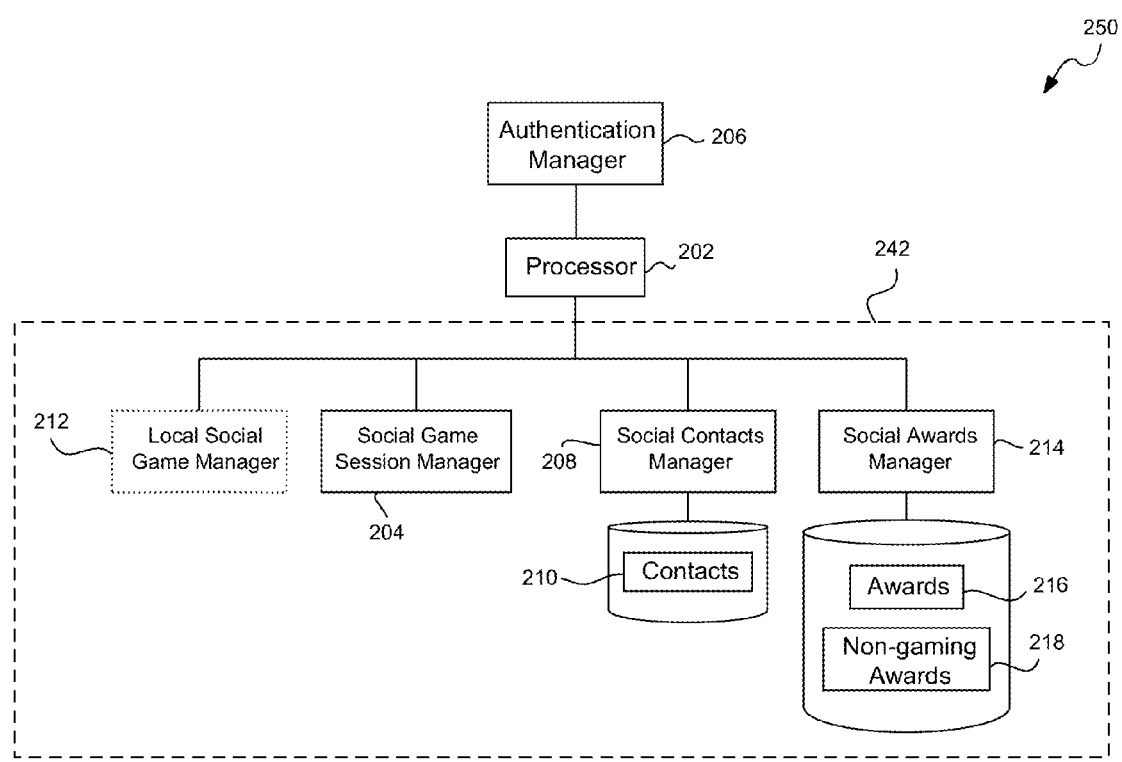

FIG. 2B illustrates a block diagram of another embodiment of a social gaming server. The social gaming server 250 may be similar to the social gaming server 200 illustrated in FIG. 2A, except that the at least one social gaming manager 242 may include a social awards manager 214. The social awards manager 214 may be configured to determine whether an award has been triggered or earned in a game of chance and the type of award won. The triggering event and the type of award won may be based on the type and theme of game played. For example, an award may be triggered for winning a particular round of the game of chance, winning a certain number of times over a predetermined period of time, winning a certain amount of credits in a particular round of the game of chance, winning a certain monetary amount, obtaining a royal flush, and the like.

In another embodiment, an award triggering event may be a loss. For example, an award may be triggered by losing a particular round of the game of chance, losing a certain number of times over a predetermined period of time, losing a certain amount of credits in a particular round of the game of chance, losing a certain total monetary amount, or the like.

In yet another embodiment, an award may be triggered by achieving or obtaining a particular outcome. For example, in a slot game, an award triggering event may be obtaining six cherry symbols on a plurality of reels without winning a payline. In another example, in a video poker game of chance, an award may be triggered by obtaining a pair of queens in five consecutive hands.

The social awards manager 214 can be configured to generate the award if an award triggering event has occurred. The award can be any type of gaming or non-gaming award and may be based on the type and theme of game. A gaming award may be, for example, a monetary award, at least one free spin, a multiplier, earning a plurality of points, triggering a bonus event, and the like. A non-gaming award can be, for example, a digital enhancement for the social gaming user interface on the user device and/or on the gaming machine. The digital enhancement can be a wallpaper, a background, a song, new avatar, a picture, any type of other visual and/or auditory aesthetic prizes, movie tickets, food coupons, and the like. The non-gaming award may also be a virtual good. The virtual good can be used in a non-gaming social game hosted by a third party server or the local social game manager 212 of the social gaming server 250. The social awards manager 214 may store the gaming awards in an awards database 216 and the non-gaming awards in a non-gaming awards database 218.

The social awards manager 214 can be configured to determine if the award is to be transferred to a remote recipient. In one embodiment, the social awards manager 214 can determine if the award is to be transferred if the social awards manager 214 receives a user transfer request to transfer the award to another player. The user transfer request can be made by the user currently in possession of the award. In another embodiment, the social awards manager 214 may receive a remote transfer request for the award by a social gaming user not in possession of the award. The social awards manager 214 may transmit the request to the user currently in possession of the award and await approval of the transfer request from the user currently in possession of the award. If the social awards manager 214 receives an approval for the transfer request, the social awards manager 214 may transfer the award to the social gaming user. The social awards manager 214 can be configured to modify ownership of the award entry in either the awards database 216 or the non-gaming awards database 218. If a denial for the transfer request is received by the social awards manager 214, then the social awards manager 214 determines not to transfer the award.

Figure 3:
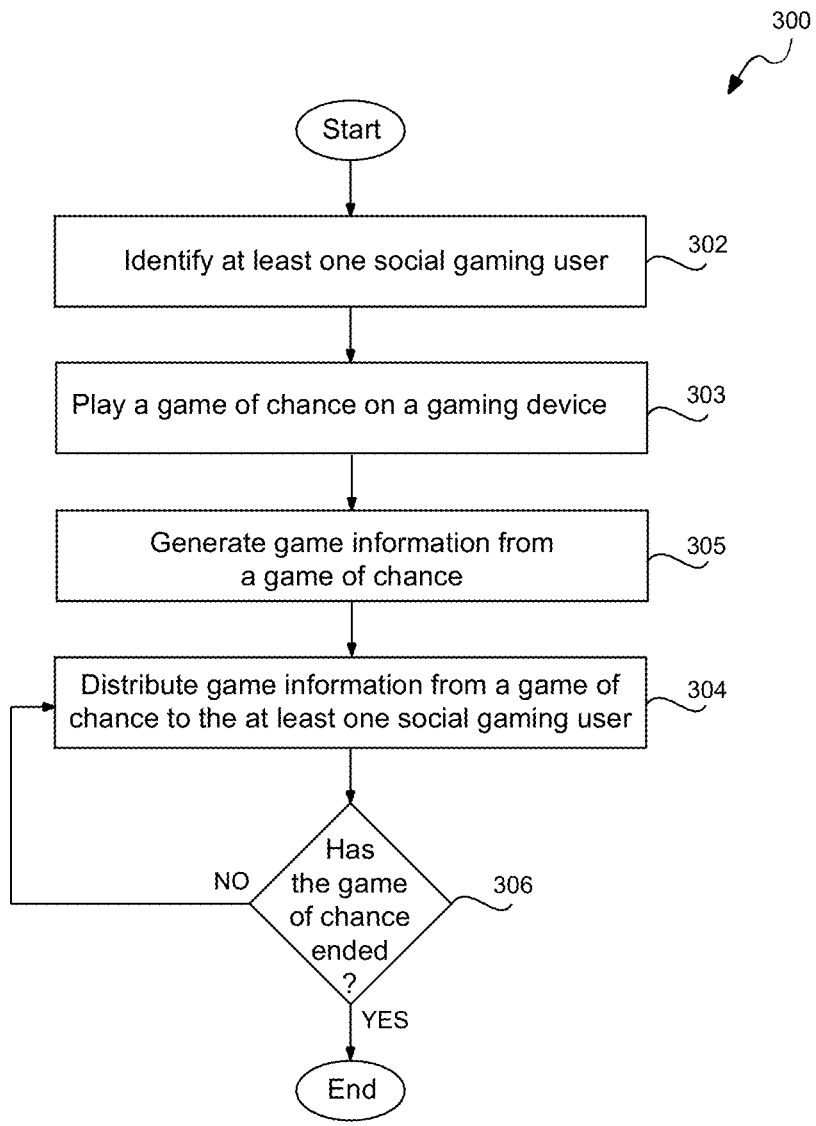
FIG. 3 illustrates a flow diagram of an example method for distributing game information.

FIG. 3 illustrates a flow diagram of an example method for distributing game information. A method for distributing at least a portion of game information 300 may be performed by a social gaming server such as social gaming server 102 illustrated in FIG. 1, social gaming server 200 illustrated in FIG. 2A, or social gaming server 250 illustrated in FIG. 2B. The gaming information may originate from a gaming machine located within a gaming environment, from a game server such as game server 104 illustrated in FIG. 1, or any other gaming server or machine.

The method of distributing at least a portion of game information 300 can begin by identifying at least one social gaming user at 302. In one embodiment, the social gaming server may identify the at least one social gaming user based upon player input received from a player playing a game of chance. Input can be performed on a gaming machine such as a portable or mobile gaming device, electronic gaming table, electronic blackjack table, electronic roulette table, kiosk, interactive television, tablet computer, or the like. For example, the player playing a game of chance may select at least one social gaming user from a social contact list as, for example, illustrated in FIGS. 10-13. In another example, the player may input information about the at least one social gaming user for storage in a contacts database (as illustrated in FIGS. 2A and 2B). The player input may consist of a name, a username, an alias, an email address, a phone number, an account number, an IP address or other similar information specific to a particular individual. The player input may then be transmitted to the social gaming server.

Once player input is received by the social gaming server, the social gaming server may, in one example, identify the at least one social gaming user from the selection by comparing the input to a list of contacts stored in the contacts database. In another embodiment, the input may be compared with a list of contacts in a third party server. The user input may be transmitted to the third party server which may compare the input with a list of contacts stored at the third party server.

A game of chance may be played on a gaming machine at 303. Game information may be generated for the game of chance at 305 as the player plays the game of chance. In one embodiment, game information may be generated from the gaming machine. In another embodiment, game information may be generated from a game server (as illustrated in FIG. 1). For example, the gaming information may include, but is not limited to, number of credits, total amount of time spent playing the gaming of chance at the gaming machine, notification of a win, loss, tie, push, and the like, amount won or lost, wager amount, award earned, notification of a remote input, pay table, and the like. The game information may also be specific to a type of the game of chance being played. For example, if the game of chance is an electronic card game, such as video poker or video blackjack, the game information can include, but is not limited to, cards held by the player, communal cards, and actions taken by the player such as hitting or drawing for new cards. If the game of chance is a slot game, the game information can include, but is not limited to, contents of the reels, lines being played, notification of lines won, and images on the reels.

As the game information is generated, the game information can be simultaneously transmitted to and acquired by the social game server (as illustrated in FIGS. 1, 2A, and 2B) for distribution to at least one social gaming user at 304. At least a portion of the gaming information may be distributed by any known method. In one example, at least a portion of the gaming information may be posted to the at least one social gaming user. The social game session manager may transfer the game information to a third party sever (as illustrated in FIG. 1). The third party server may be, for example, any known social gaming server or any other server accessible over a network. The third party server can post the gaming information to a webpage, a feed, a notification board, or the like. The at least one social gaming user can retrieve the game information from the webpage, the feed, the notification board, or the like.

In another embodiment, the at least a portion of the gaming information may be electronically transmitted to the at least one social gaming user via electronic mail. In yet another embodiment, the at least a portion of the gaming information may be streamed. Streaming results may result in a real time reproduction display of the game of chance. As action occurs in the game of chance, the real time reproduction display will mirror the display of the gaming machine. The streaming can be supplemented by any combination of textual, audio, or visual information.

A determination of whether the game of chance has ended is made at 306. The game of chance may end if the player decides to stop playing the game of chance. The game of chance also may end if no credits for playing the game of chance are left. If the game of chance has not ended, the at least a portion of the gaming information may continue to be distributed to the at least one social gaming user at 304.

Figure 4:
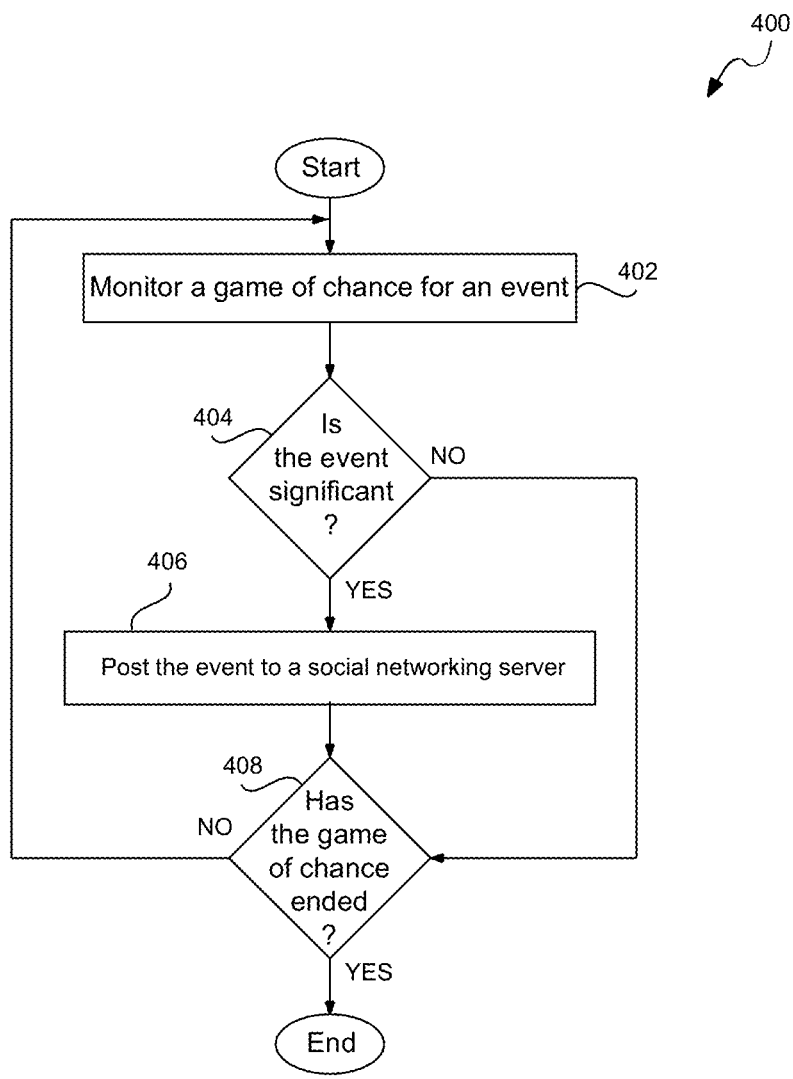
FIG. 4 illustrates a flow diagram of an example method for posting an event to a social networking server.

FIG. 4 illustrates a flow diagram of an example method for posting an event to a social networking server. A method for posting an event to a social networking server 400 can be performed by a social gaming server (as illustrated in FIGS. 2A and 2B). The method 400 may begin by monitoring a game of chance for an event at 402. In one embodiment, the monitoring may be performed by a social game session manager (as illustrated in FIGS. 2A and 2B) of the social gaming server. For example, as a player plays the game of chance, game information from the game of chance may be transmitted from a gaming machine to the social game session manager of the social gaming server. In another embodiment the gaming machine can transmit the game information to the game server. The game server can then transfer the game information to the social game session manager of the social gaming server. Upon receipt of the game information, the social game session manager may parse the game information for events. The event may be a win, a loss, an earned award, the player switching to a different game of chance, the player cashing out, the player placing a large wager, the player performing a game action such as spinning reels or doubling down, or any other activity that may occur while playing a game of chance.

If the event is "significant" at 404 the significant event may be posted or transmitted to a social networking server at 406. In one embodiment, the significant event could be, for example, winning a jackpot, the player cashed out of the gaming machine, hitting a royal flush, entering a bonus game, and the like. In another embodiment, the significance of the event can be determined by the player of the game of chance or at least one social gaming user. For example, the player or social gaming user may select specific events from a significant event list as what he or she considers to be significant.

The social networking server may be the social gaming server, a third party server, or any other server. The social networking server can post the information to a webpage, a feed, a notification board, or the like. The at least one social gaming user can then retrieve the information from the webpage, the feed, the notification board, or the like.

If the event is not significant at 404 or the event has been posted to the social networking server at 406, a determination of whether the game of chance has ended is made at 408. In one embodiment, the game of chance may end if the player decides to stop playing the game of chance. The game of chance also may end if there are no more credits to play the game of chance.

Figure 5:
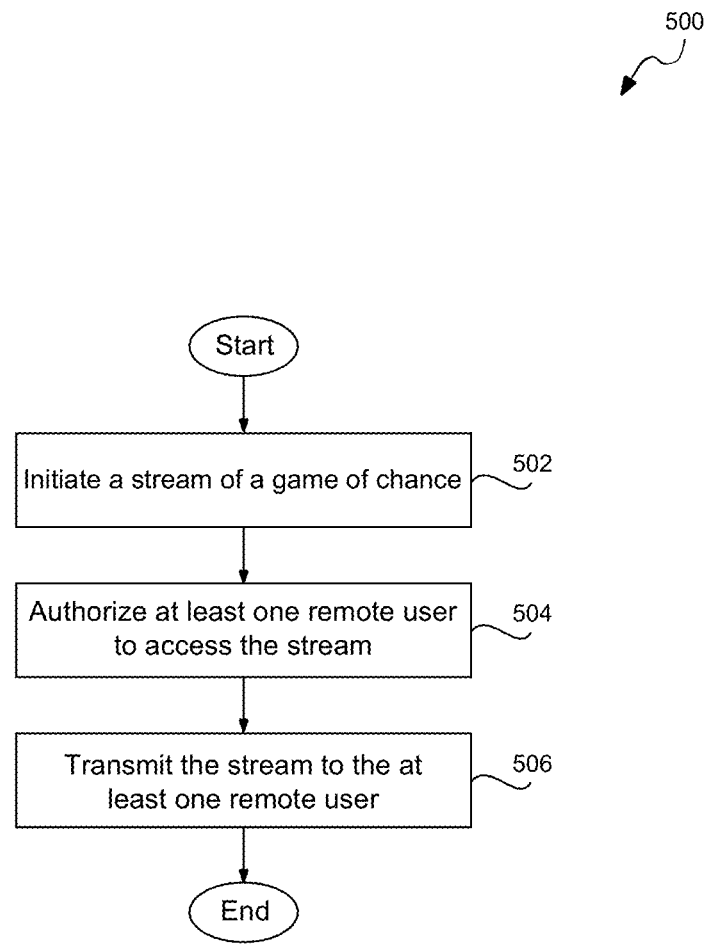
FIG. 5 illustrates a flow diagram of an example method for streaming at least a portion of gaming information to reproduce and present a game of chance on a display.

FIG. 5 illustrates a flow diagram of an example method for streaming at least a portion of gaming information to reproduce and present a game of chance on a display. The method 500 may be performed by the social gaming server (as illustrated in FIGS. 1, 2A, and 2B). A streaming of the game of chance may be initiated at 502. In one embodiment, the social gaming server may generate the gaming information for a game of chance. Once generated, the gaming information may be streamed to reproduce the game of chance on a display of a user device. In one embodiment, the stream may be initiated when a player begins to play the game of chance. The game of chance may be played on any type of gaming machine, portable or mobile gaming device, electronic gaming table, electronic blackjack table, electronic roulette table, kiosk, interactive TV, tablet computer, or the like. In another embodiment, the streaming of the game of chance may be initiated following receipt of an input by the player playing the game of chance to begin streaming. For example, the player may initiate the streaming of the game of chance by selecting a streaming option on the GUI.

The streaming of the gaming information may result in a real time reproduction of the game of chance on a display of a user device. As activity occurs as the player plays the game of chance, gaming information is generated whereby at least a portion of the game information may be streamed to a user device of at least one social gaming user. When the at least a portion of the gaming information is streamed to the at least one social gaming user, everything presented on the gaming machine may be reproduced and instantiated on a display of a user device of the at least one social gaming user.

In one embodiment, the at least a portion of the gaming information may be transmitted via a video feed. A camera positioned on the gaming machine may capture the activity of the game of chance in the video feed. The video feed can be encoded and prepared for streaming using any codec or technology commonly used to stream video over a network such as, but not limited to, Flash video and HTML 5. In another embodiment, the at least a portion of the gaming information may be transmitted via a digitally animated recreation of the game of chance. The streaming of the at least a portion of the gaming information may include any combination of textual, audio, or visual information.

At least one remote user may be authorized to access the stream at 504. The at least one remote user may be a social contact associated with the player playing the game of chance. In one embodiment, the at least one remote user may be stored in a contacts database maintained by a social contacts manager of the social gaming server (as illustrated in FIGS. 2A and 2B). The social gaming server may verify or authenticate the at least one remote user by comparing the at least one remote user to a list of social contacts in the contacts database.

In another example, the at least one remote user may be compared to a list of contact stored in a third party server. For example, the third party server can be any social networking server that manages contacts. The social gaming server can transmit a verification request to the third party server. A confirmation or non-confirmation may be transmitted to the social networking server from the third party server. Upon receipt of a confirmation or verification from the third party server, the social gaming server may authorize the at least one remote server to access the stream at 504.

In another embodiment, the at least one remote user need not be a social contact and may be authorized to access the stream via an identifier. The identifier can be a password, personal identification number (PIN), code, key file, or other similar form of identification or identifier. For example, if remote player A is sitting next to player B paying a game of chance and player A would like to view Player B's game, Player A may transmit a request to view Player B's game of chance to the social gaming server. The social gaming server can transmit a request for identification to the at least one remote user via electronic mail, text message, phone call, or any other identification and/or verification methods. For example, the social gaming server may transmit a request for Player B's player tracking number and PIN. Player B may input and transmit the information to the social gaming server. The social gaming server may then compare and/or verify Player B's information with information stored in the social gaming server, player tracking server, or any other server or database.

In still another embodiment, the identifier can also be a unique shortcode address or a unique URL. The unique shortcode address or the unique URL may be generated by the social gaming server. The social gaming server can transmit the unique shortcode address or the unique URL to a phone number, an email address, or the like, provided by the player. Upon receipt of the identifier, the at least one remote user may access the stream of the game of chance using the identifier. In other words, at least a portion of the gaming information may be streamed to a user device of the at least one remote user when the at least one remote user accesses the identifier.

Figure 6:
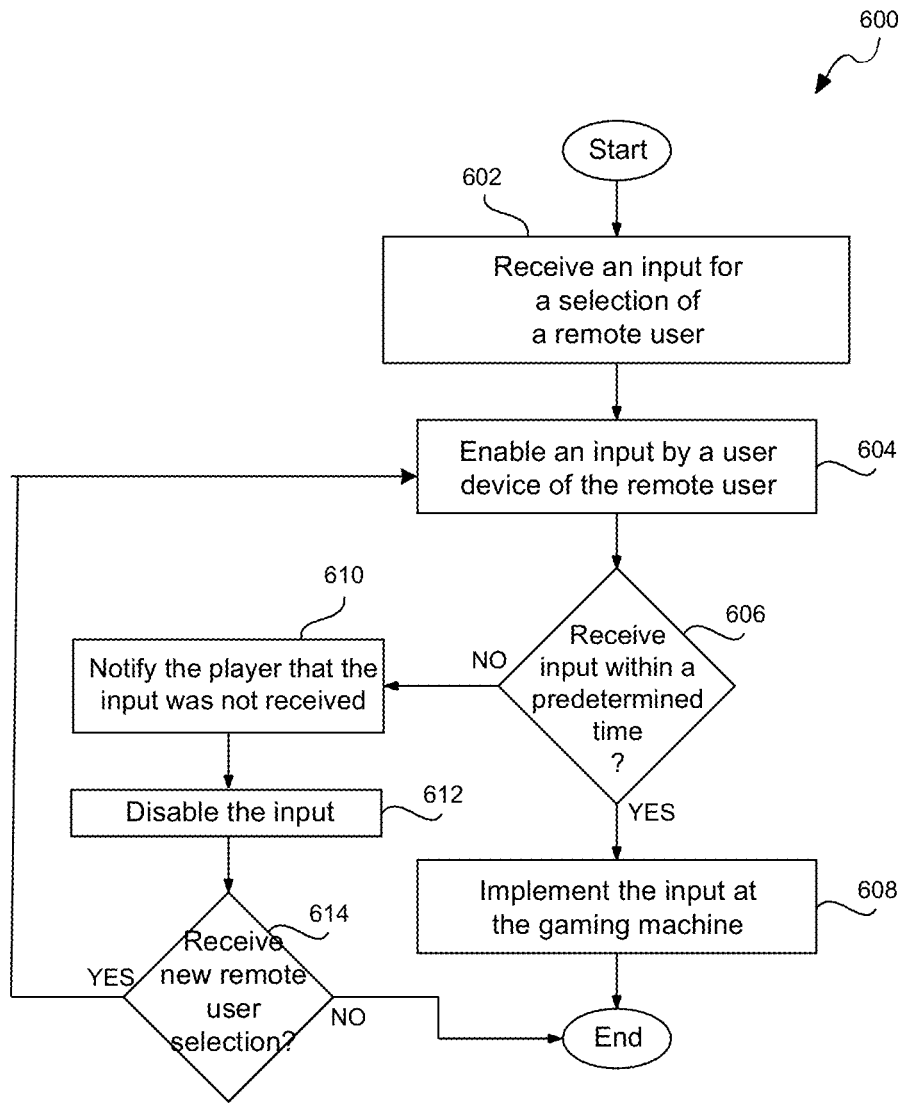
FIG. 6 illustrates a flow diagram of an example method for selecting a remote user.

FIG. 6 illustrates a flow diagram of an example method for selecting a remote user. The method 600 can be performed by the social gaming server (as illustrated in FIGS. 1-2) or any other server. An input for a selection of a remote user may be received at 600. The remote user may be any social gaming user as described above such as the local user, remote user, or third party user as illustrated in FIG. 1. The remote user may be selected to participate or interact in a game of chance.

The input for a selection of a remote user may be made from a social contact list (illustrated in FIGS. 10-13) presented or displayed on a GUI of the gaming machine. The gaming machine can transmit the input to the social gaming server, game server, or any other server. In another embodiment, the input may be a username, an alias, an email address, a phone number, or some other identifier that identifies the remote user.

Once the input for a selection of a remote user is received at 602, input by a user device of the remote user may be enabled at 604. Enabling the input may allow the remote user to participate, interact, and/or observe the game of chance. The input may be based on the type and theme of game. For example, by enabling input from the user device, the remote user may participate by spinning a bonus spin in a social gaming session. In another example, enabling input from the user device may allow the remote user to "hit", "double down", or "stay" in a blackjack social gaming session.

A determination is then made as to whether input is received from the remote user within a predetermined period of time at 606. The predetermined period of time may be set by the social gaming server, the player, or any other device or person. If input from the remote user is received within a predetermined period of time at 606, the input may be implemented at the gaming machine at 608. For example, if the remote user participates by spinning a bonus spin, the reels may be presented as spinning on the gaming machine. In another example, if the input received from the remote user is a "hit" for a video blackjack game of chance, the player may receive another card in the video blackjack game. In another example, if the game of chance is video poker, the input received from the remote user may be to draw at least one card. Thus, an additional card may be provided and displayed on the gaming machine.

If no input is received from the remote user at 606, the player may be notified that no input was received at 610, the input may be disabled at 612, and a determination may be made as to whether a new remote user selection was received at 614. In one embodiment, the player can receive a notification, such as an alert, a popup, a message, or any other form of notification, on a GUI of the gaming machine. In another embodiment the notification may occur on a user device of the player such as a text message. The notification may contain any combination of text, graphics, symbols, or indicia to notify the player that no input was received from the remote user. If a new remote user selection was received at 614, input for the user device of the remote user may be enabled at 604.

Figure 7:
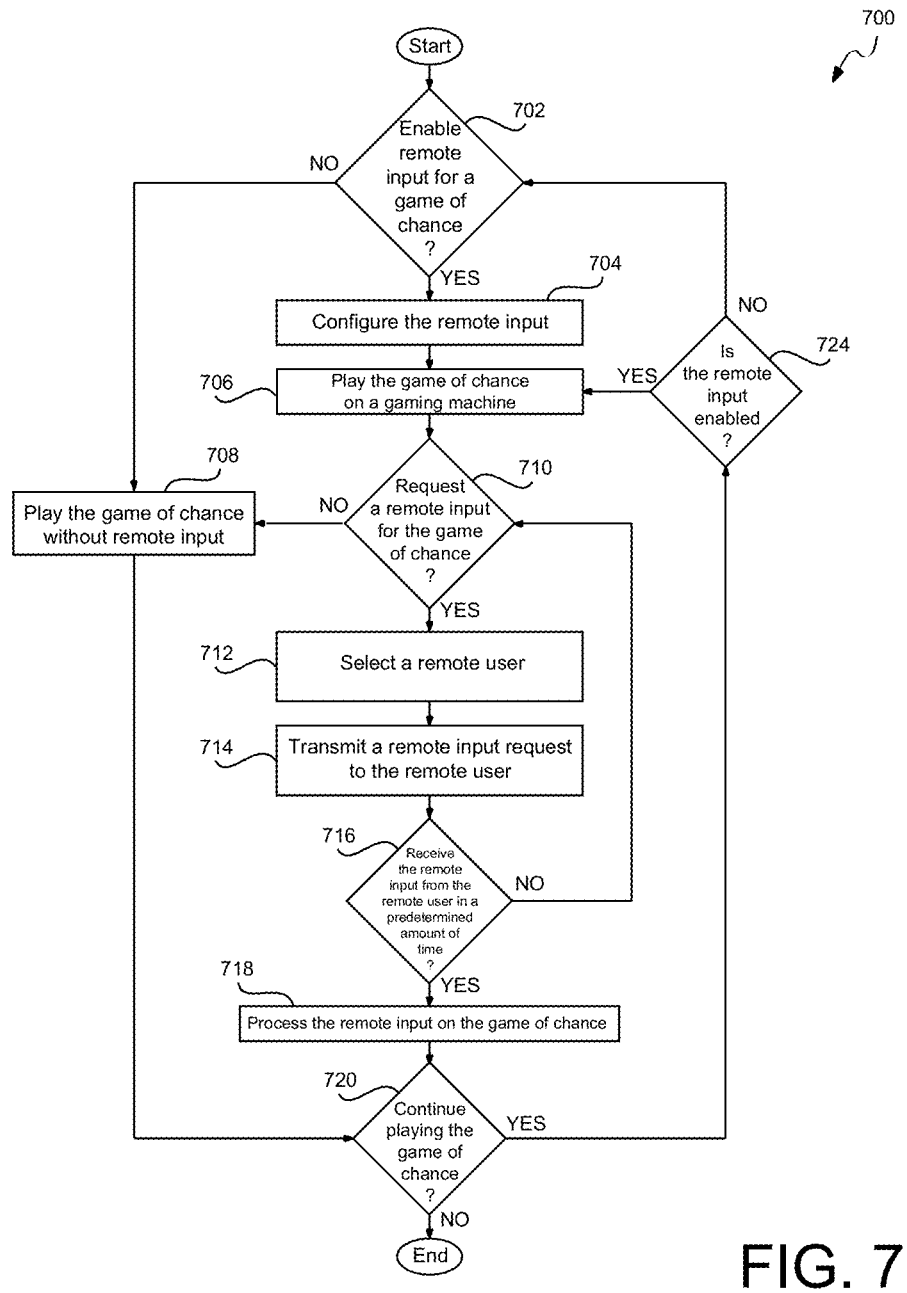
FIG. 7 illustrates a flow diagram of an example method for playing a game of chance with remote participation.

FIG. 7 illustrates a flow diagram of an example method for playing a game of chance with remote participation. A game of chance may be played on, for example, a gaming machine. The gaming machine may be a slot machine, mobile gaming device, electronic gaming table, electronic blackjack table, electronic roulette table, kiosk, interactive television, tablet computer, or the like. The method 700 may begin with a determination of whether a remote input or participation for a game of chance should be enabled at 702. In one embodiment, the gaming machine may enable the remote input by prompting the player to enable the remote input using the GUI. The gaming machine may then await for confirmation of the remote input from a remote user or at least one social gaming user. In another embodiment, the gaming machine may not have to prompt the user. The gaming machine can enable the remote input upon receipt of a remote input enablement request from the player without the user being prompted.

If it is determined the remote input should be enabled 702, the remote input can be configured at 704. The configuring may customize what remote input is available and tailor the remote input to a type of the game of chance. For example, if the game of chance is video blackjack, the remote input may be configured to limit the remote input to a blackjack action such as hit, stand, double down, split, or other actions associated with a game of blackjack. Configuring the remote input may also initiate a steaming of the gaming information to a user device as discussed above with reference to FIG. 5.

The player may play the game of chance on a gaming machine at 706. As the player plays the game a chance, a determination may be made as to whether a request for remote input for the game of chance be made at 710. In other words, as the player plays the game of chance, events may occur whereby the player would like participation or help from at least one social gaming user. In one embodiment, the player may request that a social gaming user assist or participate in playing the game of chance. In another embodiment, the gaming machine may prompt and ask the player whether he or she would like to allow others to assist in playing the game of chance. The gaming machine can offer the player the option to request the remote input for every gaming action, for a random gaming action, or for a predetermined gaming action. The player can accept or deny the remote input request prompt.

If it is determined that the remote input for the game of chance is requested at 710, a remote user may be selected at 712 to participate in the game of chance. In one embodiment, the remote user may be at least one social gaming user stored in a contacts database (as illustrated in FIGS. 2A and 2B). The player can make a selection of the remote user in a social contact list presented on a GUI (as illustrated in FIGS. 10-13). In another embodiment, the player can select the remote user by entering a username, an alias, an email address, a phone number, or some other identifier that identifies the remote user.

A remote input request may then be transmitted to the remote user at 714. The remote user may receive the remote input request on a user device such as a computing device, a portable electronic device, or another gaming machine. The remote user may then deny or accept the remote input request.

If remote input from the remote user is received within a predetermined period of time at 716, the remote input may be processed and used to play the game of chance at 718. In one embodiment, the remote input may be an acceptance of the remote input request transmitted at 714. In another embodiment, the remote input may be an action to play the game of chance.

For example, if the game of chance is a slot game, the remote input requested may be to initiate a free spin. In another example, if the game of chance is video blackjack, the remote input requested can be to hit, stay, or double down. The remote input may be any input to advance the game of chance.

If no input from the remote user is received within a predetermined period of time at 716, another determination may be made as to whether the player would like to request remote input for the game of chance at 710.

A determination may be made as to whether playing the game of chance is to continue at 720. The game of chance may continue if the player makes another wager, if the player won a bonus game, if additional bonus awards were won, and the like. Another determination of whether the remote input is enabled is made at 724.

Figure 8:
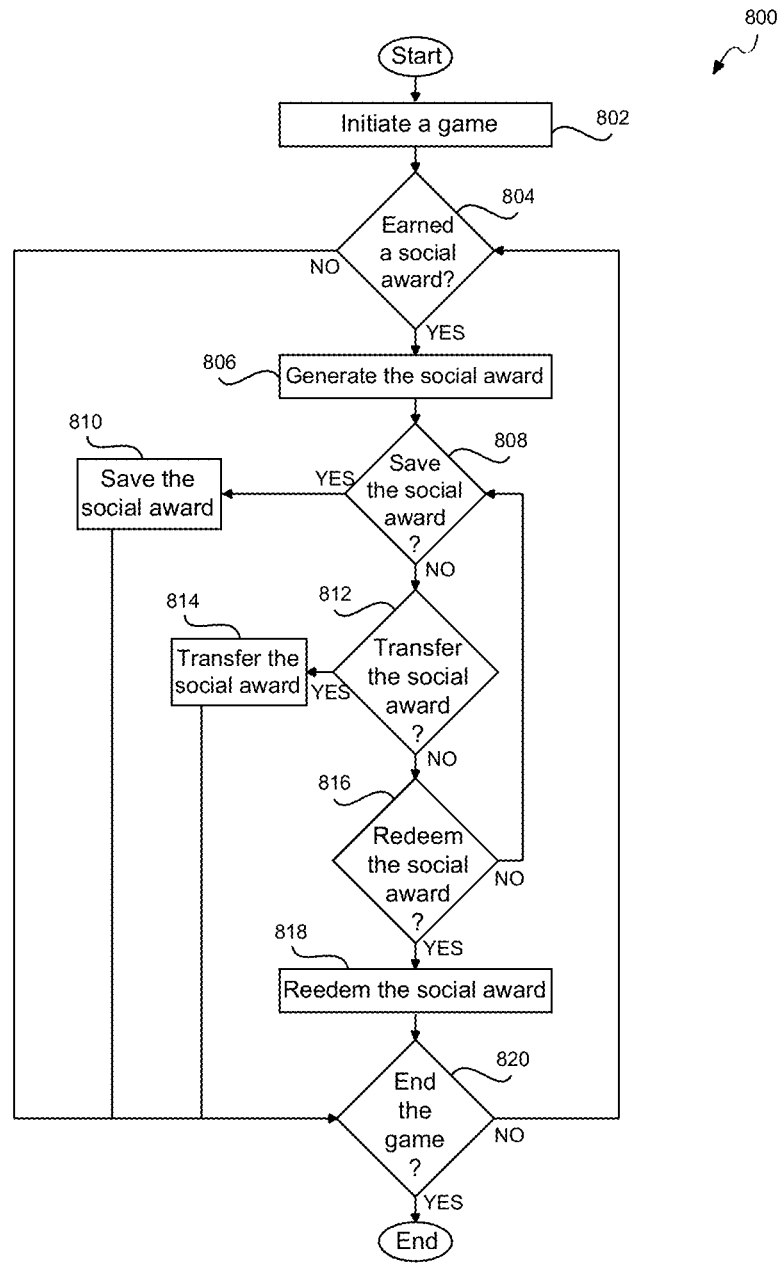
FIG. 8 illustrates a flow diagram of an example method for managing social awards.

FIG. 8 illustrates a flow diagram of an example method for managing social awards. The method 800 may begin by initiating a game at 802. In one embodiment the game is a game of chance. The game of chance can be any type of primary game of chance such as reel-based slot games, video poker, video blackjack, lottery games, electronic table games, or any other games of chance. The game of chance may be initiated on a gaming machine following receipt of a wager from a player. In another embodiment, the game is a non-gaming social game. The non-gaming social game may be hosted by a third party server, a local social game manager of a social gaming server (as illustrated in FIGS. 2A and 2B), or any other server capable of hosting and managing a non-gaming social game. The non-gaming social game may initiated upon accessing or logging into the third party server, a local social game manager, or any other server capable of hosting and managing a non-gaming social game.

Once initiated, a determination is made as to whether a social award is earned at 804. A social award may be earned by any known award triggering events based on the type or theme of game. For example, an award may be triggered for winning a particular game session, winning a certain number of times over a predetermined period of time, winning a certain amount of credits in a particular round of the game, winning a certain monetary amount, achieving a certain game pattern, achieving a free bonus round, winning a certain total monetary amount, obtaining a royal flush, or the like.

In another embodiment, an award triggering event may be a loss. For example, an award may be triggered by losing a particular round of the game of chance, losing a certain number of times over a predetermined period of time, losing a certain amount of credits in a particular round of the game of chance, losing a certain total monetary amount, or the like.

In yet another embodiment, an award may be triggered by achieving or obtaining a particular outcome. For example, in a slot game, an award triggering event may be obtaining six cherry symbols on a plurality of reels without winning a pay line. In another example, in a video poker game of chance, an award may be triggered by obtaining a pair of queens in five consecutive hands.

If a social award is earned at 804, the social award may be generated at 806. In one embodiment, a social awards manager (as illustrated in 2B) may be configured to generate the type of social award won. The award can be any type of gaming or non-gaming award. A gaming award may be, for example, a monetary award, at least one free spin, a multiplier, earning a plurality of points, triggering a bonus event, and the like. A non-gaming award can be, for example, a digital enhancement for the social gaming user interface on the user device and/or on the gaming machine. The digital enhancement can be a wallpaper, a background, a song, new avatar, a picture, any type of other visual and/or auditory aesthetic prizes, movie tickets, food coupons, and the like. The non-gaming award may also be a virtual good. The virtual good can be used in a non-gaming social game hosted by a third party server or the local social game manager of the social gaming server. The social awards manager may store the gaming awards in an awards database and the non-gaming awards in a non-gaming awards database.

A determination may be made to save the social award at 808, transfer the social award at 812, or redeem the social award at 816. If the player would like to save and keep the social award, the social award may be saved at 810. In one embodiment, the social award may be saved in an awards database or non-gaming awards database (as illustrated in FIG. 2B) based upon the type of award. In another embodiment, the social award may be saved in a third party server (as illustrated in FIG. 1). When saved, the social award may be associated with the player.

If the social award is not saved at 808, the social award may be transferred at 812. In one embodiment, the social awards manager can be configured to determine if the award is to be transferred to a remote recipient. In one embodiment, the social awards manager can determine if the award is to be transferred if the social awards manager receives a user transfer request to transfer the award to another player. The user transfer request can be made by the user currently in possession of the award. In another embodiment, the social awards manager may receive a remote transfer request for the award by a social gaming user not in possession of the award. The social awards manager may transmit the request to the user currently in possession of the award and await approval of the transfer request from the user currently in possession of the award. If the social awards manager receives an approval for the transfer request, the social awards manager may transfer the award to the social gaming user at 814. The social awards manager can be configured to modify ownership of the award entry in either the awards database or the non-gaming awards database. If a denial for the transfer request is received by the social awards manager, then the social awards manager determines not to transfer the award at 812.

When the social award is not transferred at 812, a determination is made whether to redeem the social award at 816. In one embodiment, the social awards manager can be configured to determine if the award is to be redeemed. For example, the player or at least one social gaming user may be prompted to redeem the social award or not. The player or at least one social gaming user may then deny or accept the prompt. If an acceptance to redeem the social gaming award is received at 816, the social award may be redeemed at 818. If a denial to redeem the social gaming award is received at 816, the determination as to whether to save the social award at 808 may be repeated.

Once the social award is redeemed at 818, a determination as to whether to end the game may be made at 820. The game may end if the player decides to stop playing the game, no credits remain, the game ends, or the like.

Figure 9:
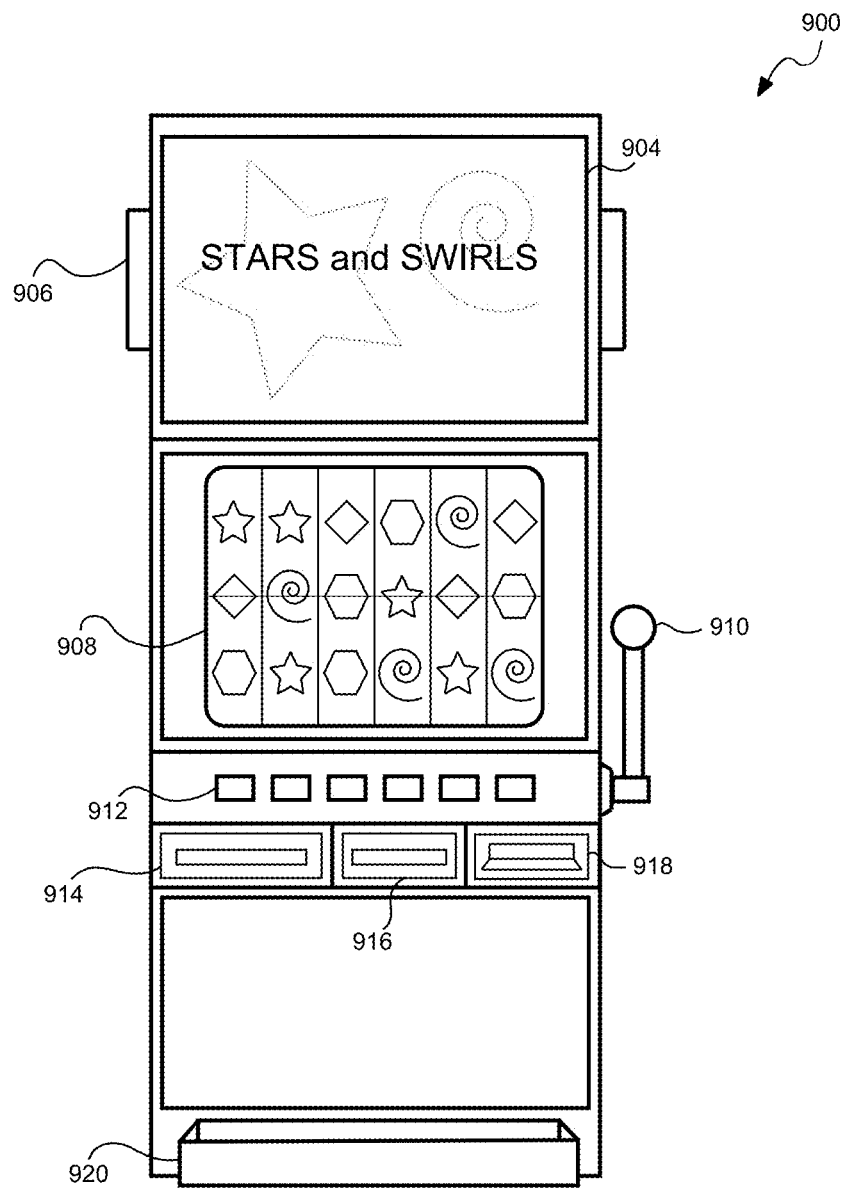
FIG. 9 illustrates a front view of an example gaming machine.

FIG. 9 illustrates a front view of an example gaming machine. Although the example gaming machine is illustrated as a slot machine, this is not intended to be limiting as the gaming machine may be a slot machine, mobile gaming device, electronic gaming table, electronic blackjack table, electronic roulette table, kiosk, interactive television, tablet computer, or the like. A gaming machine 900 may have a main display 908. The main display 908 may display any type of primary game of chance upon receipt of a wager from a player. For example, the main display 908 may display reel-based slot games, video poker, video blackjack, lottery games, or any other games of chance. In one embodiment, the main display 908 may display other types of text and graphics, including videos, pay tables, advertisements, secondary games, bonus games, player tracking information, announcements, or any other type of text and graphic.

The gaming machine 900 may have a player interface to play the primary game of chance and interact with the social gaming interface. In one embodiment, the player interface may include any type of actuating device such as buttons 912 or a lever 910. In another embodiment, the main display 908 may be the player interface. For example, the player interface may be a touch screen display configured to present a GUI and receive an input from the player. The player interface may be any type of input mechanism capable of allowing a player to select options, play the primary game of chance, play a bonus game, or enter any other player input. For example, pushing a button 912 or pulling a lever 910 may prompt the gaming machine 900 to begin a spin of a reel in a slot game to play a primary game of chance. In another example, a player may use the touch screen display to enter player account information. In yet another example, a player can use the touch screen display to select a social contact to remotely participate in a game of chance. The gaming machine 900 may also have speakers 906, lights, or other output devices.

The gaming machine 900 may also have a TITO (Ticket In, Ticket Out) system. TITO uses tickets encoded with monetary amounts, which can be converted into credits to be played in the gaming machine 900 when inserted into the gaming machine 900. The gaming machine 900 may have a bill acceptor 918 configured to receive the tickets. The gaming machine 900 may also have a ticket printer 914 configured to print out similar tickets encoded with the amount of credits remaining on the gaming machine 900 when the player desires to no longer play the gaming machine 900 and cash out.

The bill acceptor 918 may also be configured to receive currency, for example paper bills. The gaming machine 900 may also have a mechanism to accept currency in other forms such as coins, vouchers, smart cards, electronic funds, and the like. The currency can then be converted into credits to be played on the gaming machine 900. The gaming machine 900 may have a credit dispenser 920 where the credits on the gaming machine 900 can be cashed out when the player desires to no longer play the gaming machine 900.

The gaming machine 900 may have a player tracking device 916 configured to receive a player loyalty card. Casinos may issue players a player loyalty card for player tracking and rewarding purposes. The player loyalty card may be associated with a player account. Player account data may be stored on a network server (e.g. a player tracking server), which may be on a network database server configured to communicate with the gaming machines in the casino. The network may be a client-server network, a peer-to-peer network, a wired or wireless network, a wide area network (WAN), a local area network (LAN), or any other type of network. The player may insert his or her player loyalty card into the player tracking device 916 to log into the player's account. Data about the player's play, such as outcomes, bet amounts, time played, or any other type of information, may be saved over the network to a non-volatile memory at a player tracking server or any other network server. The player's account may be also be used to associate the player with the at least one social gaming user, social awards, and any other data or information.

The gaming machine 900 can have a secondary display 904. The secondary display 904 may also display other text and graphics, including videos, pay tables, advertisements, secondary games, bonus games, player tracking information, announcements, or any other type of text and graphic. The secondary display 904 can potentially display any type of game of chance such as reel-based slot games, video poker, video blackjack, lottery games, secondary games of chance or any other type of known games of chance. The secondary display 904 can be a liquid crystal display screen, cathode ray tube monitor, projection, organic light-emitting diode screen or any other type of display device.

Figure 10:
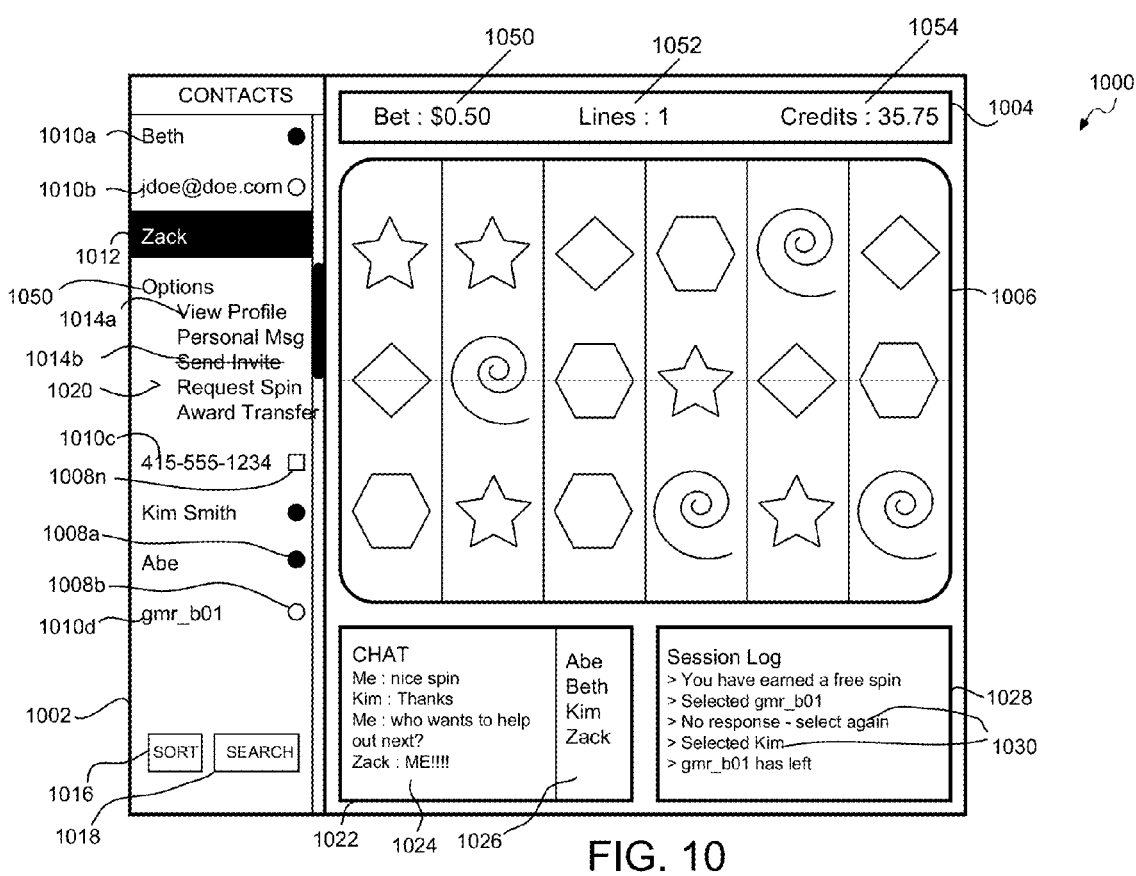
FIG. 10 illustrates an example graphical user interface.

FIG. 10 illustrates an example graphical user interface. The GUI 1000 may be presented on any display of a gaming machine, such as a main display or a secondary display of a slot machine (as illustrated in FIG. 9), display of a mobile gaming device, or the like. The GUI 1000 may include a game of chance window 1006, a information window 1004, a social contact list 1002, a social gaming communications window 1022, and a social gaming log 1028. The social gaming interface 1000 may visualize a social game session for a player and provide the player with information regarding the social game session, a game of chance, and a plurality of social contacts. The player can interact with the social gaming interface 1000 using a player interface of the gaming machine. In one embodiment, the player interface can be at least one button, a keyboard, or any similar input mechanism. In another embodiment, the player interface may be a touch screen display configured to receive input from the player.

The game of chance window 1006 can display any type of game of chance upon receipt of a wager from the player. For example, the game of chance window 1006 may display reel-based slot games, video poker, video blackjack, lottery games, electronic table games, or any other types or themes of games of chance. The information window 1004 can display information related to the game of chance. The information displayed in the information window 1004 can include a wager amount 1050, total credits 1054, pay lines 1052, or any other gamin information. In one embodiment, the information window 1004 may be a standalone window as illustrated in FIG. 10. In another embodiment, the information window 1004 can be integrated into the game of chance window 1006.

The social contact list 1002 can display and provide the player access to a plurality of social contacts. In other words, the social contact list 1002 may provide a list of at least one social gaming user associated with the player. The listing of at least one social gaming user may be obtained from, for example, the social contacts manager (illustrated in FIGS. 2A and 2B), a third party server (illustrated in FIG. 1), or any or server or database used to store a contact list.

The social contact list 1002 may include a plurality of controls configured to manipulate the social contact list 1002. In one embodiment, the plurality of controls can be a sort button 1016 and a search button 1018. In another embodiment, the actuation of the sort button 1016 may order the plurality of social contacts. For example, pressing the sort button 1016 can sort the plurality of social contacts alphabetically, by type, by groups, by player preferences, availability, or the like. The search button 1018 may allow the player to search for a particular social gaming user using any known searching methods. Although FIG. 10 is illustrated only with the sort button 1016 and the search button 1018, this is not intended to be limiting as the social contact list 1002 may have other controls such as a joystick, speaker and microphone for audio interaction, and the like.

The plurality of social contacts can be represented by alpha-numeric text such as, but not limited to, name 1010a, email address 1010b, phone number 1010c, or an alias 1010d. Although the plurality of social contacts are illustrated in FIG. 10 as being represented by alpha-numeric text, this is not intended to be limiting as the plurality of social contacts in the social contact list 1002 may also be represented by pictures, icons, unique identifier, or other indicia. Each of the plurality of social contacts can be associated with a social contact status indicator 1008. Although the social contact status indicators 1008a-n are illustrated as black and white geometric shapes, this is for illustrative purposes only and not intended to be limiting. For example, hashed lines, different colors, different shapes, and the like may be presented. In one embodiment, a filled-in circular indicator 1008a can represent a particular social contact is active in the social game session hosted by the player. In another embodiment, an empty circular indicator 1008b may represent a particular social contact has connected to a social gaming system, but is not active in the social game session hosted by the player. In yet another embodiment, an empty square indicator 1008*c* can represent a particular social contact has not connected to the social gaming system and is not active in the social game session hosted by the player.

The social contact list 1002 may include a plurality of social contact options. The plurality of social contact options may be configured to allow the player to perform a variety of social gaming actions such as viewing a social contact profile, messaging a social contact, inviting a social contact to join a social game, requesting a remote participation input, transferring a social gaming award, and the like. In one embodiment, the plurality of social contact options 1050 may be arranged in a menu listing the various options and include an option indicator 1020 to indicate which social contact option in the menu has been selected by the player. The option indicator 1020 may be, but is not limited to, an arrowhead as illustrated in FIG. 10. Other shapes, indicators, and the like may be used. Available social contact option may be indicated by text formatting, colors, or other indicia. For example, in the social contact option 1050, a profile may be viewed for Zack as indicated by "View Profile" 1014*a*. Unavailable social contact options may be indicated by text formatting, colors, or other indicia different from that of available social contact options. For example, a strikethrough 1014*b* can indicate inviting the social contact Zack is unavailable to the player.

In one embodiment, the social contact options 1050 may appear in the social contact list 1002 upon receipt of an input on the gaming machine. For example, the input may be selection of an "option" indicator presented on the GUI. In another example, the input may be a selection of one of the at least one social gaming users. The input may be a tap, double tap, press and hold, swipe, slide, or other input.

The social gaming communications window 1022 can include a session participant area 1026 and a communications area 1024. The session participant area 1026 may contain a list of all contacts participating in the social game session. In one embodiment, the contacts may be listed using alpha-numeric text, as illustrated in FIG. 10. In another embodiment, the contacts can be listed using visual indicators such as pictures, logos, icons, graphics, real-time video feed and other static and dynamic visual indicia or methods. The communications area 1024 may convey communication between the contacts participating in the social game session. In one embodiment, the communication may be text based and the communications area 1024 can be similar to instant messaging or chat rooms. In another embodiment the communication can be video chat based. In one embodiment, if the communication is video chat based, the session participant area 1026 and the communications area 1024 can be merged in one display area. The social gaming communications window 1022 may then contain a plurality of sections, each section contain a real-time video feed for each contact. Audio from the video chat based communication may play through at least one gaming machine speaker. In one embodiment, the video chat based communication can be supplemented with text transcription. The text transcription may be similar to known instant messaging or chat rooms.

The social gaming log 1028 may display a plurality of events 1030 from a social game session. The plurality of events 1030 can include, but is not limited to, an entrance into the social game session by a contact participating in the social game session, an exit from the social game session by a contact participating in the social game session, a selection of one of the contacts for remote participation, a result of the remote participation, a procurement of an award, and the like. In one embodiment, the social gaming log 1028 may be a standalone window as illustrated in FIG. 10. In another embodiment, the social gaming log 1028 can be integrated into the social gaming communications window 1022.

Figure 11A:
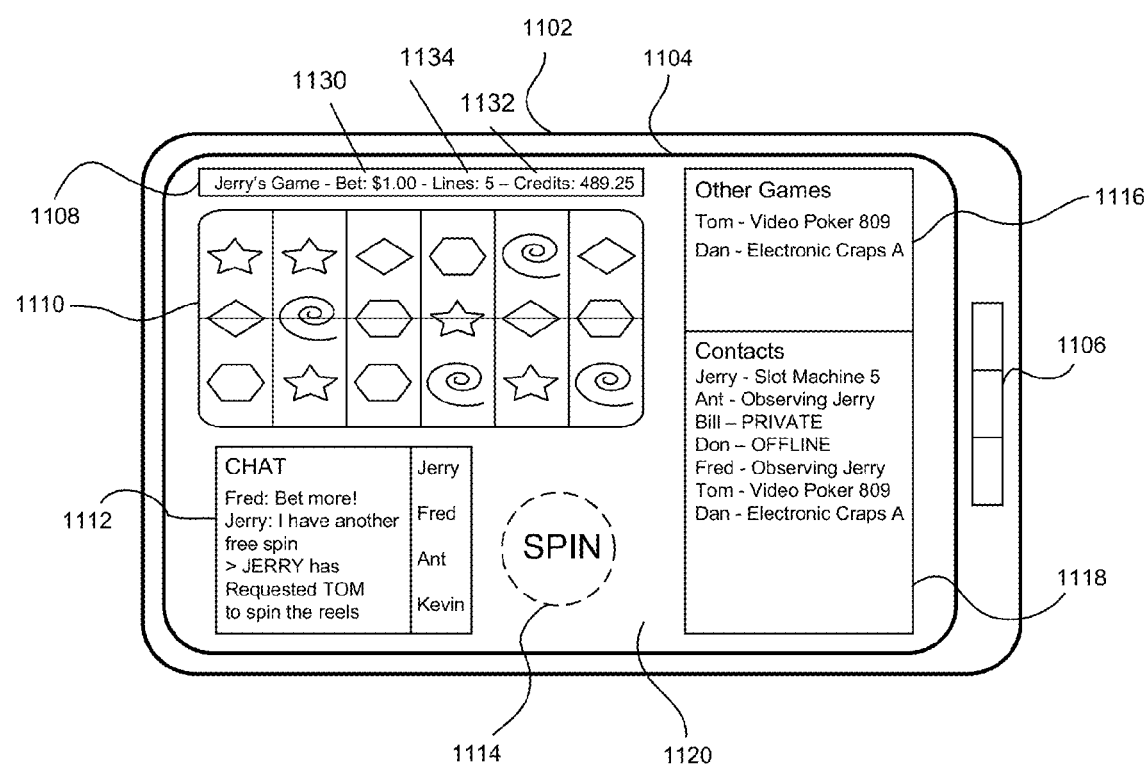
FIGS. 11A and 11B illustrate one embodiment of an example remote graphical user interface presented on a portable electronic device.
Figure 11B:
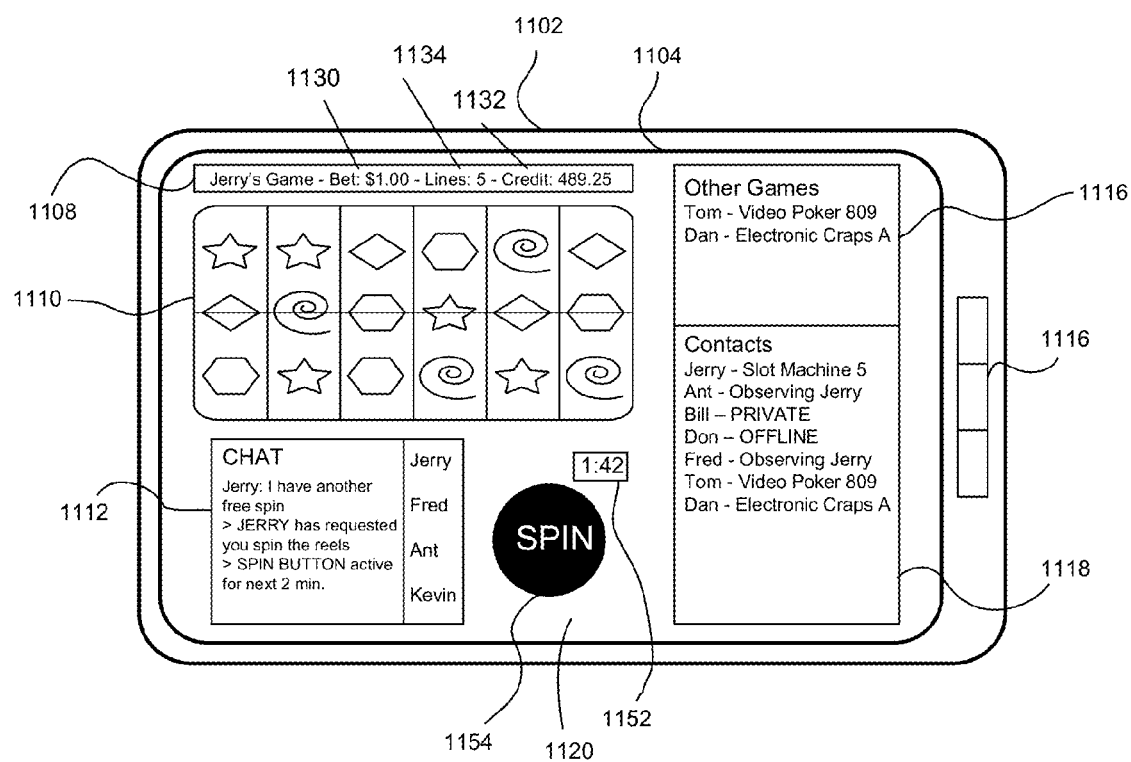

FIGS. 11A and 11B illustrate one embodiment of an example remote graphical user interface presented on a portable electronic device. Referring to FIG. 11A, a remote GUI 1120 can be presented on a display 1104 of a portable electronic device 1102. Although FIG. 11A is described in reference to portable electronic devices, the GUI 1120 can be presented on a display of any user device such as computing devices or gaming machines. The portable electronic device 1102 can be a mobile phone, a portable media player, a personal digital assistant, a portable gaming device, or any other similar device. In one embodiment, the display 1104 can be a liquid crystal display screen, organic light-emitting diode screen or any other type of display device found in portable electronic devices. The display 1104 can have touch screen capabilities that may allow a user to manipulate the remote social gaming interface 1120. In another embodiment, the portable electronic device 1102 may also have physical buttons or keys 1106 that can also allow the user to manipulate the GUI 1120. In still another embodiment, the buttons or keys may be virtually presented on the display 1104.

The remote social gaming interface 1120 may include a remote game of chance window 1110 and a remote information window 1108. The remote game of chance window 1110 can display a representation of the game of chance being played on a gaming machine by a player. The game of chance may be reel-based slot games, video poker, video blackjack, lottery games, electronic table games, or any other primary games of chance. In one embodiment, the remote game of chance window 1110 may display a real-time stream of the game of chance from the gaming machine. If the game of chance is digitally displayed on the gaming machine, the real-time stream may mirror a display of the gaming machine on the remote game chance of window 1110. For example, if the game of chance involves physical reels, cards, dice, or similar gaming objects, a camera may capture activity of the game of chance. The real-time stream can be generated using flash video technology, HTML 5, or other codecs and technology commonly used for streaming video over a network. In another embodiment, the remote game of chance window 1110 may display a real-time animation of the game of chance. For example, if the game of chance is a reel-based slot game with a plurality of physical reels, the remote game of chance window 1110 may show a digitally animated recreation of the plurality of physical reels. In yet another embodiment, the remote game of chance window 1110 may display a plurality of significant events from the game of chance posted by the social gaming server.

The remote information window 1108 can display information related to the game of chance. The information displayed in the remote information window 1108 can include a wager amount 1130, total credits 1132, pay lines 1134, or any other information typically associated with a primary game of chance. In one embodiment, the remote information window 1108 may be a standalone window as illustrated in FIG. 11A. In another embodiment, the remote information window 1108 can be integrated into the remote game of chance window 1110.

The GUI 1120 may include a remote social gaming communications window 1112. The remote social gaming communications window 1112 may contain a list of at least one contact that may be selected to participate in the social game session. The at least one contact may be any one or combination of the local user, remote user, or third party user as illustrated in FIG. 1. In one embodiment, the contacts may be listed using alpha-numeric text. In another embodiment, the contacts can be listed using visual indicators such as pictures, logos, avatars, icons, graphics, real-time video feed and other static and dynamic visual indicia or method. The remote social gaming communications window 1112 may convey communication between the contacts participating in the social game session. In one embodiment, the communication may be text based. In another embodiment the communication can be a video chat with an optional text transcription.

The GUI 1120 may include a contact list 1118. The contact list 1118 can display a list of contacts for selection by the player. In one embodiment, the plurality of social contacts can be represented by alpha-numeric text such as, but not only, a name, an email address, a phone number, or an alias. In another embodiment, the plurality of social contacts in the contact list 1118 may be represented by pictures, icons, avatars, or other indicia. Although not illustrated, each contact may be associated with a status indicator, options, and the like as discussed with reference FIG. 10.

The GUI 1120 may include a social game session list 1116. The social game session list 1116 can list any active social game sessions the contact is currently participating or observing. The contact may be connected to a first social game session and may be able to join or observe a second social game session. Upon joining the second social game session, content from the remote game of chance window 1110, the remote information window 1108, and the remote social gaming communications window 1112 may switch from that of the first social game session to that of the second social game session. The social game session list 1116 may also updated to reflect the current social game session.

The GUI 1120 may include a remote input indicator 1114. FIG. 11A illustrates the remote input indicator 1114 in an inactive mode. In this embodiment, the remote input indicator 1114 is illustrated in dashed lines. However, this is not intended to be limiting as the remote input indicator 1114 may be indicated as being inactive by any other presentation such as being faded, visibly faint, unfilled, blacked out, and the like.

When inactive, the remote input indicator 1114 can indicate that the player has not selected the contact to make the remote input or that the remote input has not been enabled on the portable electronic device.

Although the inactive remote input indicator 1114 is illustrated with a spin label, this is not intended to be limiting. The remote input indicator may be based upon the type and theme of the social game session. For example, if the social game session is a video blackjack, the remote input indicator may have a "hit", "stay", and "double down" label.

Referring now to FIG. 11B, the GUI 1120 may have an active remote input indicator 1154. When active, the remote input indicator 1154 can indicate that the player has selected the contact to make the remote input and/or that the remote input indicator 1154 has been enabled on the portable electronic device 1102. As illustrated, the active remote input indicator 1154 may be solid to represent activeness. In another embodiment, a border of the active remote input indicator 1154 may be solid to represent activeness. In yet another embodiment, the active remote input indicator 1154 may be a predetermined color to represent activeness. For example, the active remote input indicator 1154 can be red.

In still another embodiment, the active remote input indicator 1154 may blink to represent activeness.

Moreover, the remote social gaming communications window 1112 may indicate the contact has been selected to participate in the social gaming session. As illustrated, "JERRY has requested that you spin the reels" may be presented.

A timer 1152 may be presented on the GUI 1120. The user may have a predetermined period of time to participate in the social gaming session. The timer 1152 may inform the user of the time left to participate. For example, the user may have one minute forty-two seconds to participate in the social gaming session by selecting the remote input indicator 1154. The portable electronic device 1102 may refresh the timer 1152 as the amount of time left decreases. The timer 1152 may continue to refresh until the amount of time left decreases to "0". The timer 1152 may be presented using digital numbers, clock face, or any other time representation. In one embodiment, the timer 1152 can simply display the total amount of seconds. In one embodiment, the timer 1152 may be visible when the remote input indicator is active.

When selected by the contact, the portable electronic device 1102 can transmit the remote input from the portable electronic device 1102 to a social gaming server, a gaming server, or a gaming machine via a network (as illustrated in FIGS. 1 and 2).

Figure 12:
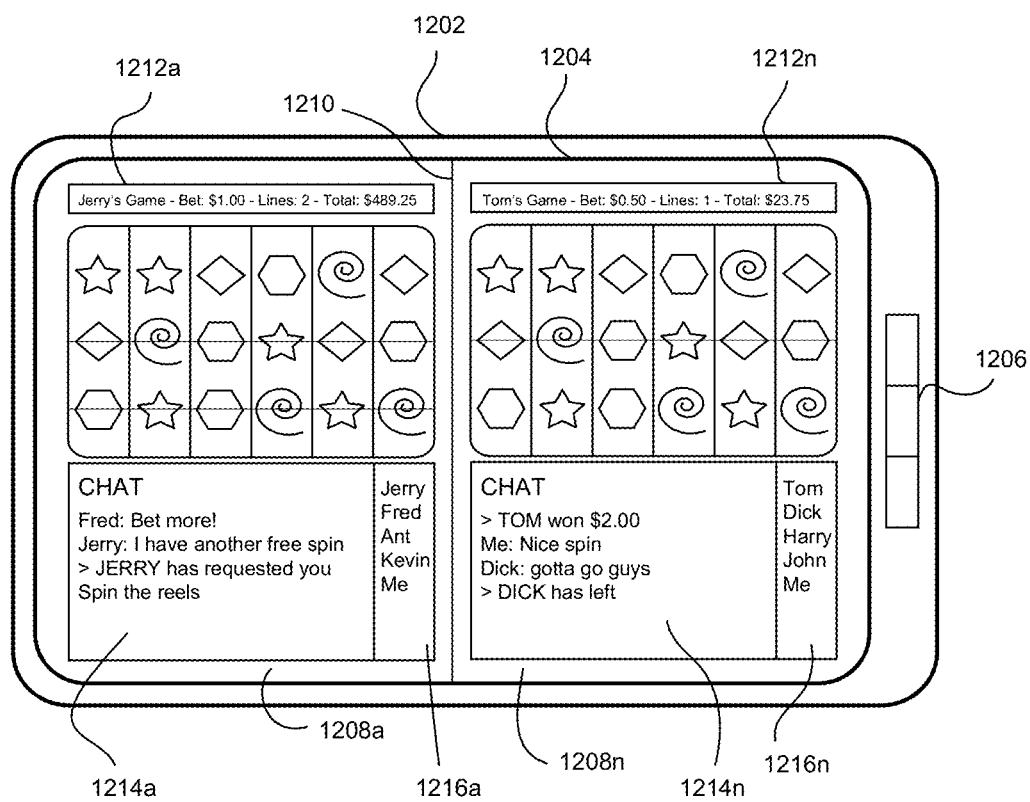
FIG. 12 illustrates another embodiment of a graphical user interface presented on a portable electronic device.

FIG. 12 illustrates another embodiment of a graphical user interface presented on a portable electronic device. A remote social gaming interface 1210 can be presented on a display 1204 of a portable electronic device 1202. Although FIG. 12 is described in reference to portable electronic devices, the remote social gaming interface 1210 can be presented on a display of any user device as discussed above.

The remote social gaming interface 1210 may include a plurality of social game session monitoring windows 1208-1208n. While FIG. 12 is illustrated with two social game session monitoring windows, this is not intended to be limiting as the GUI 1210 may include any number of social game session monitoring windows. Each of the plurality of social game session monitoring windows 1208-1208n may monitor a different social game session. Each of the plurality of social game session monitoring windows 1208-1208n may include, but is not limited to, a remote information window and a remote social gaming communications window for a particular social game session.

A new social game session monitoring window 1208a-1208n may be generated when the user joins a new social game session. In one embodiment, upon the user joining the new social game session, the remote social gaming interface 1210 can resize existing social game session monitoring windows 1208a-1208n to accommodate the new social game session. In one embodiment, the GUI 1210 may automatically be resized to equally allocate space for each social game session monitoring window 1208-1208n. 1208-1208n For example, for two social game session monitoring windows 1208-1208n, each window 1208-1208n may be allocated half of the GUI 1210. If the contact joins a new social game session, the GUI 1210 may divide and present each social gaming session monitoring window 1208-1208n on one third of the GUI 1210. Thus, the social gaming session monitoring windows 1208-1208n are equal in size.

In another embodiment, the plurality of social game session monitoring windows 1208-1208n may be different sizes. The size of each game session monitoring window 1208-1208n may depend upon any number of factors including, but not limited to, user preference, level of activity, wager amount, or request for a remote participation input. For example, for game sessions having a lower credit amount, the game session monitoring window 1208-1208*n* may be smaller than a game session having a larger credit amount. In another example, the user may manually allocate the size for each social game session monitoring window 1208-1208*n*.

Figure 13:
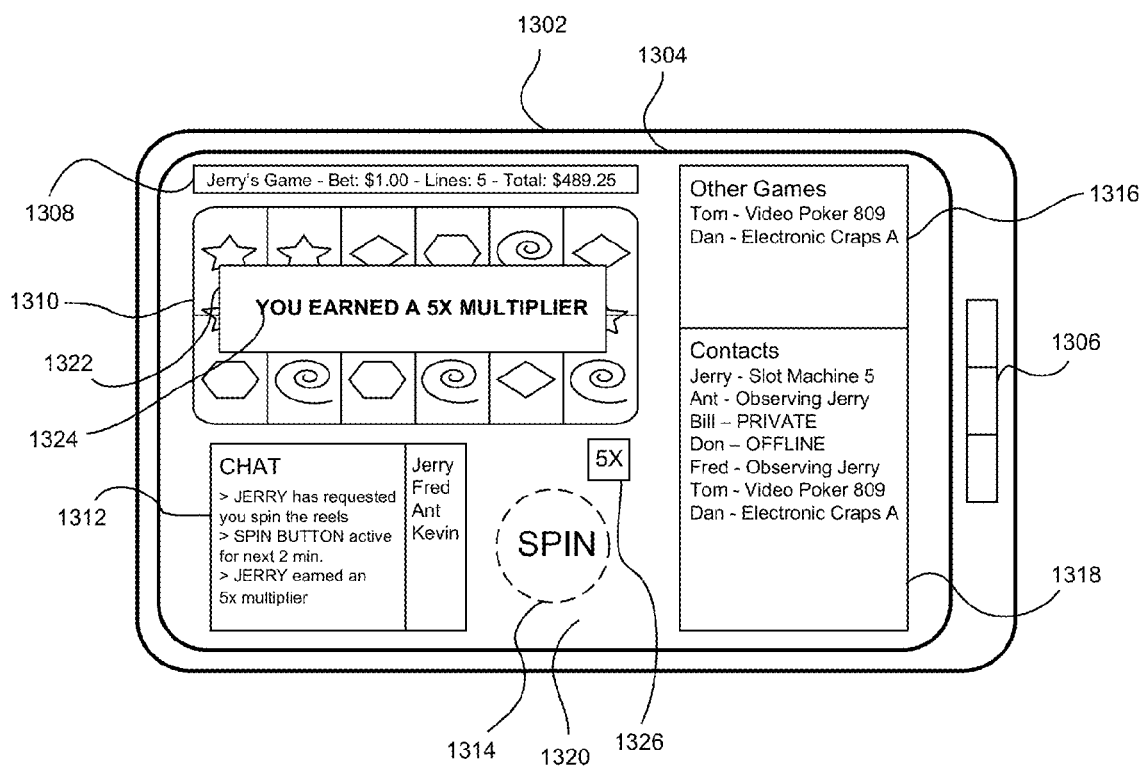
FIG. 13 illustrates yet another embodiment of an example graphical user interface presented on a display of a portable electronic device.

FIG. 13 illustrates yet another embodiment of an example graphical user interface presented on a display of a portable electronic device. The GUI 1320 can be presented on a display 1304 of a portable electronic device 1302. The portable electronic device 1302 may have physical buttons or keys 1306 that can also allow the contact to manipulate the GUI 1320. The GUI 1320 may include a remote game of chance window 1310 and a remote information window 1308 similar to the GUI illustrated in FIGS. 10-12.

The remote game of chance window 1310 may display a real-time stream of the game of chance being played by JERRY. The real-time stream may mirror a display of the gaming machine on the remote game chance of window 1310. The streaming of at least a portion of game information from the gaming machine may be transmitted by a game server, a social gaming server, or any other server. In one embodiment, the remote game of chance window 1310 may display a plurality of events from the game of chance posted by the social gaming server. As illustrated, "SPIN BUTTON active for next 2 min." is an event that is currently occurring.

The remote information window 1308 can also display information related to the game of chance, a remote social gaming communications window 1312, a remote social contact list 1318, a social game session list 1316, a remote input indicator 1314, as discussed above. The GUI 1320 may also have an award notification 1322 to inform the user that an award has been earned. The award notification 1322 may become visible when the player or the user has earned an award as discussed in detail above. Although the award notification 1322 is illustrated in FIG. 13 on top of the remote game of chance window 1310, this is not intended to be limiting as the award notification 1322 can be presented or displayed anywhere in the GUI 1320 on the display 1304. In one example, the award notification 1322 may include a description 1324 describing the award such as "YOU EARNED A 5× MULTIPLIER". The award notification 1322 may also include graphics such as, but not only, an icon to visually represent the award.

The GUI 1320 may alternatively display an award icon 1326. The award icon 1326 may indicate that the user received a new award. The award icon 1326 can be any graphic, logo, or picture that can represent the award. For example, if the user earns a 5× win multiplier by remotely participating in the game of chance, the award icon 1326 can be a box printed with a "5×" indicia. In one embodiment, the contact may receive the new award simply by participating in the social game session. The contact may also receive the new award because the player gifted the new award to the contact.

In one embodiment, the contact may select the award icon 1326 to associate and save the award for the contact, transfer the award back to the player, or redeem the award as discussed in detail in FIG. 8.

Figure 14:
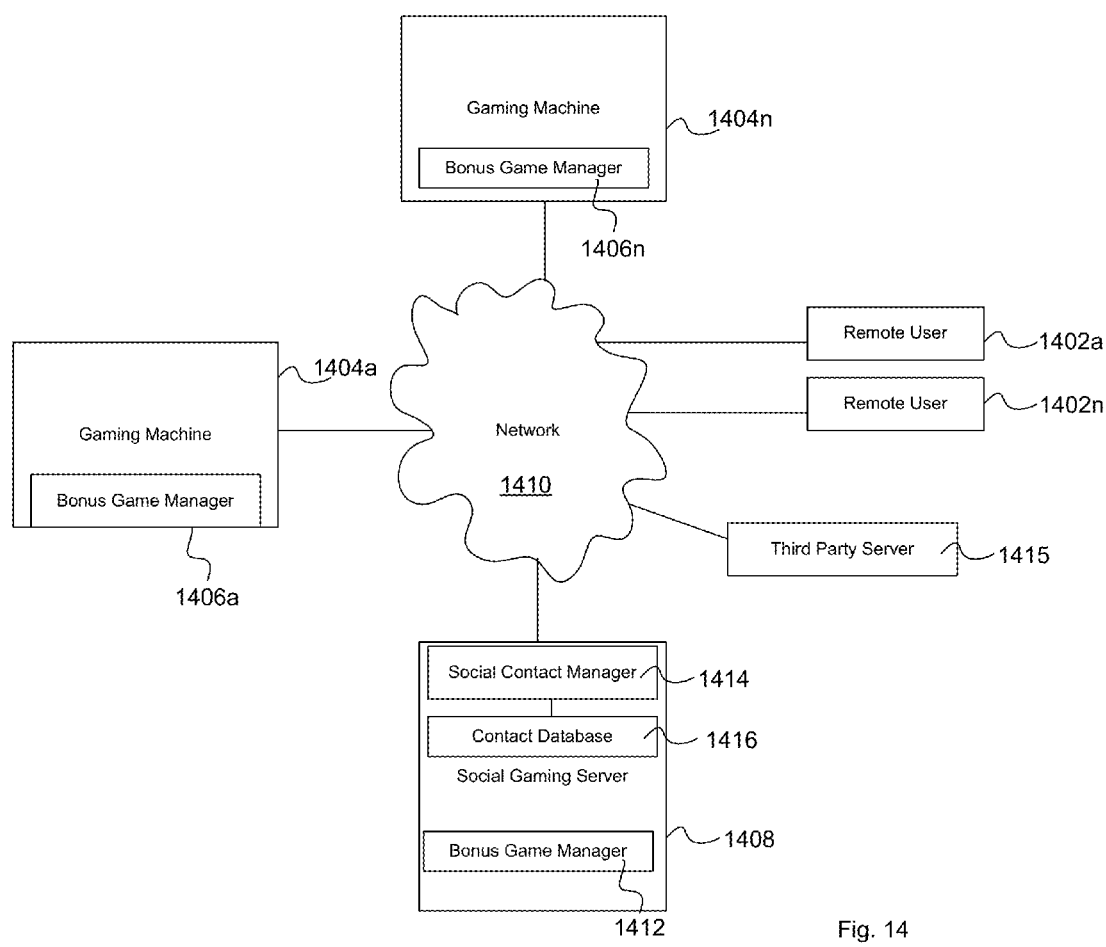
FIG. 14 illustrates another example of a social gaming system.

FIG. 14 illustrates another example of a social gaming system. The social gaming system 1400 may include a social gaming server 1408, at least one gaming machine 1404*a*-1404*n*, and at least one remote user 1402*a*-1402*n*. The social gaming server 1408 and the at least one gaming machine 1404*a*-1404*n* may be within a local gaming environment.

Example gaming environments may be a casino, grocery stores, gas stations, and any other establishment having gaming machines.

Communication between the social gaming server 1408, the at least one gaming machine 1404*a*-1404*n*, and the at least one remote user 1402*a*-1402*n* may be conducted through a network 1410 via any combination of wired networks, wireless communication technology, and cellular networks. A wired network can use Category 5 cable, Category 6 cable, fiber optic cable, coaxial cable or other cable types typically used for computer networks. Examples of wireless communications technology may include, but is not limited to, Wi-Fi and Bluetooth. Cellular networks may use CDMA, GSM, or any other common mobile network standards to transmit data at 2G, 3G, 4G or any other data transmission speeds.

The social gaming server 1408 may be configured to distribute or transmit a primary game of chance to the at least one gaming machine 1404*a*-1404*n* and/or the at least one remote user 1402*a*-1402*n*. The primary game of chance may be reel-based slot games, video poker, video blackjack, electronic table game, lottery games, or any other games of chance. The social gaming server 1408 may be configured to monitor the primary game of chance presented and played on the at least one gaming machine 1404*a*-1404*n*. For example, the social gaming server 1408 may monitor whether a bonus game triggering event has occurred in the primary game of chance, whether a jackpot triggering event has occurred in the primary game of chance, and other game of chance events.

The at least one remote users 1402*a*-1402*n* may be any device used by a user and configured to and/or capable of communicating with the network 1410. In one embodiment, the remote user 1402*a*-1402*n* may be located in a geographical location that is physically separated from or away from the at least one gaming machine 1404*a*-1404*n* and/or the gaming environment. In another embodiment, the at least one remote user 1402*a*-*n* can be a local user located within or on the premises of the gaming environment. For example, the remote user may be located in a restaurant in the gaming environment and can participate in the social game session using a smart phone configured to communicate with the social gaming sever 1408. In another example, the at least one remote user 1402*a*-1402*n* may be playing on another gaming machine 1404*a*-1404*n* while participating in a social game session. In still another example, the at least one remote user may be playing on an iPad™ while walking around on a cruise ship.

In one embodiment, the social gaming server 1408 may have a social contact manager 1414. Information or data associated with the at least one remote user 1402*a*-1402*n* may be stored in the social contact manager 1414 as one or more social contacts. The social contacts manager 1414 may be configured to store and/or manage one or more social contacts 1402*a*-1402*n* for playing a game of chance on a gaming machine. In one embodiment, the one or more social contacts may be stored in a contacts database 1416. In another embodiment, the one or more social contacts may be stored on a third party server 1415. For example, the third party server may be a social networking server configured to store, manage, and associate the one or more social contacts with the player playing the game of chance on the at least one gaming machine 1404*a*-*n*. The social contacts manager 1414 may be configured to add contacts, delete contacts, search for contacts, block contacts, and other similar administrative functions as desired by the user In one embodiment, the social gaming server 1408 may be configured to generate a list of the at least one available remote user. The at least one available remote user may be any remote users 1402a-n that are available to participate, interact, and/or help the user play the game of chance on the gaming machine 1404a-n. In one embodiment, the at least one available remote users 1402a-1402n may be any current remote users connected to the network 1410. For example, the at least one available remote user may be logged onto or in communication with the social contact manager 1414. In another example, the at least one available remote user may be playing a game of chance on the gaming machine configured to communicate with the social gaming server 1408 and/or the social contact manager 1414. In another example, the at least one available remote user may be eating in a restaurant and prompted by the remote user device, such as an iPad™, to connect to the social contact manager 1414.

The list of the at least one available remote user may be a list of remote users 1402a-n that are available to participate, interact, and/or help the user play a game of chance on the at least one gaming machine 1404a-n. The game of chance may be a primary game of chance and/or a bonus game. Once the list of the at least one available remote user is generated, the social gaming server 1408 may be configured to transmit the list of the at least one available remote users to the at least one gaming machine 1404a-n (e.g. as discussed in FIGS. 19-26). The list may include at least information of each of the available remote users such as electronic mail address, geographic location, user name, assigned user name, password, and any other information.

The user may select at least one of the at least one available remote users 1402a-1402n presented on the list of the at least one available remote users displayed on a display of the at least one gaming machine 1404a-n. Once selected, the social gaming server 1408 may be configured to receive the selection of the at least one available remote user from the at least one gaming machine 1404a-1404n and distribute or transmit gaming information to the at least one selected available remote user 1402a-n. The gaming information may be gaming information about the primary game of chance or the bonus game. For example, the social gaming server 1408 may be configured to transmit gaming information about the bonus game such as a bonus game feature. The bonus game feature may be any feature used to play or enhance the bonus game. In one example, the bonus game feature may be a roulette wheel. In other words, a roulette wheel may be displayed on the at least gaming machine 1404a-1404n and each of the at least one remote users may be prompted to spin the roulette wheel to participate and/or play a bonus game play. In another example, the bonus game feature may be a dart throwing bonus game whereby players may be prompted to throw a dart at a dart board. In yet another example, the bonus game feature may be a competitive game. The competitive game may be any known competitive game, such as poker, blackjack, car racing, or any other competitive social game. In still another embodiment the bonus game feature may be a collaborative bonus game. For example a plurality of remote users 1402a-n may be used to jointly spin the roulette wheel (e.g. the more remote users that spin the roulette wheel simultaneously, the faster the wheel spins), play a fishing game (e.g. specifically catch a specific fish), and the like.

The social gaming server 1408 may be configured to transmit an invitation to accept or decline the bonus game feature to the at least one selected available remote user 1404a-1404n. In one example, the invitation may include a prompt, button, or voice activated mechanism to initiate the bonus game, such as a "YES" and/or "NO" indicator to accept or decline the invitation. In another embodiment, if the at least one remote user 1402a-n is a local user, acceptance of the invitation may be a click, tap, or any other type of sensory input provided on a sensory device coupled to the at least one gaming machine 1404a-1404n. The sensory input may be transmitted to the social gaming server 1408 for processing.

The social gaming server 1408 may be configured to wait up to a predetermined period of time for acceptance or decline of the invitation and/or a bonus game input associated with the bonus game. In one example, the predetermined period of time may be between about two seconds to five minutes. In another example, the predetermined period of time may be between one minute to three minutes. The predetermined period of time may be presented in a timer window (e.g. timer window 2008 illustrated in FIG. 20) to inform the user of the remaining time left to transmit an input.

The bonus game input may be initiated by the at least one of the selected remote users 1402a. The bonus game input may be in response to a prompt initiated by the bonus game feature in order to play the bonus game feature. The bonus game input may be a task, a bet, a selection of cards, a click, a tap, or any other known bonus game input. In one embodiment, the bonus game input is a spin of a roulette wheel. In another embodiment, the bonus game input is a card game wager. In still another embodiment, the bonus game input is a throwing of a dart. In yet another embodiment, the bonus game input is racing of a car.

The bonus game information transmitted to the selected remote users and/or 1402a-n and/or the gaming machines 1404a-n can include any game information generated from playing the game of chance such that the social gaming server 1408 can reproduce the game of chance on a display of any user device. For example, the gaming information may include, but is not limited to, number of credits, total amount of time spent playing the gaming of chance at the gaming machine, notification of a win, loss, tie, push, and the like, amount won or lost, wager amount, award earned, notification of a remote input, pay table, and the like. The game information may also be specific to a type of the game of chance being played. For example, if the game of chance is an electronic card game, such as video poker or video blackjack, the game information can include, but is not limited to, cards held by the player, communal cards, and actions taken by the player such as hitting or drawing for new cards and any other game information related to an electronic card game. If the game of chance is a slot game, the game information can include, but is not limited to, contents of the reels, lines being played, notification of lines won, images on the reels, and any game information related to a slot game.

The social gaming server 1408 may be configured to generate a bonus game triggered by a bonus triggering event. The bonus game may be played using the bonus game feature. The social gaming server 1408 may transmit at least a portion of the gaming information to the at least one selected remote user 1402a-1402n and the gaming machine 1404a-1404n to play the bonus game using the bonus game feature. For example, the portion of gaming information transmitted to the at least one selected remote user 1402a-n may include information about the bonus feature input, bonus award, chat logs, and any other gaming information. The portion of gaming information transmitted to the gaming machine 1404*a-n* may include the bonus feature input, chat logs, and any other gaming information.

The social gaming server 1408 may be configured to transfer a result of the bonus game to the at least one gaming machine 1404*a*-1404*n* and the at least one selected remote user 1402*a*-1402*n*. In one embodiment, the social gaming server 1408 can calculate the result of the bonus game based on the gaming information. In another embodiment, the social gaming server 1408 may calculate the results of the bonus game based on a predetermined bonus game award distribution.

In one embodiment, the social gaming server 1408 may have a bonus game manager 1412. In another embodiment, the gaming machine 1404*a-n* may, in addition to or only, have a bonus game manager 1406*a-n*. The bonus game manager may be configured to communicate with the social gaming server 1408, gaming machines 1404*a-n*, or any other server to distribute or transmit the bonus game information. In yet another embodiment, the bonus game manager 1412 may be a separate and remote server or device.

The bonus game manager 1412, 1406*a-n* may also be configured to generate the list of at least one available remote user 1402*a*-1402*n*. In one embodiment the bonus game manager 1412 may be configured to communicate with the social contact manager 1414. In another example, the bonus game manager 1412, may be configured to manage the remote users 1402*a-n*. The bonus game manager 1412 may be configured to perform administrative functions, such as adding, deleting, searching, and blocking remote users 1402*a-n*. The bonus game manager 1412, 1406*a-n* may be configured to transmit the list of available remote users 1402*a*-1402*n* to the at least one gaming machine 1404*a*-1404*n* for display in a list of social contacts (e.g. list of social contacts 1914 as illustrated in FIG. 19).

The user may select at least one remote user and the gaming machine 1404*a-n* may transmit the selection to the bonus game manager 1412. The bonus game manager 1412 may be configured to receive the selection of the at least one remote user 1402*a*-1402*n* from the gaming machine 1404*a*-1404*n*. The bonus game manager 1412 may then transmit a bonus game feature to each of the at least one selected remote users 1402*a*-1402*n*. The bonus game manager 1412 may be configured to wait a predetermined period of time to receive an input from the at least one selected remote user 1402*a*-1402*n*. The input may be any type of input, such as the bonus game input, acceptance or rejection of an initiation, and the like. In one embodiment, the predetermined period of time may be between about two seconds to five minutes. In another embodiment, the predetermined period of time may be about between one minute to three minutes. The predetermined period of time may be presented in the timer window (e.g. timer window 2008 illustrated in FIG. 20) to inform the user of the remaining time to accept or decline the invitation. If no input is received, the invitation for the at least one selected remote user 1402*a*-1402*n* may expire and the user may select another remote user and/or the user may play the bonus game himself.

If the bonus game is played by the player and remote user, the bonus game manager 1412 may be configured to determine the result of the bonus game and transmit the results to the at least one gaming machine 1404*a*-1404*n* and the at least one selected remote user 1402*a*-1402*n*. If the bonus game is only played by the player, the bonus game manager 1412 may be configured to determine the result of the bonus game and transmit the results to the gaming machine 1404*a*-1404*n*.

If the bonus game is won, the bonus game manager 1412 may distribute a bonus game award, such as a cash award, player tracking points, free buffet coupons, concert tickets, hotel stays, and the like. The bonus game award may be any known type of bonus game award. In one embodiment, the bonus game award may be based on a type or a theme of the bonus game. For example, if the bonus game is a fishing game, the bonus game award may be a free dinner at the seafood buffet.

In one embodiment the user may select at least one bonus award option after the at least one available remote user 1402*a-n* accepts a bonus game feature invitation, but prior to playing the bonus game. The user may have the option of selecting at least one type of bonus game award from a list of various types of bonus game awards. Once the user receives notice that the at least one selected remote user accepted the bonus game invitation (e.g. FIG. 21A), the user may be prompted to select the at least one type of bonus game award.

In one embodiment, the bonus award option may be based on a manner of distribution of the bonus award. For example, one distribution option may be to not share the bonus award with any of the remote users participating in the bonus game. In another example, the distribution option may be to receive the at least one remote user non-monetary awards. In still another example, the award distribution option may be based on percentages. For example, the user may elect the percentage amounts and/or the percentages may be predetermined. For example, the player may decide to share only 50% of the bonus award with the remote users that participated in the bonus game.

In yet another example, the bonus award option can be based on a competitive game play. For example, if the bonus game feature is a car race, the player finishing first will receive 50% of the bonus game award, the second place player will receive 30% of the bonus game award, and the third place player will receive 20% of the bonus game award.

Figure 15:
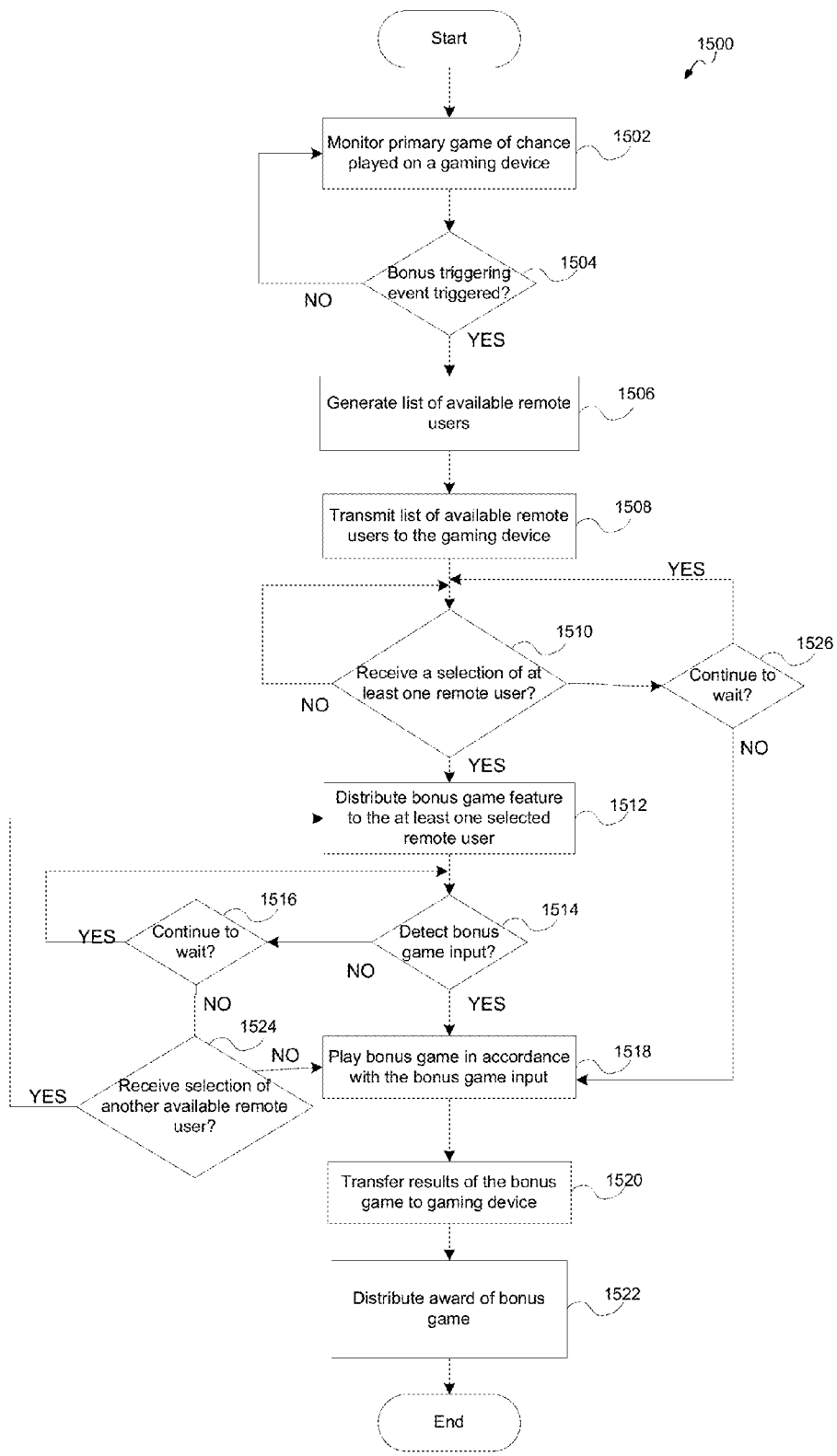
FIG. 15 illustrates a flow diagram of an example method for real-time bonus game participation.

FIG. 15 illustrates a flow diagram of an example method for real-time bonus game participation. The method 1500 can be performed by a social gaming server (e.g. social gaming server 1408 as illustrated in FIG. 14) or any other server or device, such as a casino network server. A primary game of chance played on a gaming device may be monitored at 1502. The gaming device may be a gaming machine, computing device such as, but not limited to, a desktop computer, a laptop computer, a tablet computer, or a netbook computer. In another embodiment, the gaming device may be a portable electronic device such as a cell phone, a smart phone, a portable media player, a portable gaming device, a personal digital assistant or the like. The primary game of chance could be a reel-based slot games, video poker, video blackjack, electronic table game, lottery games, or any other games of chance.

If a bonus triggering event is triggered at 1504 then a list of available remote users may be generated at 1506. If no bonus triggering event is triggered at 1504, then the primary game of chance played on the gaming device may continue to be monitored at 1502.

The bonus triggering event may be based on a type and/or theme of the game of chance played. In one embodiment, the bonus triggering event may be triggered by any known bonus triggering events such as achieving a high score on the primary game of chance, achieving a unique combination of numbers or symbols on the primary game of chance, or the like. If the bonus triggering event is triggered, in one embodiment the bonus game manager (e.g. bonus game manager 1412, 1406*a-n* illustrated in FIG. 14) may generate the list of available remote user. However the list of available remote user may be generated by any similar manager, server, or device such as the social gaming server 1408 illustrated in FIG. 14.

In one embodiment, the list of available remote users may consist of at least one social contact associated with the player playing the game of chance. For example, the at least one contact may be any remote user within a designated gaming area and available to participate in a bonus game. For example the gaming area may be the casino floor, buffet room, or hotel lobby. The at least one social contact may be stored in a contacts database maintained by a social contacts manager of the social gaming server (e.g. social contacts manager 1414 illustrated in FIG. 14), a third party server, or any other remote server.

The list of available remote users may be transmitted to the gaming device at 1508 for selection by the user. The remote user list may be displayed on at least one display of the gaming device. (e.g. social contacts list 1914 illustrated in FIG. 19). If a selection of at least one remote user is received at 1510 then the bonus game feature may be distributed to the at least one selected remote user at 1512. The bonus game feature may be distributed instantly or in substantially real-time. In one embodiment, the bonus game feature may be any bonus feature grantable to the at least one remote user for use in play in a bonus game. The bonus game feature may be any type of feature earned upon triggering of the bonus triggering event, such as at least one free spin, a multiplier earned for a predetermined number of game sessions, a competitive card game played with the at least one remote user, and any other known bonus features used to play a game of chance.

In one embodiment, the bonus game feature may be transmitted to a remote user associated with a portable electronic device. In another embodiment the bonus game feature may be transmitted to a remote user associated with or playing on another gaming machine.

Transmission of the bonus game feature may include an invitation to accept or reject the bonus game feature. The invitation to accept or reject may be an invitation to participate, interact with, or help play the primary game of chance. The invitation may include information such a as type of bonus feature, type of primary game of chance, a name of the user or player, predetermined period of time to accept or reject the invitation, and any other desired information and data.

If the selection of at least one remote user is not received at 1510, a determination may be made whether to wait at 1526 for a predetermined period of time. If the predetermined period of time has not elapsed, then the method returns to 1510. During the predetermined period of time, the list of at least one available remote user may be updated to reflect current available remote users until the selection of at least one available remote user is made at 1510. This ensures that only the available remote users are selected to participate in the bonus game session.

If the determination is made that the predetermined period of time has elapsed at 1526, the player may play the bonus game in accordance with a bonus game input at 1518. In other words, the player may play the bonus game alone. In another embodiment, the bonus game feature may be saved to the players account for future game play rather than being played at that moment.

A determination of whether a bonus game input is detected is made at 1514. If a bonus game input is detected at 1514 the bonus game is played in accordance with the bonus game input at 1518. The bonus game input may be any input that signifies that the remote user wants to participate in the bonus game session. In one embodiment, the bonus game input may be an acceptance or rejection of the bonus game invitation. In another embodiment, the bonus game input may be to initiate the bonus game. For example, the user input may be to press a "Spin" button to spin a Wheel of Fortune, press a "Throw" button to throw a dart at a dart board, or any other input to initiate the bonus game.

If the bonus game input is not detected at 1514, a determination is made whether to continue to wait at 1516 for a predetermined period of time. If the predetermined period of time to accept, reject, or initiate bonus game play invitation lapses, then the user may be prompted to select another remote user at 1524. If the selection of another available remote user is received at 1524, then the bonus game feature may be distributed to the selected remote user at 1512. If no selection of another remote available remote user is received at 1524, then the bonus game may be played by the player in accordance with the bonus game input at 1518.

Once play of the bonus game ends, a result of the bonus game may be transmitted to the gaming devices at 1520. The bonus game award, if any, may be distributed at 1522 to the user and the at least one remote user. The bonus game award can be any type of gaming or non-gaming award and may be based on the type and/or theme of the game of chance. The bonus game award may be, for example, a monetary award, a free spin, a multiplier, earning a plurality of loyalty points, and the like. A non-gaming award can be, for example, movie tickets, food coupons, show tickets, and the like.

Figure 16:
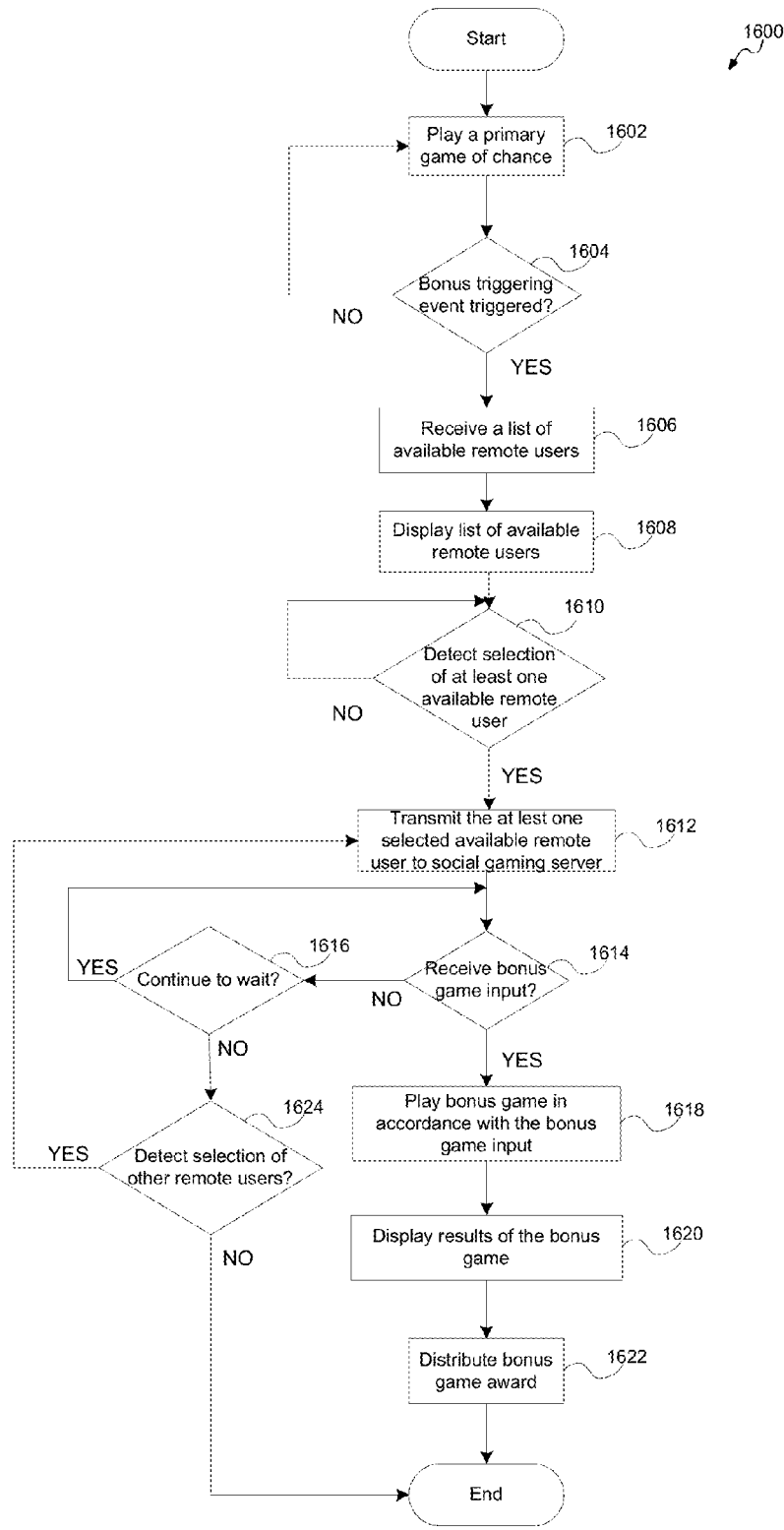
FIG. 16 illustrates a flow diagram of an example method for granting a real-time bonus game feature.

FIG. 16 illustrates a flow diagram of an example method for granting a real-time bonus game feature. The method 1600 can be performed by a gaming device (e.g. gaming machine 1404*a-n* as illustrated in FIG. 14) or any other device, machine or server. A primary game of chance may be played at 1602 on the gaming device. The primary game of chance may be transmitted from a social gaming server (e.g. social gaming server 1414 illustrated in FIG. 14) or any other server or device. In one example, the gaming device may be a computing device such as, but not limited to, a desktop computer, a laptop computer, a tablet computer, or a netbook computer. In another embodiment, the gaming device may be a portable electronic device such as a cell phone, a smart phone, a portable media player, a portable gaming device, a personal digital assistant or the like. The primary game of chance can be a reel-based slot games, video poker, video blackjack, electronic table game, lottery game, or any other game of chance A determination of whether a bonus triggering event is triggered on the primary game of chance is made at 1604. If the bonus triggering event is triggered at 1604, then a list of at least one available remote user may be received at 1606. The bonus triggering event may be based on a type and/or theme of game played. In one embodiment, a bonus triggering event may be triggered by achieving a high score on the primary game of chance, achieving a unique combination of numbers or symbols in the primary game of chance, or the like.

The list of at least one available remote user may be received from the social gaming server (e.g. social gaming server 1408 illustrated in FIG. 14), bonus game manager (e.g. bonus game manager 1406*a*, 1412 illustrated in FIG. 14), or any other server or device. In one embodiment, the list of at least one available remote user may be a social contact associated with the player playing the game of chance. For example, the at least one available remote user may be any remote user available to participate in a bonus game. The remote user may be within a designated gaming area and/or remote from the gamin area. In one embodiment, the at least one remote user may be stored in a contacts database maintained by a social contacts manager of the social gaming server, a third party server, or any remote server.

The list of at least one available remote user may be displayed on the gaming device at 1608 for selection by the user. If a selection of at least one available remote user is detected at 1610 then the selection of the at the least one available remote user may be transmitted to the social gaming server at 1612. The social gaming server may then transmit a bonus game feature to the selected remote user(s). Detection of the selection by the player may be made via any known detection means such as through physical sensory touch input (i.e use of a touch screen, joystick, and the like), audio input, the user may physically type the name of the remote user, or any other detection means or device.

In one embodiment, the gaming device may transmit the bonus game feature to the social gaming server for substantially real-time transmission of the bonus game feature to the selected remote user(s). The bonus game feature may be any type of feature earned upon triggering of the bonus event, such as at least one free spin, a multiplier earned for a predetermined number of game sessions, a competitive card game played with the at least one remote user, or any other bonus features.

Once the bonus game feature is distributed to the at least one selected remote user(s) at 1612, a determination is made whether a bonus game input is received at 1614. If a bonus game input is received at 1614, the bonus game is played in accordance with the bonus game input at 1618.

In one embodiment, the bonus game feature may first distribute an invitation to each selected remote user to accept or reject the bonus game input. In one example, if the user accepts the bonus game feature, a roulette wheel is distributed to each accepting user and the primary user. Each user is then prompted to place their bets, and the roulette ball is released.

In another embodiment, the bonus game feature is initiated by immediate bonus game feature play. For example, the roulette wheel is distributed to each player. By placing a bet within a predetermined amount of time, the bonus game feature play is initiated for each player that placed the bet.

In one embodiment, if no bonus game input is received at 1614, a determination is made whether to continue to wait for a predetermined amount of time at 1616. If the predetermined period of time to accept, reject, or initiate bonus game play lapses, then selection of other available remote users may be detected at 1624. If a selection of other available remote users is detected at 1624, then the selected remote user may be transmitted to the social gaming server at 1612. If no selection is detected at 1624, then method 1600 ends.

The result of the bonus game may be displayed at 1620. The results of the bonus game may be obtained from the gaming machine or the social gaming server. The results of the bonus game may be based on the determination of the outcome of the bonus game.

The bonus game award, if any, may be distributed to the gaming device and the remote user(s) at 1622. The bonus game award may be distributed by the gaming machine, social gaming server, or any other device. The bonus game award can be any type of gaming or non-gaming award and may be based on the type and/or theme of game. The bonus game award may be, for example, a monetary award, at least one free spin, a multiplier, earning a plurality of points, or the like. A non-gaming award can be, for example, a digital enhancement for the social gaming user interface on the user device and/or on the gaming machine. The digital enhancement can be a wallpaper, a background, a song, new avatar, a picture, any type of other visual and/or auditory aesthetic prizes, movie tickets, food coupons, and the like.

Figure 17:
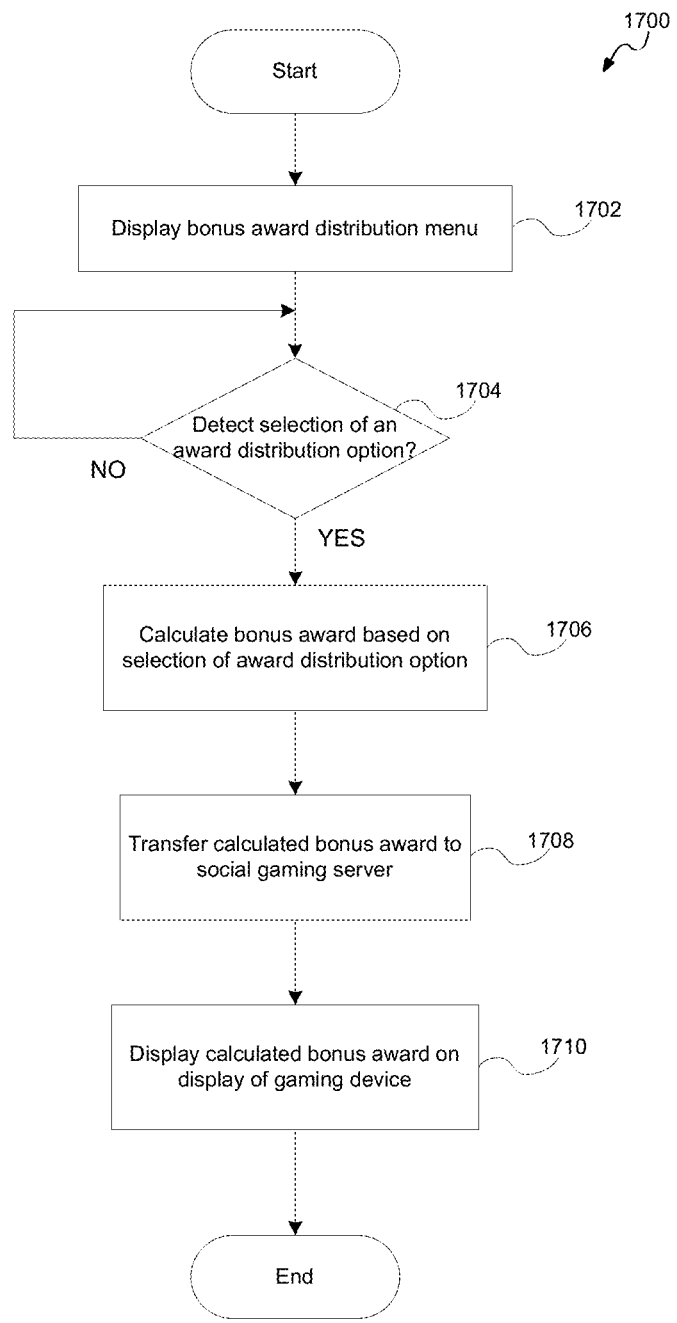
FIG. 17 illustrates a flow diagram of an example method for distributing a bonus award.

FIG. 17 illustrates a flow diagram of an example method for distributing a bonus award. The method 1700 can be performed by the gaming device (e.g. gaming machine 1404a-n as illustrated in FIG. 14), the social gaming server (e.g. social gaming server 1408 as illustrated in FIG. 14), or any other device, machine or server.

A bonus award distribution menu may be displayed at 1702. The bonus award distribution menu may be displayed on at least one display of the gaming machine, mobile device, or any other device. The bonus award distribution menu may include any known bonus award options, such as type of bonus award (non-gaming vs. gaming, non-cash vs. cash, and the like), amount of bonus award, percentage of distribution (i.e. sharing of the bonus award, if any), and the like. For example, the bonus award option may be monetary or non-monetary awards. In another example, the bonus award options may be based on percentage distribution as discussed below. Another bonus award option may be specific types of bonus awards such as buffet tickets, concert tickets, free hotel stays, social game awards, multipliers, free spin, and the like.

In one embodiment, the bonus award distribution menu may be automatically displayed after a bonus game is earned. In another embodiment, the bonus award distribution menu may be displayed after play of the bonus game completes. In still another embodiment, the bonus award distribution menu may be automatically displayed after a remote user accepts an invitation of a user to participate, interact, and/or play the bonus game. In another embodiment the user may select a bonus award option after the at least one available remote user accepts the bonus game invitation, but prior to playing the bonus game. In yet another embodiment, the user may have the option of selecting at least one type of bonus game award from a variety of bonus game awards. If the user receives notice that the at least one social contact or remote user accepted the bonus game invitation (e.g. FIG. 21A), the user may be prompted to select at least one type of bonus game award.

The bonus award distribution menu may list a plurality of award distribution options. For example, one award distribution option may be to not share a monetary award with the remote users participating in the bonus game, but to give the remote user(s) non-monetary awards. Another award distribution option may be to share a specific percentage of the bonus award with the remote users that participated in the bonus game. Still another reward distribution option, can be to distribute the bonus game award based on a competitive bonus game play. For example, if the bonus game feature is a car race, then a player finishing first may receive 50% of the monetary award. A player finishing second may receive 30% of the award, and the player finishing last may receive 20% of the award.

If selection of the bonus game award distribution option is detected at 1704, the bonus award, if any, may be calculated based on the selected award distribution option at 1706. The award earned may be based on the outcome of the bonus game. For example, if money is won by a primary user, other players may receive a gift certificate to a casino buffet or a free hotel stay. In still another example, if there is a monetary award, each player may receive a percentage of the monetary award based upon the user's elected percentage.

The calculated bonus award may be transmitted to the social gaming server at 1708 for transmission to the remote users. The calculated bonus award may also be displayed at 1710 on a display of the gaming device. In one embodiment, an itemized summary or explanation of how the bonus award was distributed may be presented on the display.

Figure 18:
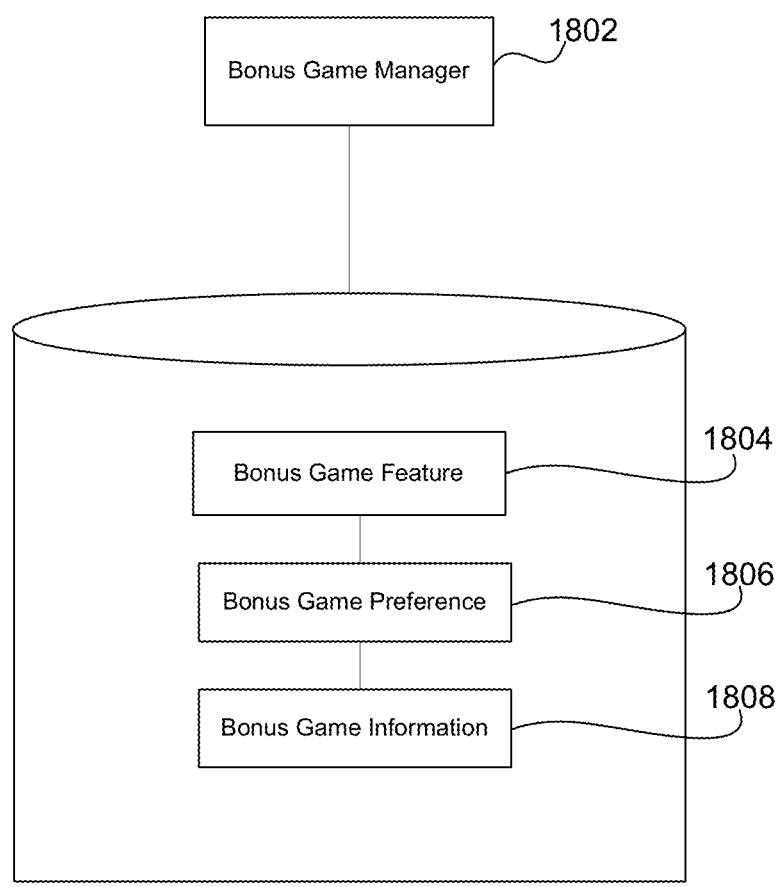
FIG. 18 illustrates an example bonus game manager.

FIG. 18 illustrates an example bonus game manager. In one embodiment, the bonus game manager 1802 may include a database storing at least the bonus game features 1804, bonus game preferences 1805, and bonus game information 1808. The bonus game manager 1802 may be configured to distribute or transmit bonus gaming information. In other words gaming information concerning the bonus game, such as the bonus game feature, bonus game play, and the like.

The bonus game manager 1802 may be configured to communicate with the social gaming server. In another embodiment, a bonus game manager may be configured to communicate with the gaming machine. However, these are not intended to be limiting as the bonus game manager 1802 may be in communication with any other server or device.

The bonus game feature 1804 may be any known multi-player social bonus game. In one example, the bonus game feature may be a roulette wheel. In another example, the bonus game feature may be throwing darts at a dart board. In another example, the bonus game feature may be a competitive game. The competitive game may be any known competitive game, such as poker, black jack, darts, car racing, or any other group bonus games. In still another embodiment the bonus game feature is a collaborative bonus game such as a game where each user must jointly spin a wheel simultaneously.

The bonus game preferences 1806 may be any known bonus game preferences including award distribution options, settings (e.g. font, volume, display brightness, music, and the like), and the like.

Bonus game award preferences may include a plurality of award distribution options. For example, one award distribution option may be to not share the monetary award with the remote users participating in the bonus game of chance, but to share non-monetary awards with the remote user(s). Another award distribution option may be to share a specific percentage of the bonus award with the remote users that participated in the bonus game of chance. Still another option, is to distribute the bonus game award based on a competitive bonus game play. For example, if the bonus game feature is a car race, then the player finishing first will receive 50%, the second place finisher will receive 30%, and the third place finisher will receive 20% of the bonus award.

In one embodiment, the bonus game preference may include the type of bonus game that is to be played. They type of bonus game feature may be a competitive, multi-player, collaborative or any other known type of group bonus games.

In another embodiment, the bonus game preference may be the gaming establishment settings for the bonus game play. Gaming establishment preferences may include how often bonus game features are triggered, the type of prizes, the amount of prizes, how many remote users can participate in the bonus game, the type of remote users that can participate in the bonus game, and any other preference that the gaming establishment may have for social bonus game feature play. In one embodiment, the preferences may be necessary to comply with state, local, city, county, or country laws.

The bonus game information 1808 may be any information needed to facilitate bonus game feature play. In one embodiment, bonus game information may be transmitted between the social gaming server, gaming machine(s), and any other server or device. The bonus game information may be any known type of bonus game information such as speed of game play, music, colors of the bonus game feature, bonus game statistics, and type of awards offered. In one example, the bonus game information is the input from the other remote users playing the bonus game feature. In another example, the bonus game information may be the chat messages between all the players. In still another example, the bonus game information may be any type of information about the bonus game.

Figure 19A:
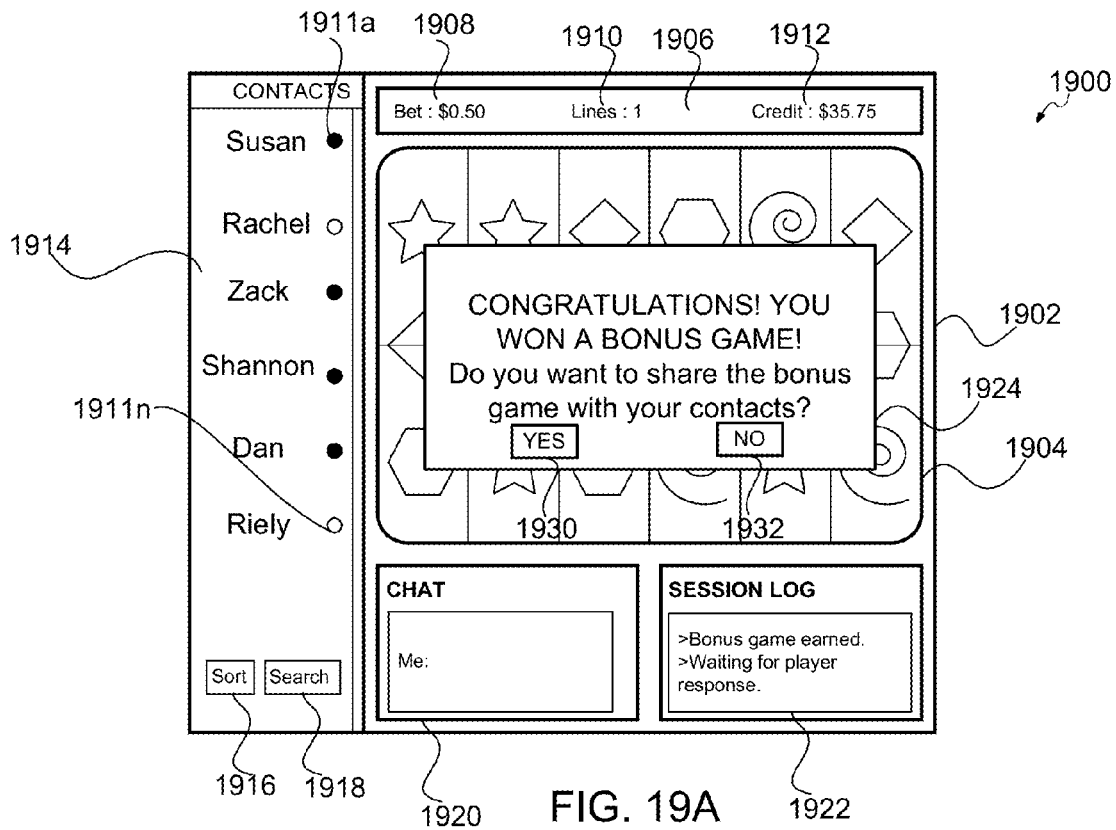
FIGS. 19A and 19B illustrate example embodiments of a graphical user interface.
Figure 19B:
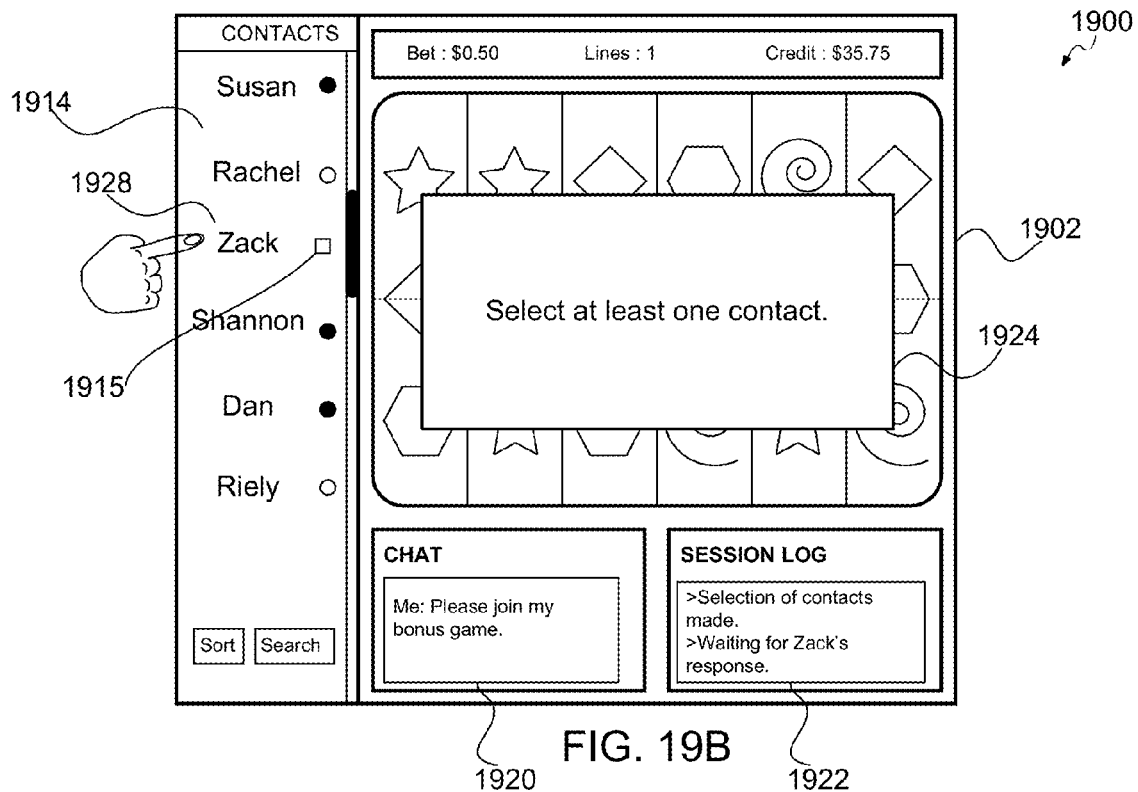

FIGS. 19A and 19B illustrate example embodiments of a graphical user interface. Referring to FIG. 19A, the GUI 1902 may be displayed on display 1900 and designed to allow a user to play a game of chance. The GUI 1902 may include a gaming window 1904. The gaming window 1904 can display information such as the game of chance, bonus events, advertisements, and the like. The GUI 1902 may include an information window 1906. The information window 1906 can display information related to the game of chance. The information displayed in the information window 1906 can, for example, include a wager amount 1908, pay lines 1910, total credits 1912, or any other gaming information.

The GUI 1902 may further include a social contact list 1914 that can display and provide the user access to a plurality of social contacts. The social contacts may be obtained from, for example, the social contacts manager, a third party server, or any other server or database configured or designed to store a contact list. The user can select one or more contacts from the social contact list 1914 while playing the game of chance to facilitate a social gaming atmosphere. For example, the user might earn a bonus game and decide to invite one or more of the social contacts to participate, interact, or help play the bonus game. In one embodiment, the social contact list 1914 may include a plurality of controls configured to manipulate the social contact list 1914, such as a sort indicator 1916, a search indicator 1918, or any other control elements, e.g. joystick, speaker and/or microphone for audio interactions.

The social contact list 1914 may include availability indicators 1911a-n. The availability indicators may indicate which social users are available to participate in a bonus game session. The available indicators 1911a-n may be any type of indicator and may take any shape, form, and/or color. For example, as illustrated, the availability indicator may be a darkened circle if the social contact is available and not darkened if the social contact is not available. In another example, if the player selects the social contact, the availability indicator may change shape and/or color. As illustrated in FIG. 19B, the availability indicator 1915 may be changed to a square.

In another embodiment, only available social users may be displayed in the social contact list 1914. Thus, the available indicators 1911a-n may illustrate which social users are chatting with the player, which social users are playing on another gaming machine, which social users are in the gaming area, or any other user-defined criteria to filter the social contact list 1914.

The GUI 1902 may further include a communication window 1920. The communication window 1920 can allow the user to interact and/or communicate with one or more contacts from the social contact list 1914. For example, the user can communicate and/or chat with the one or more social contacts about the game of chance being played, an invitation to participate, view, or help play a bonus game, sports, movies, or any other interests or topics.

The GUI 1902 may further include a session log window 1922. The session log window 1922 can display a plurality of events from a social gaming session in real-time as the events occur. The social gaming session may include play of the primary game of chance and/or the bonus game. As illustrated in FIG. 19A, the status information displayed in the session log window 1922 indicates "Bonus game earned" and "Waiting for player response". In one embodiment, the messages in the session log window 1922 may remind the user to act promptly.

The GUI 1902 may further include a bonus game notification window 1924. The bonus game notification window 1924 may be displayed on the display 1900 when a bonus-triggering event has been triggered. The bonus game notification window 1924 may be configured to inform the user of the bonus game event. As illustrated, the bonus game notification window 1924 may be displayed over the gaming window 1904. However, in another embodiment, the bonus game notification window 1924 may be displayed on another display of the gaming machine or any other area of display 1900.

In one embodiment, the bonus game notification window 1924 may determine whether the user would like to have at least one social contact participate in the bonus game. For example, the bonus game notification window 1924 may display "Do you want to share the bonus game with your contacts?" and present a "YES" indicator 1930 and a "NO" indicator 1932.

If the user wants to share the bonus game, the user may select the "YES" indicator 1930. Referring now to FIG. 19B, when selection of the "YES" indicator 1930 is detected, the user may be prompted to select at least one of the social contacts from the social contact list 1914. For example, the bonus game notification window 1924 may display "Select at least one contact".

The user may select at least one social contact from the social contacts list 1914. As illustrated, using a touch screen display, the user selected "Zack" 1928. The user's selection of the at least one social contact may be transmitted to the social game server for processing. In one embodiment, the user can communicate or chat with Zack using the communication window 1920. For example, the user can enter text such as "Please join my bonus game" using a touch screen available on the GUI 1902. The session log window 1922 can also be automatically and periodically updated to reflect the events from the social gaming session. For example, the session log window 1922 can display "Waiting for Zack's responses."

Figure 20:
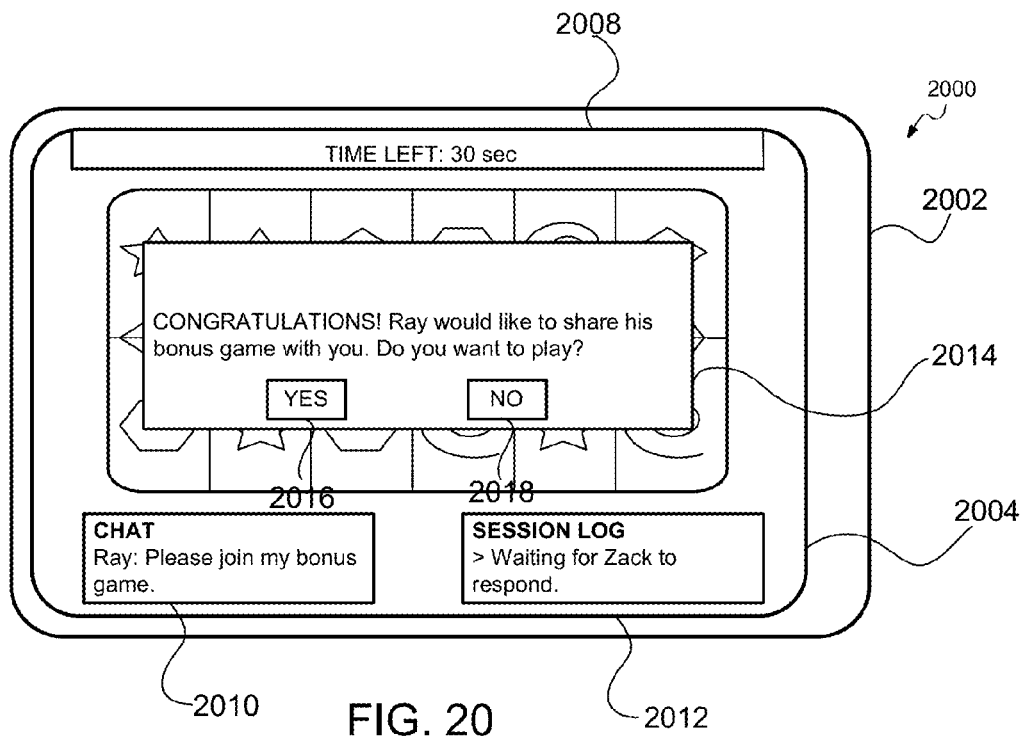
FIG. 20 illustrates one embodiment of a graphical user interface presented on a display of a portable electric device.

FIG. 20 illustrates one embodiment of a graphical user interface presented on a display of a portable electric device. The portable electric device 2000 may be a mobile phone, a smart phone, a portable media player, a portable gaming device, a personal digital assistant, or the like. This is not intended to be limiting as the portable electronic device may also be a desktop computer at the remote user's home, another gaming machine, or any other device. Once the user of the primary game of chance selects at least one social contact (e.g. Zack 1928 as illustrated in FIG. 19B), a bonus game invitation may be transmitted to the portable electronic device 2000. The bonus game invitation may be transmitted from, for example, the gaming machine that just triggered the bonus game.

For example, the bonus gaming notification window 2014 displayed on the GUI 2004 may present "CONGRATULATIONS! Ray would like to share his bonus game with you. Do you want to play?" A "YES" indicator 2016 and a "NO" indicator 2018 may also be displayed in the bonus gaming notification window 2014. A timer window 2008 may be presented on the GUI 2004. The timer window 2008 may be configured to inform the user of the time left to accept or decline the bonus game invitation. In one embodiment, the selected contact may have a predetermined period of time to accept, decline, or ignore the bonus game invitation. In one embodiment, the predetermined period of time may be between about two seconds to five minutes. In another embodiment, the predetermined period of time may be between one minute to three minutes. As illustrated in the timer window 2008, the selected contact may have thirty seconds to accept the bonus game invitation.

The GUI 2004 may also present a communication window 2010. The communication window 2010 may be configured or designed to allow the user and other social contacts to communicate. For example, as illustrated, Ray can communicate to Zack: "Please join my bonus game". This provides for a social gaming atmosphere where Zack may be invited to participate in the bonus game. This promotes and provides for a social gaming atmosphere where the players feel they have a stake in the game and are more willing to participate and/or watch the game of chance being played.

The GUI 2004 may also present a session log window 2012. The session log window 2012 can be configured or designed to display a plurality of events from a social gaming session and can also be automatically and periodically updated to reflect the events from the social gaming session. The session log window 2012 may include information from the game of chance and/or the bonus game. As illustrated, the session log window 2012 may display "Waiting for Zack to respond."

The social contact, e.g. Zack, may select the "YES" indicator 2016 if he would like to participate in the bonus game session. Detection of the "YES" indicator 2016 or the "NO" indicator 2018 may be transmitted to the social game server for processing.

Figure 21A:
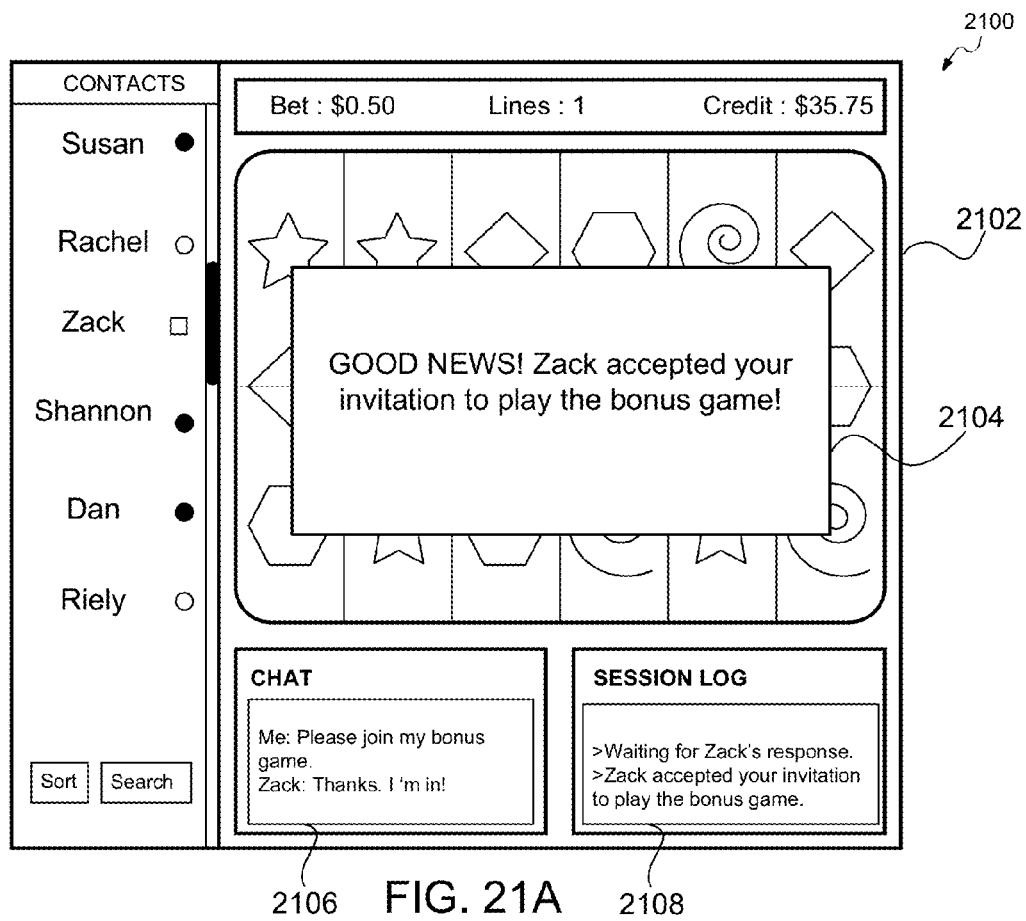
FIG. 21A illustrates one embodiment of acceptance of a bonus game invitation.

FIG. 21A illustrates one embodiment of acceptance of a bonus game invitation. Once the social contact (e.g. Zack) selects the "YES" indicator 2016 (as illustrated in FIG. 20), the selection may be transmitted to the social game server. The social game server may then transmit the social contact's selection to the gaming machine. The GUI 2102 presented on display 2100 may display an indication that the social contact accepted the bonus game invitation. For example, the GUI 2102 may display "GOOD NEWS! Zack accepted your invitation to play the bonus game!" in the bonus game notification window 2104.

In one embodiment, the user can communicate or chat with Zack in real-time using the communication window 2106. The communication window 2106 may be updated frequently to receive communication from other users and/or players. For example, the user can view Zack's response: "Thanks, I'm in!".

The session log window 2108 can also be automatically and periodically updated to reflect the events from the social gaming session. For example, the session log window 2108 can display "Waiting for Zack's responses", and "Zack accepted your invitation to play the bonus game."

Figure 21B:
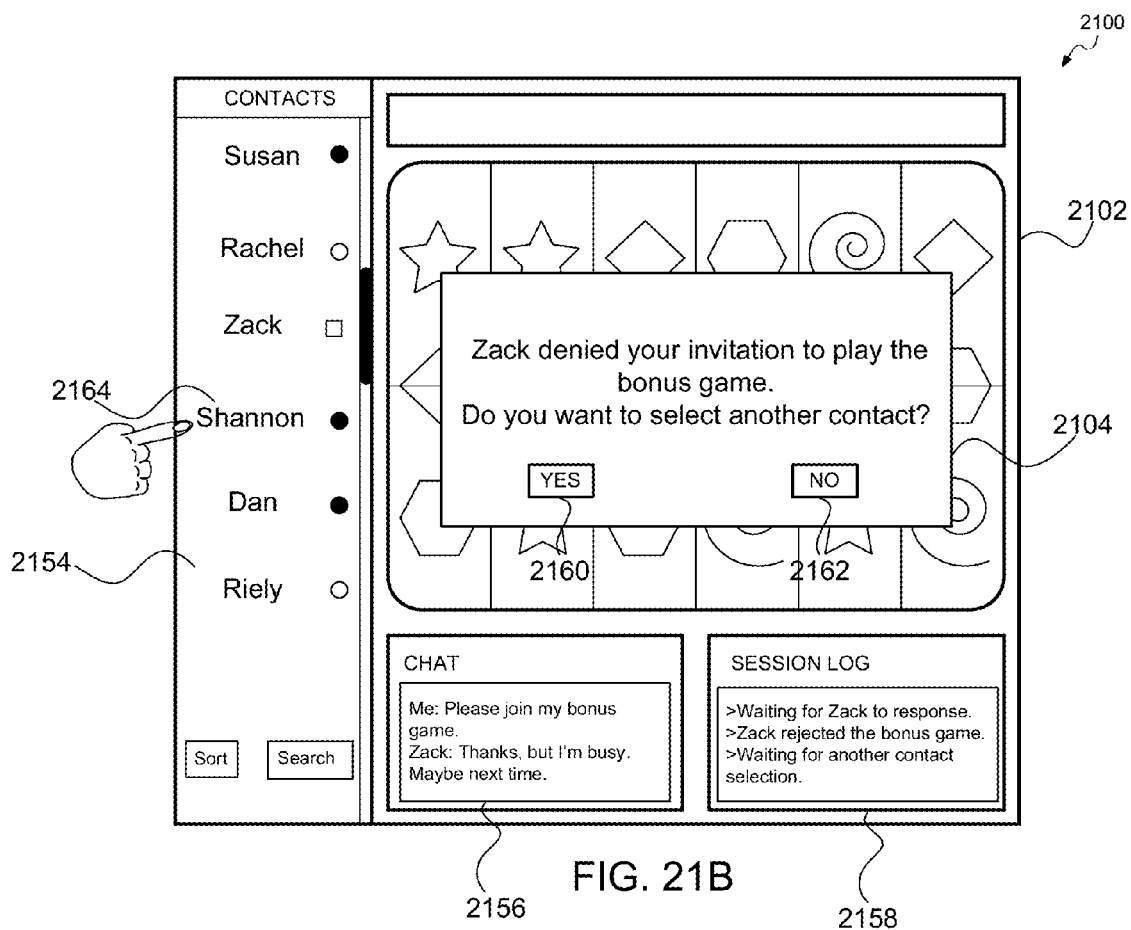
FIG. 21B illustrates one embodiment of a rejection of a bonus game invitation.

FIG. 21B illustrates one embodiment of a rejection of the bonus game invitation. Once the social contact selects the "NO" indicator 2018 (illustrated in FIG. 20), the selection may be transmitted to the social game server. The social game server may then transmit the social contact's selection to the gaming machine. The GUI 2102 presented on display 2100 may display an indication that the social contact declined or rejected the bonus game invitation. For example, the GUI 2102 may display "Zack declined your invitation to play the bonus game" in the bonus game notification window 2104.

The GUI 2102 may also present a communication window 2156. The communication window 2106 may be updated frequently to receive communication from other users and/or players. For example, the communication window 2156 may contain a response from Zack: "Thanks, but I'm busy. Maybe next time.", indicating that Zack denied the bonus game invitation.

The GUI 2102 may also present a session log window 2158. The session log window 2158 may include information from the game of chance and/or the bonus game. The session log window 2158 can also be automatically and periodically updated to reflect the events from the social gaming session. For example, the session log window 2158 may indicate that the gaming machine is waiting for the user to make another social contact selection.

In one embodiment, the user may be prompted to select another social contact. For example, the GUI 2102 may display "Do you want to select another contact?", a "YES" indicator 2160, and a "NO" indicator 2162. In one embodiment, the user may then select another social contact from the social contact list 2154. For example, as illustrated, the user may select Shannon 2164 to receive a bonus game invitation.

In yet another embodiment, the user may decide to not select another social contact and play the bonus game himself. The user may select the "NO" indicator 2162. The detected selection may be transmitted to the social game server for processing. In other words, the bonus game session may be played solely by the user and with other social contacts.

Figure 22:
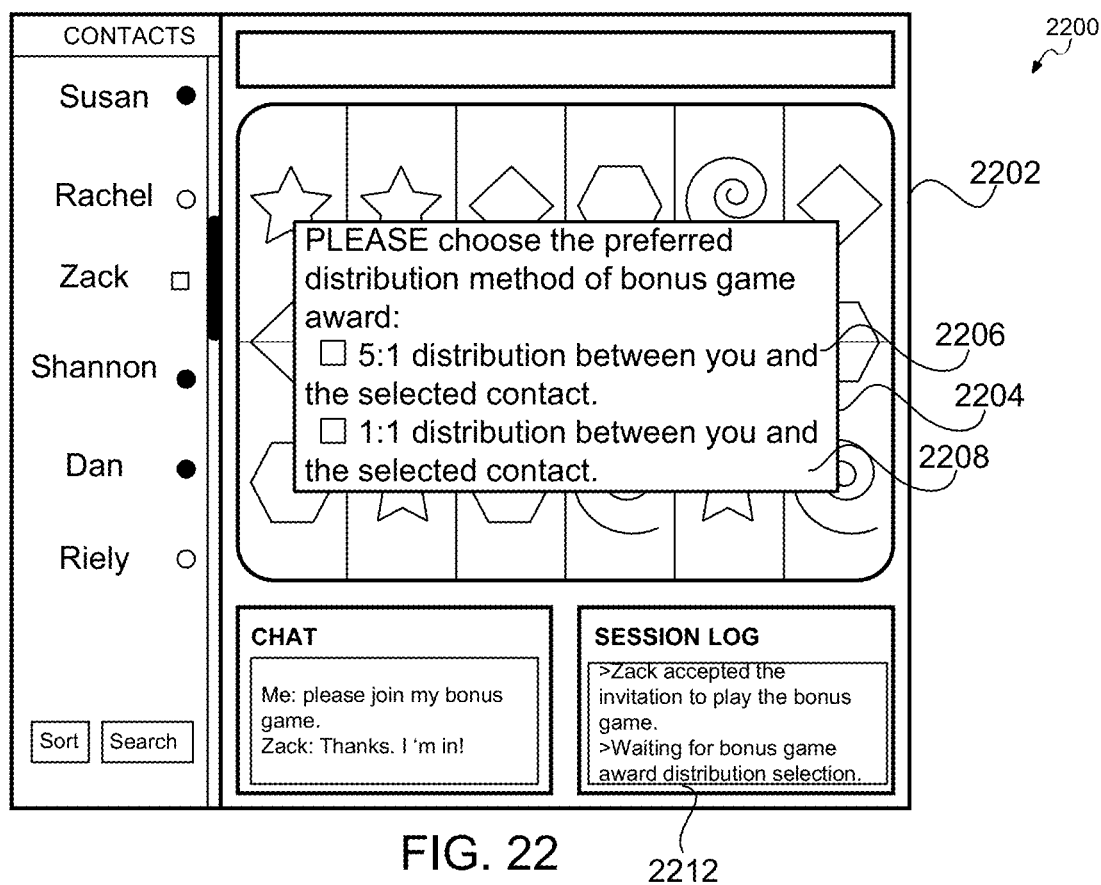
FIG. 22 illustrates one embodiment of a graphical user interface presented on a display of a gaming machine.

FIG. 22 illustrates one embodiment of a graphical user interface presented on a display of a gaming machine. In one embodiment, the user may have the option of selecting different distribution methods for a bonus game award. The GUI 2202 may display a bonus game notification window 2204 on display 2200. Once the user receives notice that at least one social contact accepted the bonus game invitation, the user may be prompted to select at least one distribution method for the bonus game award. The at least one distribution method may vary based on the type and/or theme of the primary game of chance. In one embodiment, the bonus game notification window 2204 may ask the game user to either select a 5:1 indicator 2206 or a 1:1 indicator 2208. The 5:1 indicator 2206 allocates the bonus game award 5:1 between the user and the social contact. A 1:1 indicator 2208 allocates the bonus game award evenly between the user and the social contact. In another embodiment, the user may allocate the entire bonus game award to the at least one social contact. In another embodiment, the user may select a specific monetary amount to share with the at least one social contact. The examples are not intended to be limiting as there are many other options to allocate food, etc.

The GUI 2202 may also present a session log window 2212. The session log window 2212 may include information from the game of chance and/or the bonus game. The session log window 2212 can also be automatically and periodically updated to reflect the events from the social gaming session. For example, the session log window 2212 may indicate that the gaming machine is waiting for the user to select a bonus game award distribution option.

Figure 23:
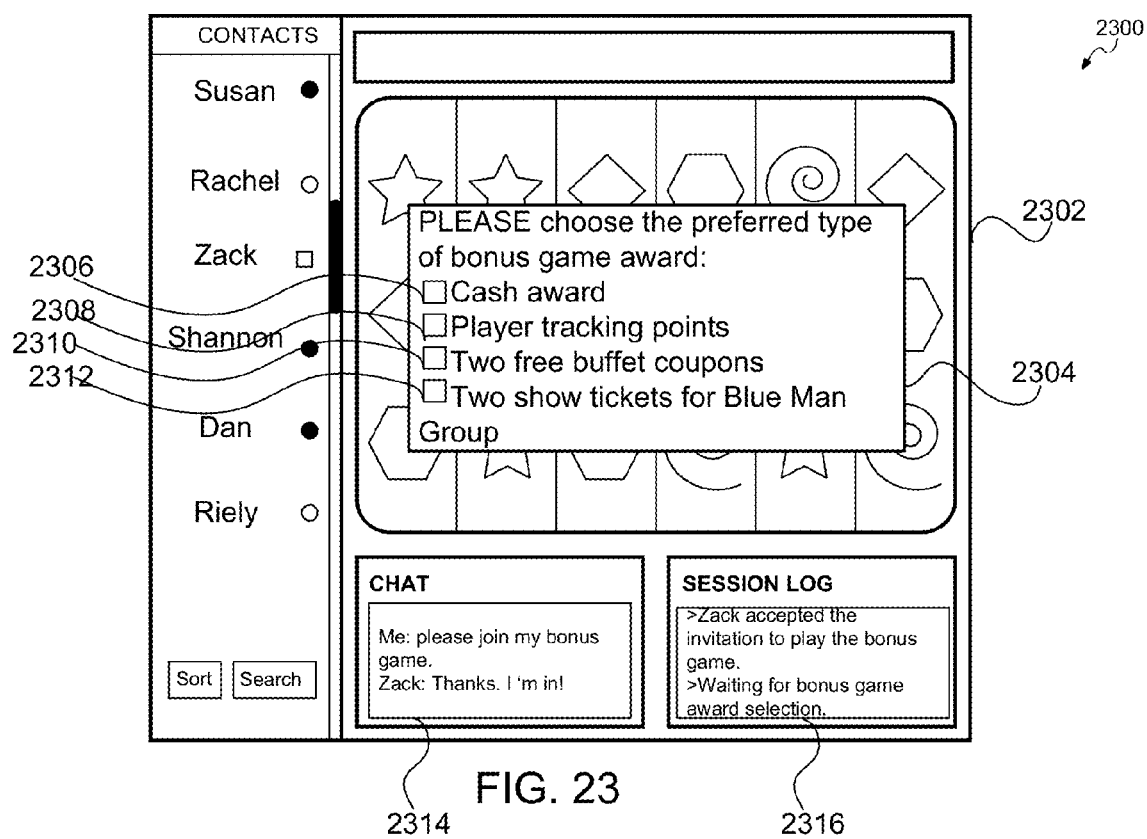
FIG. 23 illustrates one embodiment of a graphical user interface presented on a display of a gaming machine.

FIG. 23 illustrates one embodiment of a graphical user interface presented on a display of a gaming machine. In one embodiment, the user may have the option of selecting at least one type of bonus game award from various types of bonus game awards. Once the user receives notice that at least one social contact accepted the bonus game invitation, the user may be prompted to select at least one type of bonus game award. In one embodiment, the GUI 2302 may display a bonus game notification window 2304 on display 2300. The bonus game notification window 2304 may contain at least one type of bonus game award that may vary based on the type and/or theme of the primary game of chance. For example, the bonus game notification window 2304 may ask the user to select among a "cash award" 2306, a "player tracking points" 2308, a "two free buffet coupons" 2310, or a "two show tickets for Blue Man Group" 2312. The "cash award" 2306 designates monetary award as the bonus game award. The "player tracking points" 2308 designates certain player points as the bonus game award. The "two free buffet coupons" indicator 2310 designates that the bonus award would be free buffet coupons at certain restaurants. The "Two show tickets for Blue Man Group" indicator 2312 designates that the bonus award would be two free tickets for the Blue Man Group show.

The session log 2316 may also be automatically updated to reflect the events of the social gaming session. For example, the session log 2316 can indicate "Waiting for bonus game award selection."

Figure 24:
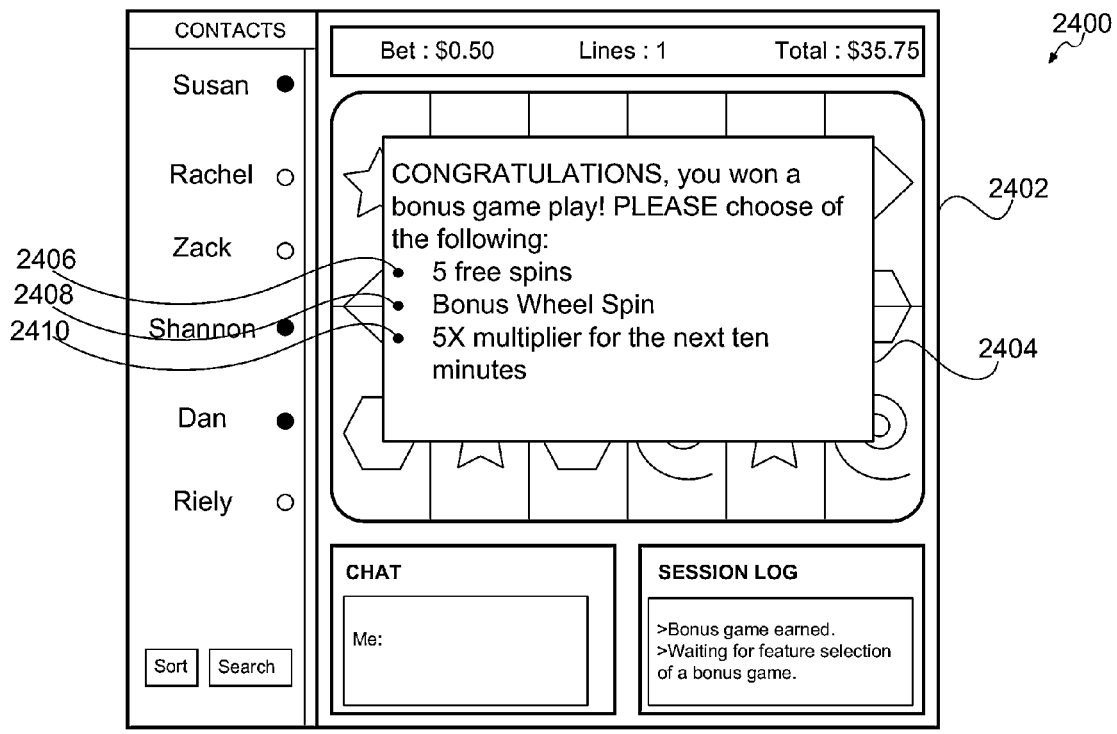
FIG. 24 illustrates another embodiment of a graphical user interface presented on a display of a gaming machine.

FIG. 24 illustrates another embodiment of a graphical user interface presented on a display of a gaming machine. In one embodiment, the user may have the option of selecting at least one type of bonus game award from various types of bonus game awards. Once the user receives notice that at least one social contact accepted the bonus game invitation, the user may be prompted to select at least one type of bonus game award for various types of bonus game award. In one embodiment, the GUI 2402 may display a bonus game notification window 2404 on display 2400. The bonus game notification window 2404 may contain at least one type of bonus game award. For example, the bonus game notification window 2404 may ask the user to select among "5 free spins" 2406, a "bonus wheel spin" 2408, or a "5× multiplier for the next ten minutes" 2410. The "5 free spins" 2406 awards the user with five free spins either in the bonus game or the primary game of chance. The "bonus wheel spin" 2408 designates a bonus wheel spin as the bonus game award. The "5× multiplier for the next ten minutes" 2410 provide for a 5× multiplier for ten minutes as the user plays either the bonus game and/or the primary game of chance. These examples are not intended to be limiting as there are many other types of bonus game awards that may be contemplated.

Figure 25A:
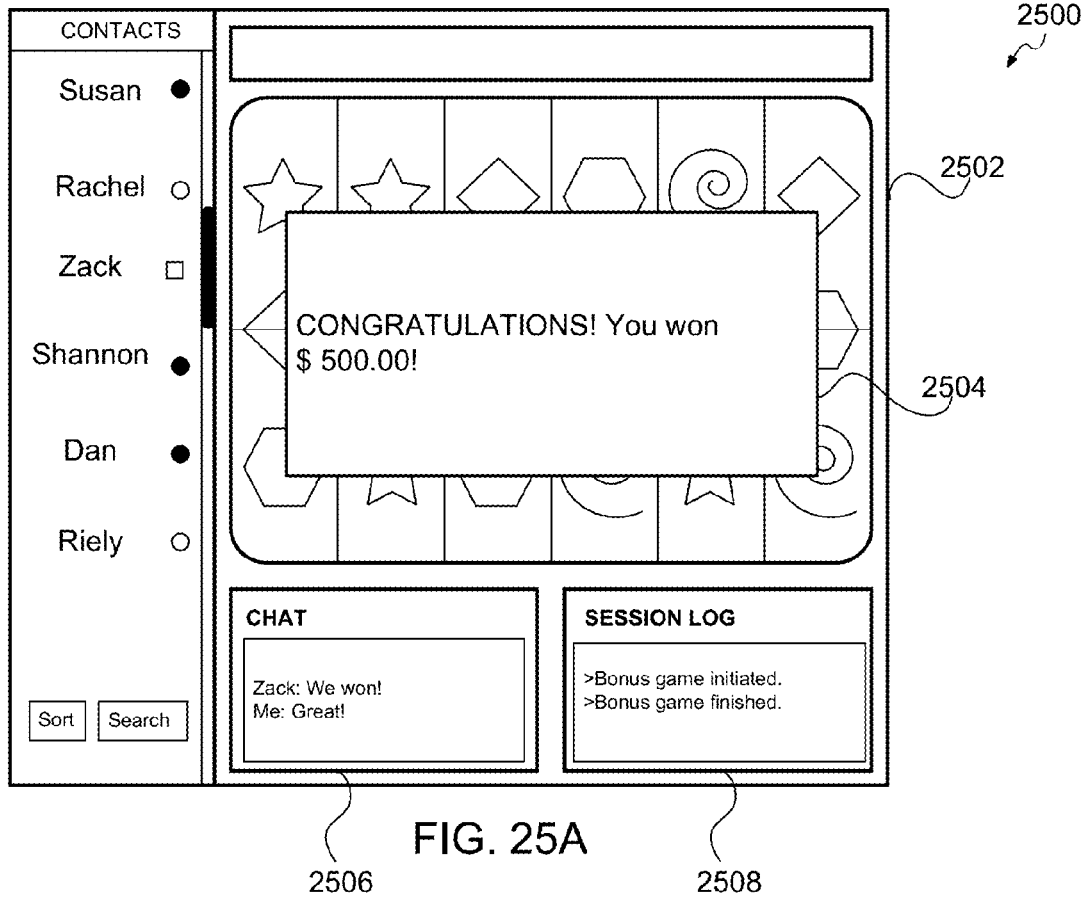
FIG. 25A illustrates one embodiment of a graphical user interface presented on a display of a gaming machine.
Figure 25B:
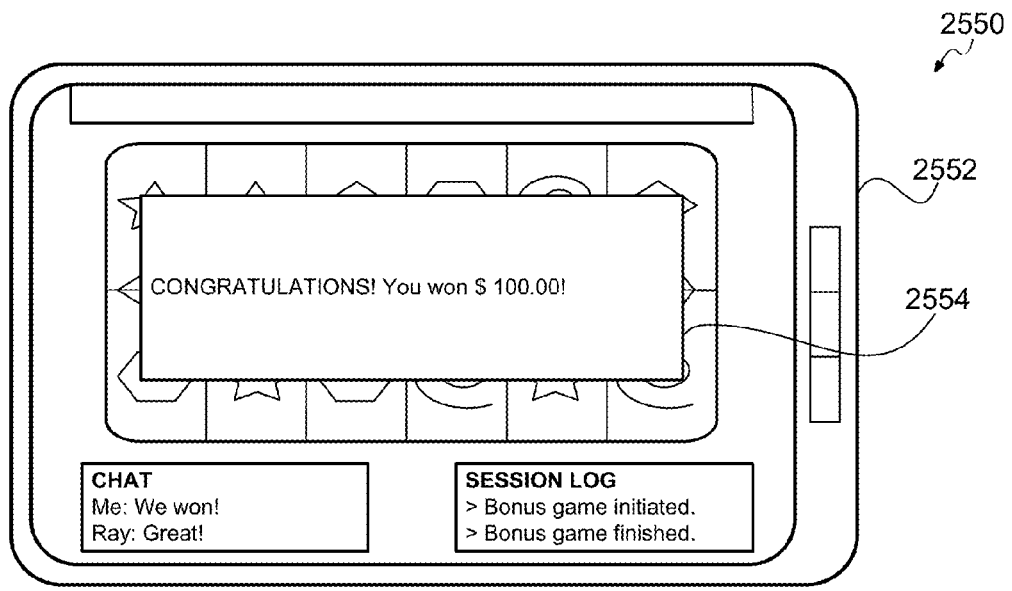
FIG. 25B illustrates one embodiment of a graphical user interface presented on a display of a portable electric device.

FIGS. 25A and 25B illustrate one embodiment of a graphical user interface presented on a display of a gaming machine and a display of a portable electronic device, respectively. Referring to FIG. 25A, the GUI 2502 may display a bonus game notification window 2504 on display 2500. If the player won the bonus game session, the bonus game notification window 2504 may indicate, in one example: "Congratulations! You won $500.00!" The communication window 2506 can also present real-time communication with the social contact(s), such as Zack. As illustrated, Zack may communicate in real-time: "We won!" and the player may communicate in real-time: "Great!"

The session log 2508 may also automatically and periodically be updated to reflect the events of the social gaming session. For example, the session log 2508 as illustrated can indicate "Bonus game initiated" and "Bonus game finished."

Referring now to FIG. 25B, the GUI may simultaneously in real-time, on the portable electronic device, display a bonus game notification window 2554. The bonus game notification window 2554 may present, for example: "Congratulations! You won $ 100.00!" In this embodiment, the player may have selected to distribute the bonus award based on different percentages such that the player receives $500.00 and the remote users receive $100.00.

Figure 26A:
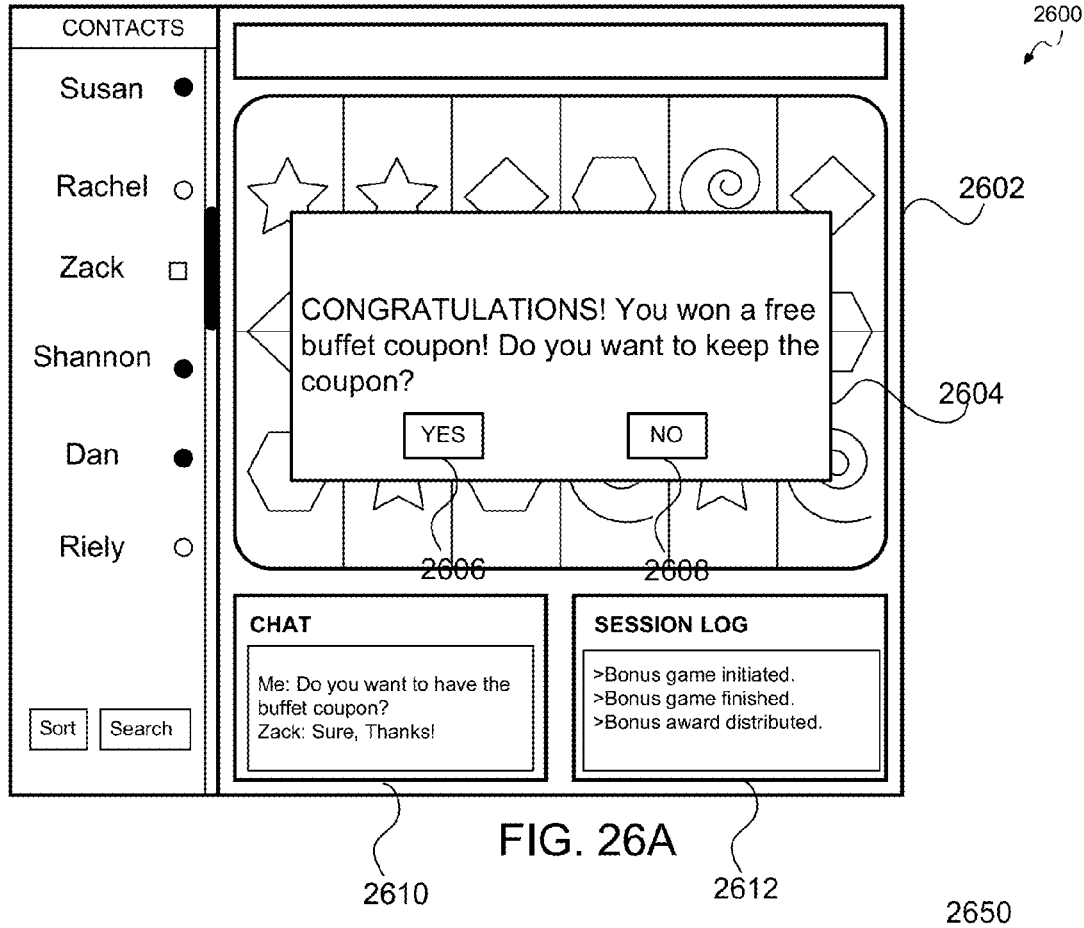
FIG. 26A illustrates one embodiment of a graphical user interface presented on a display of a gaming machine
Figure 26B:
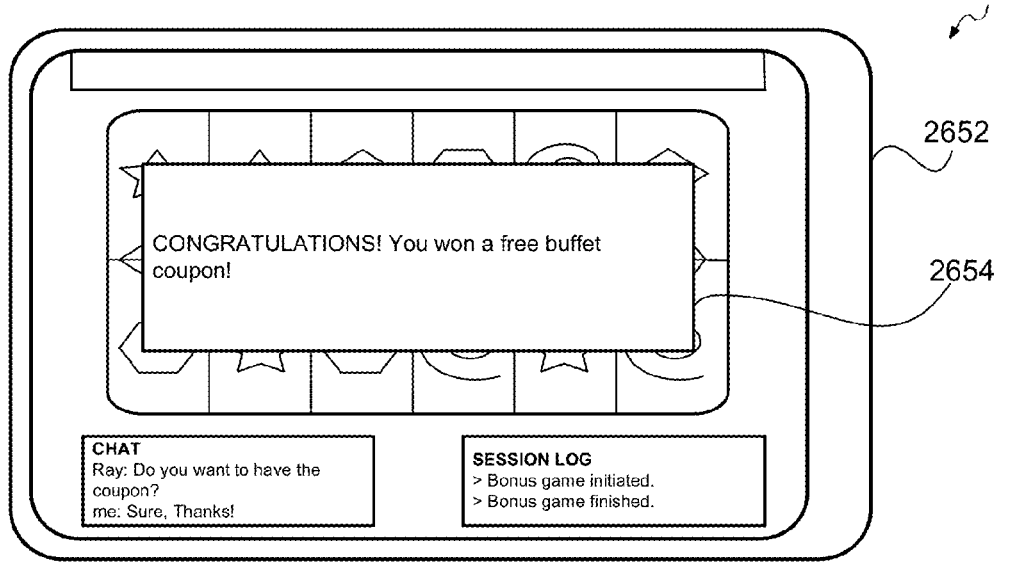
FIG. 26B illustrates one embodiment of a graphical user interface presented on a display of a portable electric device.

FIGS. 26A and 26B illustrate one embodiment of a graphical user interface presented on a display of a gaming machine and a display of a portable electronic device, respectively. Referring to FIG. 26A, the GUI 2602 may display a bonus game notification window 2604. Once the player wins a bonus game session, the bonus game notification window 2604 may display: "CONGRATULATIONS! You won a free buffet coupon! Do you want to keep the coupon?" The bonus game notification window may have a "Yes" indicator 2606, and a "No" indicator 2608 to either accept or reject the coupon.

The user may communicate with a social contact to determine whether to keep or reject the coupon. In other words, the user may use communication window 2610 to ask if Zack would like the free buffet coupon. As illustrated in the communication window, if the social contact would like the bonus award, the player may press the "No" indicator and grant it to a social contact. The social contact may or may not have participated in the bonus game session.

Referring now to FIG. 25B, the GUI may simultaneously in real-time, display a bonus game notification window 2654. The bonus notification window 2654 may present, for example: "CONGRATULATIONS! You won a free buffet coupon!" The free buffet coupon may be redeemed by any known methods. For example, the buffet coupon may be saved to the social contact's user account. In another example, the social contact may immediately redeem the buffet coupon by printing it out. In still another example, the social contact may be redeemed at the gamin establishment.

While embodiments and applications of this invention have been shown and described, it would be apparent to those skilled in the art having the benefit of this disclosure that many more modifications than mentioned above are possible without departing from the inventive concepts herein.

What is claimed is:

1. A gaming system, comprising:
a gaming machine the gaming machine including at least a display and a ticket or currency acceptor, the gaming machine configured to:
   present a primary game of chance on the display of the gaming machine;
   determine whether a bonus triggering event is triggered on the primary game of chance;
   receive a list of at least one available remote user;
   display the list of at least one available remote user on the display of the gaming machine;
   detect a selection of at least one remote user from the list of at least one available remote user displayed on the display;
   transmit the selection of at least one remote user to a social gaming server;
   await, up to a predetermined period of time, for receipt of a bonus game input associated with a bonus game, the bonus game input being initiated by the at least one remote user; and
   display results of the bonus game following receipt of the bonus game input; and
the social gaming server configured to:
   monitor the primary game of chance presented on the gaming machine;
   determine whether the bonus triggering event is triggered on the gaming machine;
   generate the list of at least one available remote user for participation in the bonus game;
   transmit the list of at least one available remote user to the gaming machine;
   receive the selection of the at least one remote user from the gaming machine for distribution of a bonus game feature to the at least one remote user;
   distribute the bonus game feature to each of the selected at least one remote user;
   await, up to a predetermined period of time, for receipt of a bonus game input associated with the bonus game, the bonus game input being initiated by at least one of the selected remote user;
   receive a result of the bonus game; and
   transfer the result of the bonus game to the gaming machine and the at least one selected remote user.

2. The gaming system in claim 1, wherein the social gaming server is further configured to transmit an invitation to accept the bonus game feature to the at least one selected remote users.

3. The gaming system in claim 2, wherein the social gaming server is further configured to await for a predetermined period of time for acceptance of the invitation to accept the bonus game feature.

4. The gaming system in claim 1, wherein the gaming machine is further configured to:
   generate gaming information for the bonus game triggered by the bonus triggering event, the bonus game using the bonus game feature to play the bonus game; and
   transmit at least a portion of the gaming information to the social gaming server.

5. The gaming system in claim 1, wherein the social gaming server is further configured to:
   generate gaming information for the bonus game triggered by the bonus triggering event, the bonus game using the bonus game feature to play the bonus game; and
   transmit at least a portion of the gaming information to the at least one selected remote user and the gaming machine.

6. A method for granting a real-time bonus game feature, comprising:
   presenting a primary game of chance on a display of a gaming machine, the gaming machine including at least a ticket or currency acceptor;
   determining whether a bonus triggering event is triggered on the primary game of chance;
   receiving a list of at least one available remote user;
   displaying the list of at least one available remote user on the display of the gaming machine;
   detecting a selection of at least one remote user from the list of at least one available remote user displayed on the display;

transmitting the selection of the at least one remote user to a social gaming server for distribution of a bonus game feature to the at least one remote user;

awaiting, up to a predetermined period of time, for receipt of a bonus game input associated with the bonus game feature, the bonus game input being initiated by the at least one remote user; and displaying results of a bonus game following receipt of the bonus game input, wherein the bonus game feature is used to play the bonus game.

7. The method of claim 6, further comprising:

selecting at least one configuration of the bonus game feature on the gaming machine, wherein the at least one configuration of the bonus game feature pertains to one of more of: a type of bonus game play, a percentage distribution of award, or a number of remote users to play.

8. The method of claim 6, further comprising:

receiving a rejection notification from the social gaming server, the rejection notification indicating that the selected at least one remote user has declined to participate in the bonus game; and displaying an indication of the rejection notification from the at least one remote user.

9. The method of claim 6, further comprising:

receiving an acceptance notification from the social gaming server, the acceptance notification indicating that the selected at least one remote user has agreed to participate in the bonus game; and displaying an indication of the acceptance notification from the at least one remote user.

10. The method of claim 9, further comprising:

initiating the bonus game on the gaming machine subsequent to receiving the acceptance notification; and generating gaming information associated with the bonus game.

11. The method of claim 10, further comprising:

transmitting at least a portion of the gaming information to the social gaming server.

12. The method of claim 6, further comprising:

dispersing a calculated award based on the results of the bonus game, wherein the calculated award is distributed to the winner of the bonus game feature.

13. The method of claim 6, further comprising:

presenting a bonus award distribution menu on the display, the bonus award distribution menu having a plurality of award preferences; and detecting a selection of one or more of the plurality of award preferences.

14. The method of claim 13, further comprising:

calculating a bonus award based on the selected one or more of the plurality of award preferences; and transmitting the calculated bonus award to the social gaming server for distribution to the at least one remote user.

15. The method of claim 6, wherein the transmitting includes transmitting the bonus game feature to the social gaming server for substantially real-time transmission of the bonus game feature to the at least one remote user.

16. A method for facilitating real-time bonus game participation on a social gaming server, comprising:

monitoring a primary game of chance on a gaming machine, the gaming machine including at least a ticket or currency acceptor;

determining whether a bonus triggering event is triggered on the primary game of chance;

generating a list of at least one available remote user;

transmitting the list of at least one available remote user to the gaming machine;

receiving selection of the at least one remote user from the gaming machine for distribution of a bonus game feature to the at least one remote user;

distributing the bonus game feature to each of the selected at least one remote user;

awaiting, up to a predetermined period of time, for receipt of a bonus game input associated with a bonus game, the bonus game input being initiated by the at least one remote user;

calculating a result of the bonus game; and transferring the result of the bonus game to the gaming machine and the at least one remote user.

17. The method of claim 16, wherein the distributing comprises:

transmitting the bonus gaming feature to a portable electronic device.

18. The method of claim 16, wherein the distributing further comprises:

transmitting the bonus gaming feature to another gaming machine.

19. The method of claim 16, wherein the bonus game feature is distributed substantially in real-time to the at least one remote user.

20. The method of claim 16, further comprising:

transmitting a rejection notification to the gaming machine, the rejection notification indicating that the selected at least one remote user declined to participate in the bonus game.

21. The method of claim 16, further comprising:

transmitting an acceptance notification to the gaming machine, the acceptance notification indicating that the selected at least one remote user agreed to participate in the bonus game.

22. The method of claim 16, further comprising:

initiating the bonus game subsequent to receiving the bonus game input; and generating gaming information associated with the bonus game.

23. The method of claim 22, further comprising:

transmitting at least a portion of the gaming information to the gaming machine and the at least one remote user.

24. The method of claim 16, further comprising:

receiving a selection of a award preference from the gaming machine;

determining if a bonus award is awarded in the bonus game;

calculating a bonus award based on the selected award preference if it is determined that a bonus award is awarded; and distributing the calculated bonus award to the gaming machine and the at least one remote user.

* * * * *